(12) United States Patent
Schrans et al.

(10) Patent No.: US 12,442,900 B2
(45) Date of Patent: Oct. 14, 2025

(54) OPTICAL COMPONENTS FOR IMAGING

(71) Applicant: ROCKLEY PHOTONICS LIMITED, Altrincham (GB)

(72) Inventors: Thomas Pierre Schrans, Temple City, CA (US); Andrew George Rickman, Altrincham (GB)

(73) Assignee: Rockley Photonics Limited, Altrincham (GB)

( * ) Notice: Subject to any disclaimer, the term of this patent is extended or adjusted under 35 U.S.C. 154(b) by 1017 days.

(21) Appl. No.: 17/428,580

(22) PCT Filed: Feb. 6, 2020

(86) PCT No.: PCT/EP2020/053010
§ 371 (c)(1),
(2) Date: Aug. 4, 2021

(87) PCT Pub. No.: WO2020/161250
PCT Pub. Date: Aug. 13, 2020

(65) Prior Publication Data
US 2022/0283308 A1     Sep. 8, 2022

Related U.S. Application Data

(60) Provisional application No. 62/838,768, filed on Apr. 25, 2019, provisional application No. 62/828,376,
(Continued)

(51) Int. Cl.
G01S 7/481       (2006.01)
G01S 17/42       (2006.01)
(Continued)

(52) U.S. Cl.
CPC .......... *G01S 7/4817* (2013.01); *G01S 7/4816* (2013.01); *G01S 17/42* (2013.01); *G01S 17/89* (2013.01);
(Continued)

(58) Field of Classification Search
CPC ........ G01S 7/4817; G01S 7/481; G01S 17/42; G01S 17/89; G01S 7/4811; G02B 27/4233; G02F 1/292
See application file for complete search history.

(56) References Cited

U.S. PATENT DOCUMENTS 7,976,208 B2    7/2011   Travis
8,029,181 B2   10/2011   Travis et al.
(Continued)

FOREIGN PATENT DOCUMENTS

CN     105891843 A    8/2016
EP     3 460 519 A1   3/2019
(Continued)

OTHER PUBLICATIONS

International Search Report and Written Opinion of the International Searching Authority, mailed Jun. 25, 2020, Corresponding to PCT/EP2020/053010, 17 pages.
(Continued)

*Primary Examiner* — Yuqing Xiao
*Assistant Examiner* — Rachel Nguyen
(74) *Attorney, Agent, or Firm* — Womble Bond Dickinson (US) LLP

(57) ABSTRACT

An imaging component for receiving light, the imaging component comprising a photonic integrated circuit, PIC, receiver, a slab, a wedge, and a lens the wedge having a front surface and an opposing back surface, the imaging component arranged to define a receiving optical path through the front surface of the wedge, the receiving optical path continuing through the wedge and through the slab to the PIC receiver, the lens being configured to focus light of the receiving optical path onto the PIC receiver.

20 Claims, 32 Drawing Sheets

Related U.S. Application Data filed on Apr. 2, 2019, provisional application No. 62/824,223, filed on Mar. 26, 2019, provisional application No. 62/820,761, filed on Mar. 19, 2019, provisional application No. 62/802,164, filed on Feb. 6, 2019.

(51) Int. Cl.
  *G01S 17/89* (2020.01)
  *G02B 27/42* (2006.01)
  *G02F 1/29* (2006.01)

(52) U.S. Cl.
  CPC ......... *G02B 27/4233* (2013.01); *G02F 1/292* (2013.01)

(56) References Cited

U.S. PATENT DOCUMENTS

| | | | |
|---|---|---|---|
| 9,157,790 B2 * | 10/2015 | Shpunt | H01S 5/02325 |
| 9,297,889 B2 | 3/2016 | Hudman et al. | |
| 9,810,775 B1 | 11/2017 | Welford et al. | |
| 2008/0316768 A1 | 12/2008 | Travis | |
| 2013/0208256 A1 * | 8/2013 | Mamidipudi | G01S 7/4815 |
| | | | 359/15 |
| 2013/0278939 A1 * | 10/2013 | Pfister | G01B 11/14 |
| | | | 356/601 |
| 2014/0049610 A1 * | 2/2014 | Hudman | G01S 7/4815 |
| | | | 348/46 |
| 2015/0207296 A1 | 7/2015 | Rickman et al. | |
| 2015/0378187 A1 | 12/2015 | Heck et al. | |
| 2016/0161598 A1 * | 6/2016 | Stutz | H01S 3/06754 |
| | | | 356/5.01 |
| 2016/0161600 A1 | 6/2016 | Eldada et al. | |
| 2017/0184450 A1 * | 6/2017 | Doylend | G01S 7/4817 |
| 2017/0365970 A1 | 12/2017 | Uyeno et al. | |
| 2018/0046028 A1 * | 2/2018 | Chang | G02B 6/002 |
| 2018/0267250 A1 | 9/2018 | Hosseini et al. | |
| 2019/0094345 A1 * | 3/2019 | Singer | G01S 7/484 |
| 2019/0235057 A1 | 8/2019 | Lin et al. | |
| 2020/0200881 A1 * | 6/2020 | Maier | G01S 17/34 |

FOREIGN PATENT DOCUMENTS

| | | |
|---|---|---|
| JP | 2010-230933 A | 10/2010 |
| JP | 2018-156051 A | 10/2018 |
| WO | WO 2005/109075 A1 | 11/2005 |
| WO | WO 2017/087951 A1 | 5/2017 |
| WO | WO 2017/214100 A1 | 12/2017 |
| WO | WO 2018/107237 A1 | 6/2018 |

OTHER PUBLICATIONS

Suni, P. J. M. et al., "Photonic Integrated Circuits for Coherent Lidar", 18th Coherent Laser Radar Conference, Jun. 26, 2016-Jul. 1, 2016, pp. 1-6.
U.K. Intellectual Property Office Combined Search and Examination Report, dated May 25, 2023, for Patent Application No. GB2306020.5, 6 pages.
De Jong, T. M. et al., "Diffractive flat panel solar concentrators of a novel design", Optics Express, Jun. 20, 2016, pp. A1138-A1147, vol. 24, No. 14, Optical Society of America.
Travis, A. R. L. et al., "Wedge Optics in Flat Panel Displays", Proceedings of the IEEE, Jan. 18, 2012, pp. 45-60, vol. 101, No. 1, IEEE.
Xu, W-Q et al., "Simple and universal method in designs of high-efficiency diffractive optical elements for spectrum separation and beam concentration", Chin. Phys. B, 2017, pp. 074202-1 through 074202-7, vol. 26, No. 7, Chinese Physical Society and IOP Publishing Ltd.
U.K. Intellectual Property Office Search and Examination Report, dated Jul. 23, 2020, for Patent Application No. GB2001603.6, 7 pages.
U.K. Intellectual Property Office Examination Report, dated Nov. 15, 2021, for Patent Application No. GB2001603.6, 4 pages.
U.K. Intellectual Property Office Examination Report, dated Apr. 22, 2022, for Patent Application No. GB2001603.6, 4 pages.
U.K. Intellectual Property Office Examination Report, dated Feb. 21, 2023, for Patent Application No. GB2001603.6, 4 pages.
U.K. Intellectual Property Office Search and Examination Report, dated Jul. 23, 2020, for Patent Application No. GB2001605.1, 7 pages.
U.K. Intellectual Property Office Search and Examination Report, dated Oct. 22, 2020, , for Patent Application No. GB2001605.1, 5 pages.
U.K. Intellectual Property Office Examination Report, dated Nov. 15, 2021, for Patent Application No. GB2001605.1, 5 pages.
U.K. Intellectual Property Office Examination Report, dated Apr. 22, 2022, for Patent Application No. GB2001605.1, 4 pages.
U.K. Intellectual Property Office Examination Report, dated Feb. 21, 2023, for Patent Application No. GB2001605.1, 3 pages.
U.K. Intellectual Property Office Search and Examination Report, dated Jul. 23, 2020, for Patent Application No. GB2001606.9, 7 pages.
U.K. Intellectual Property Office Examination Report, dated Nov. 15, 2021, for Patent Application No. GB2001606.9, 4 pages.
U.K. Intellectual Property Office Search and Examination Report, dated Jul. 23, 2020, for Patent Application No. GB2001610.1, 7 pages.
U.K. Intellectual Property Office Examination Report, dated Nov. 15, 2021, for Patent Application No. GB2001610.1, 4 pages.
U.K. Intellectual Property Office Examination Report, dated Apr. 22, 2022, for Patent Application No. GB2001610.1, 3 pages.
U.K. Intellectual Property Office Examination Report, dated Feb. 21, 2023, for Patent Application No. GB2001610.1, 4 pages.
Website: "Spectrum of Applications: New Trends in Microfabrication", Aug. 1, 2018, 16 pages, Nanoscribe GmbH, https://www.nanoscribe.de/files/9215/1912/9367/ApplicationFlyer.pdf.
Website: "Fiber Optics", Roper Scientific Germany, Sep. 13, 2018, 1 page, https://www.roperscientific.de/fiberoptic.html.
Website: "Production Qualification Milestone for IQE's proprietary NanoImprint Lithography (NIL) Technology for DFB lasers", Jul. 9, 2018, 2 pages, http://www.iqep.com/media/2018/2018/07/production-qualification-milestone-for-iqe's-proprietary-nanoimprint-lithography-(nil)-technology-for-dfb-lasers/.
Chinese Notification and Partial English translation of the First Office Action, for Patent Application No. 202080026513.3, mailed Jun. 21, 2025, 28 pages.
Shen, F. et al., "High Power Laser and Particle Beams". Mar. 15, 2009, pp. 335-340, vol. 21, No. 3, https://www.cnki.net.

* cited by examiner

1x24 switch with 1x2 and 1x3 switches

OPTICAL COMPONENTS FOR IMAGING

CROSS-REFERENCE TO RELATED APPLICATIONS

This application is a U.S. National Phase Patent Application of International Application Number PCT/EP2020/053010, filed on Feb. 6, 2020, which claims priority from U.S. 62/802,164 filed 6 Feb. 2019, from U.S. 62/828,376 filed 2 Apr. 2019, from U.S. 62/820,761 filed 19 Mar. 2019, from U.S. 62/824,223 filed 26 Mar. 2019 and from U.S. 62/838,768 filed 25 Apr. 2019; the contents and elements of all of the applications identified in this paragraph are herein incorporated by reference for all purposes.

FIELD OF THE INVENTION

The present invention relates to imaging components and diffractive optical elements and particularly, although not exclusively, to components for use in LiDAR, for example as LiDAR transmitters, LiDAR receivers and LiDAR transceivers.

BACKGROUND

In designing an imaging receiving component, it may be advantageous to collect enough light to meet the optical link budget to ensure that sufficient signal reaches the processing components so that an image can be reproduced.

In a LiDAR system, 3D information is collected about the environment of interest by emitting laser light and measuring the wavelength and/or return time of reflected light received by a receiving component. The receiving component in such a system may therefore be configured to collect sufficient light to allow reliable measuring of the reflected light.

The collected light is processed by a receiver which will measure the received light to deduce the 3D information about the environment. The emitted light is transmitted by a transmitter. Optical components, such as lenses and diffractive optical elements (DOEs) may also be used to provide a receiving area that is large enough to collect sufficient received light to deduce the 3D information about the environment and collect light incident from different directions. A LiDAR transceiver, as discussed in this specification includes a transmitter and a receiver and may include optical components such as one or more lenses and/or one or more DOE(s). LiDAR may be used for 3D imaging sensors or facial recognition etc.

"Simple and universal method in designs of high-efficiency diffractive optical elements for spectrum separation and beam concentration", Wen-Qi Xu, Chin. Phys. B Vol. 26, No. 7 (2017) 074202 provides an example of the design of a diffractive optical element for use in solar cell systems to collect light for power harvesting.

The present invention has been devised in light of the above considerations.

SUMMARY OF THE INVENTION

LiDAR systems scan a field of view in an environment with light to create a 3D map of the environment. Light is emitted by a LiDAR transmitter, the light interacts with objects in the environment (e.g. reflects) and is then received by a LiDAR receiver. The distance to the object in the environment can be calculated from the received light using, for example, FMCW or time of flight techniques.

Some applications of the components explained herein are in LiDAR for 3D imaging, for example in navigation, such as in vehicles (such as cars or drones) which may be autonomous, medical imaging, consumer product imaging, augmented reality, virtual reality, front facing cameras, feature recognition, such as facial recognition, room scanning, recognising clothing sizing etc., industrial imaging, for example for use with robotics.

The direction of emission of the light is scanned over the field of view so as to sample each point in the field of view and collect distance measurements at each direction/angle in the field of view. Each point is in a direction of emission of the light from the transceiver. The direction may be referred to as an angle or emission angle in this specification. In this specification, an angle specifies the direction in which a beam is travelling. The angle may be measured from a direction normal to the surface from/to which the beam travels. For example, when a beam leaves a transmitter component, the angle may be measured from a direction normal to the front surface of the transmitter component. When a beam arrives at a receiver component, the angle of the beam may be measured from a direction normal to the front surface of the receiver component. Each point to be detected in the environment to be scanned is at a distance (to be calculated using LiDAR) in a direction from the LiDAR transceiver. In other words, each point to be detected is a distance away from the transceiver in a direction that may be defined by an angle the direction makes relative to a direction normal to a transmitting/receiving surface of the transceiver.

The angle may have an azimuthal component and a polar component. The field of view may be made up of an azimuthal angular range and a polar angular range. The azimuthal and polar angular ranges form a field of view that may have a cone shape, or a pyramidal shape, with an apex at or near the emitting surface of the transceiver. Depending on the orientation of the LiDAR transceiver, the azimuthal angular range and the polar angular range may correspond to a horizontal and a vertical direction respectively or vice versa. If the LiDAR transceiver is used in a birds-eye view configuration (e.g. looking downwards to the ground from an aerial position) the azimuthal angular range and the polar angular range may correspond to a longitudinal (forwards-backwards) direction and a lateral (left to right) direction or vice versa. The resolution of the LiDAR system may be measured by the angular separation between directions sampled in each of the azimuthal angular range and the polar angular range.

There are several methods of scanning including physically moving, (for example, rotating) emitting components or mirrors to direct light to sample each direction in the field of view in turn.

Another way to scan in a LiDAR system is by using an optical phased array (OPA) to transmit light sequentially over the angles of the field of view. An OPA receiver (Rx) for 3D imaging can be used to detect the light on its return from the environment. OPA transmitters (Tx) and receivers are stationary, meaning that unlike other 3D transmitters and receivers that physically rotate into the direction of the point to be sampled, the OPA Rx and Tx and components of the Rx/Tx do not move. An OPA system may be configured to scan a wide range of incident angles and may scan more quickly and reliably than components requiring movement of components.

In this specification, an OPA receiver refers to an optical receiver comprising an array of input waveguides, an array of path-matched arm waveguides which are configured so that the phase delay of light within each of the arm waveguides can be controlled, and one or more output waveguides each of which is coupled to a photodetecting component, such as a coherent receiver or a single-photon avalanche diode (SPAD). Such a receiver can use OPA elements such as the arm waveguides to direct light received from a range of angles to a receiver. The angle of incidence of the reflected light is known by the system controller as it corresponds to the emission angle set by the system controller in the transmitter OPA. The receiver OPA phase shifter(s) may be configured to correspond to the transmitter OPA phase shifter(s) so that the received light is directed to a receiver in a manner similar to the transmitter operating in reverse.

An OPA light emitting component may be formed of a plurality of inputs, a Gaussian splitter, an array of path-matched arm waveguides which are configured so that the phase delay of light within each of the arm waveguides can be controlled, and emitters. Light is provided to the inputs and transmitted to the environment by the emitters.

Another way to scan in a LiDAR system is to transmit light of a plurality of different wavelengths through an element that directs light dependent on its wavelength (for example, a DOE and/or grating emitter(s)). By 'sweeping' through the plurality of wavelengths, the amount of steering affected by the element will change and so the light will be transmitted at a range of angles in the field of view. The beams then interact with the environment to be imaged and are then collected by the imaging component. The resolution of this scanning method is determined by the angular separation between the directions in which sequential wavelengths in the plurality of wavelengths. This may be determined by the number of different wavelengths used if each different wavelength is utilised for one emission angle. The different wavelengths used may be a series with a constant change in wavelength between consecutive beams. The different wavelengths may be sent in any order. The diffraction angle (steer angle) is a function of the wavelength and the design of the element(s). The element(s) may be designed according to the resolution and field of view requirements of the application of the LiDAR system.

Further, a system can utilise both the OPA and wavelength sweeping methods; one to scan a polar angular range and the other to scan an azimuthal angular range of the field of view. In the examples described below, one or more 1D OPAs are used to scan the polar angular range of the field of view and wavelength sweeping is used to scan the azimuthal angular range of the field of view, but it will be appreciated that in other embodiments the system can be rotated, for example, so that OPA(s) are used to scan the azimuthal angular range of the field of view and wavelength sweeping may be used to scan the polar angular range of the field of view.

It may be desirable to accommodate multiple beams in the system to enable quicker scanning of the field of view by simultaneous processing of multiple beams. Multiple different wavelengths of light may be sent simultaneously and/or multiple beams may be transmitted from the OPA transmitter.

A problem exists with the use of an OPA receiver as the receiving area may be approximately 0.5 mm×0.5 mm which may be too small as it will not collect enough light to close the optical link budget. Particularly if there is a maximum amount of light that may be transmitted (e.g. due to safety regulations), it may be important to collect a high proportion of the light transmitted. In order to increase the collection area, (for example, to about 10×10 mm for scanning a 200 m range), a collection lens (say 10 mm diameter) could be provided on top of the OPA receiver(s). However, this has various significant problems as illustrated in FIG. 1.

For example, as shown in FIG. 1, unless the transmitted and received beams point straight ahead, the received image (e.g. spot of light, which may have expanded to fill the collection lens) may miss the receiver OPA aperture. In addition, to avoid parallax problems, ideally the receiver aperture is coaxial with the transmitter which would require using the transmitter in reverse as the receiver. However, use of the transmitter as the receiver in reverse generates great losses in the PIC so is not desirable. The lens size and magnification needed to achieve the desired collection efficiency is also much larger than the mode of the waveguides used to capture the light into the PIC, resulting in long working distances (lens to PIC distance) and so implementations that may be thicker than practical.

FIGS. 3A and 3B illustrate how optics of this type for a PIC receiver could be designed. FIG. 3B provides a solution for a PIC receiver including an OPA with an optical collection gain of ~2.8×10$^6$ ((10 mm/6 μm)$^2$), but the height of the optics would be on the order of 50 mm thick (focal distance+lens thickness+DOE thickness+free space) which may not be practical for most 3D imaging applications because it may be advantageous for them to be compact. The system of FIG. 3A is also thicker than may be practical.

In a first aspect, some embodiments of the invention provide an imaging component for receiving light, the imaging component comprising a photonic integrated circuit, PIC, receiver, a slab, a wedge, and a lens the wedge having a front surface and an opposing back surface, the imaging component arranged to define a receiving optical path through the front surface of the wedge, the receiving optical path continuing through the wedge and through the slab to the PIC receiver, the lens being configured to focus light of the receiving optical path onto the PIC receiver.

Using the geometry of the wedge and slab, the optical path through the imaging component can be collapsed so that the imaging component can be made thinner. Using the wedge and slab arrangement, light can be directed into a waveguide based received receiver (e.g. in a coherent receiver in systems such as FMCVV) while controlling the phase front of the collected light so as to get high coupling efficiency into the waveguides. In systems that are purely based on detecting the power of the reflected light, the phase of the reflected light does not need to be maintained through the receiving collection optics, but when the reflected light is to be coupled into a PIC waveguide the phase front of the collected light may need to be controlled so as to get high coupling efficiency into the waveguides. Advantageously, a wedge and slab arrangement is suitable for either application.

The imaging component may be a LiDAR component for receiving light.

The wedge may have a thick end and an opposing thin end, and the slab may extend from the thick end of the wedge, wherein the wedge has a length from the thick end to the thin end and the slab has a length from an end proximal to the thick end of the wedge to the end distal from the wedge. Received light can reflect from the back surface of the wedge via total internal reflection or due to the use of a high reflection coating and is directed towards the slab.

In this specification, a front surface is a surface of a component that is closest to the environment to be imaged. A back surface opposes the front surface, so that it is located on the opposite side of a component to the front surface (i.e. the back surface is furthest away from the environment to be imaged). Thickness is measured in the direction from the front surface to the back surface in a direction normal to the plane of the front surface. Width is measured in a direction perpendicular to the thickness and perpendicular to the direction in which the thickness of the wedge changes. Length is measured in the direction in which the thickness of the wedge changes.

In some embodiments, the wedge and slab are integrally formed as a single component.

The length of the wedge may be between 50% and 150% of the length of the slab.

A combined length is the length of the slab plus the length of the wedge and the combined length may be between 20 mm and 40 mm.

The PIC receiver may be located at an end of the slab distal from the wedge.

The PIC receiver may be located behind a back surface of the slab, and an end surface at the end of the slab distal from the wedge may form an angle of less than 90 degrees with a back surface of the slab such that the receiving optical path exits the back surface of the slab towards the PIC receiver. Embodiments described herein may be used in LiDAR systems such as a frequency modulated continuous wave (FMCVV) system or a time of flight (ToF) system. Where ToF is used, the PIC receiver(s) may comprise one or more single photon avalanche diodes (SPADs) and where FMCW is used, the PIC receiver(s) may comprise one or more coherent receivers.

A thickness of the wedge between the front surface the back surface at the thick end of the wedge may be between 0.5 mm and 2 mm.

The back surface of the wedge may be coated with a high reflection coating. This means that received light does not rely on total internal reflection to be retained in the wedge at the back surface and so the angle of inclination of the back surface of the wedge from the front surface of the wedge can be smaller. The high reflection coating may be a metal or a multilayer coating.

The front surface of the wedge may be coated with an anti-reflection coating. This improves coupling of received light into the wedge.

The slab and/or the wedge may be formed of a material having a refractive index of 2 or greater, or in some embodiments, 3 or greater.

The back surface of the wedge may be inclined from the front surface of the wedge by between 8 and 9 degrees, and in some embodiments, 8.4 degrees. This is a suitable angle for use with materials of a high refractive index, for example, silicon using a high reflection coating.

The receiving optical path may cross at least 90% of the front surface of the wedge. Providing a receiving optical path from a large proportion of the front surface of the wedge to the PIC receiver allows sufficient light to be collected. The remainder of the front surface of the wedge may be used, for example, for providing a transmitting optical path.

Receiving optical lengths over which an incoming beam will travel in the wedge and slab may be defined between each point on the front surface of the wedge and the PIC receiver and wherein the imaging component is configured so that the receiving optical lengths are equal. Optical lengths that differ by less than the focal depth of the lens used in the system are considered equal.

The PIC receiver may comprise one or more receiver optical phased arrays (OPAs).

The slab may overlie the receiver OPA(s) on the photonic integrated circuit.

The wedge and/or the slab may be formed of silicon or germanium.

The imaging component has a lens configured to focus light on the PIC receiver. The lens may be located in front of the front surface of the wedge. The lens may be provided between the front surface of the wedge and a diffractive optical element or a diffractive optical element may be located between the front surface of the wedge and the lens.

Additionally or alternatively, a lens may be located at the back surface of the slab at an end of the slab distal from the wedge and may be formed of one or more microlens(es). The, or one of the lens(es), may be provided between the slab and the PIC receiver. The lens may be integrated into the wedge and/or slab and/or diffractive optical element.

The lens or lenses may be circular, elliptical or cylindrical or the lens may be formed of an array of micro lenses. The array of micro lenses may be integrated into the bottom surface of the slab and may be formed by etching the bottom surface of the slab. One or more further lenses may also be provided having any of the above properties. The PIC receiver may have one or more input waveguides and each microlens may be configured to focus light on a respective input waveguide.

The imaging component may have a diffractive optical element at the front surface of the wedge, such that the receiving optical path extends through the diffractive optical element, through the front surface of the wedge, through the wedge and the slab to the PIC receiver.

Some embodiments of the invention provide an imaging component for receiving light, the imaging component comprising a photonic integrated circuit, PIC, receiver, a slab and a wedge, the wedge having a front surface and an opposing back surface, the imaging component arranged to define a receiving optical path through the front surface of the wedge, the receiving optical path continuing through the wedge and through the slab to the PIC receiver. Any of the above describes features of the first aspect may be combined with these embodiments.

The wedge arrangement of some embodiments of the invention means that the thickness of the optics can be dramatically reduced when compared with the examples in FIGS. 1, 3A and 3B. The wedge, the slab, any lenses and/or diffractive optical elements provided, function to focus, concentrate and shift the received light while maintaining the phase front such as to provide good coupling into PIC waveguides of a receiver.

The receiver and transmitter may be spatially separated. In prior art systems, it may not be possible to locate the receiver and transmitter PICs close enough together to avoid parallax effects. By implementing the wedge and slab arrangement, receiving and transmitting optical circuits can be spatially separated whilst avoiding parallax problems. The receiver and the transmitter may remain on a single die or may be located on separate dies. Further, this arrangement can enable the coupling of received light into the receiver PIC waveguides whilst retaining the phase of the light. This may be advantageous for some applications, such as FMCW and PMCW LiDAR systems.

Using the wedge and slab, an example of which is shown in FIGS. 6A and 6B, received light is directed out of the path of the transmitted light path, while still maintaining the received and transmitted light coaxial at the surface where the light is transmitted to/received from the environment being scanned (a circular example of a coaxial arrangement on the surface of a transceiver that transmits and receives the light to/from the environment is shown in FIG. 2).

Throughout the specification, where the term coaxial is used, it refers to the arrangement of the receiving and transmitting optical paths at the surface where light is received from and/or transmitted to the environment to be scanned and means that the transmitting optical path is located in a gap in the center of the receiving optical path at this surface.

In a second aspect, some embodiments of the invention provide a LiDAR transceiver comprising an imaging component for receiving light, and a PIC transmitter, the imaging component comprising:

a photonic integrated circuit, PIC, receiver, a slab, a wedge, and a lens, wherein the wedge has a front surface and an opposing back surface and the imaging component is arranged to define a receiving optical path through the front surface of the wedge, the receiving optical path continuing through the wedge and through the slab to the PIC receiver, the lens being configured to focus light of the receiving optical path onto the PIC receiver; and the transceiver arranged to define a transmitting optical path from the transmitter, through the wedge and through the front surface of the wedge.

The wedge may comprise a transmitting window through which the transmitting optical path passes, the transmitting window may have optical characteristics configured to allow light to enter the wedge at the back surface, pass through the wedge and exit the wedge at the front surface.

The back surface of the wedge may have a high reflection coating and the transmitting window may be located at a gap in the coating. The gap in the coating may filled with a coating with different optical properties to the high reflective coating.

The high reflection coating may be a metal or a multilayer coating.

The transmitting window may be a hole formed through the wedge from the back surface to the front surface. The hole may be an air-filled physical hole through the wedge, or the hole may be filled with a material other than the material forming the wedge.

At the front surface of the wedge, a cross-sectional area of the receiving optical path may be 20 to 200 times greater than a cross-sectional area of the transmitting optical path, or in some embodiments, 100 times greater.

The transmitter may be configured such that, at the front surface of the wedge, the transmitting optical path is located in the centre of the front surface of the wedge. The receiving optical path may surround the transmitting optical path. In this way, parallax error can be avoided by ensuring that the transmitted and received light are coaxial.

Alternatively, the transceiver may be arranged to define a transmitting optical path from the transmitter to the environment to be imaged that does not pass through the wedge.

The transmitter may comprise a transmitter OPA.

The transmitter may comprise one or more grating emitters configured to steer an azimuthal component of the angle of the light by an amount dependent on the wavelength of the light.

The transmitter OPA may be located on a photonic integrated circuit and the wedge may overlie the transmitter OPA on the photonic integrated circuit.

The transmitter may be located behind the back surface of the wedge.

The transceiver may have a diffractive optical element at the front surface of the wedge, such that the receiving optical path extends through the diffractive optical element, through the front surface of the wedge, through the wedge and the slab to the PIC receiver and the transmitting optical path extends from the transmitter, through the wedge, through the front surface of the wedge and through the diffractive optical element.

In a third aspect, some embodiments of the invention provide a LiDAR transceiver for scanning an environment over a field of view, FOV, the FOV having an azimuthal angular range and a polar angular range, the LiDAR transceiver comprising a photonic integrated circuit, PIC, receiver, a PIC transmitter and a diffractive optical element, DOE, the DOE having a front surface and a back surface, the DOE comprising: a transmitting region configured to transmit, from the front surface of the DOE, a beam of light received at the back surface of the DOE, a receiving region configured to steer the azimuthal component of light incident on the front surface of the DOE by an amount dependent on wavelength and transmit the light from the back surface of the DOE, wherein the receiving region is distributed on two opposing sides of the transmitting region, and the transceiver is configured to: transmit light from the PIC transmitter through the transmitting region of the DOE and emit the light to the environment, the light having an emission angle with an azimuthal component within the azimuthal angular range of the FOV and a polar component within the polar angular range of the FOV, the azimuthal component of the emission angle being dependent on wavelength of the light, receive the light from the environment, direct the light through the receiving region of the DOE from the front surface to the back surface and to the PIC receiver, and wherein the receiving region of the DOE is configured such that when the light is transmitted from the back surface of the DOE, the azimuthal component is independent of the wavelength of the light. In other words, the azimuthal component of the light transmitted from the back surface of the receiving region is independent of the azimuthal component of the light when it is received at front surface of the receiving region.

The transceiver may further comprise a lens configured to focus the light on the PIC receiver.

The two opposing sides of the transmitting region may be orthogonal to the front and back surfaces of the DOE. The transmitting region may be sandwiched between two portions of the receiving region, such that the transmitting region is between two portions of the receiving region. The transmitting region may be surrounded by the receiving region so that the transmitting region is at an inner part of the DOE and the receiving region is located at an outer part of the DOE surrounding the transmitting region.

In this specification, steering a beam means controlling or changing the angle/direction in which the beam is travelling. Steering may be dependent or independent of wavelength.

The PIC transmitter may comprise grating emitters configured to steer the azimuthal component of the angle of the light by an amount dependent on the wavelength of the light.

The transmitting region of the DOE may be further configured to steer the azimuthal component of the angle of the light dependent on the wavelength of the light.

The transmitting region of the DOE may be further configured to split light received at the back surface of the DOE into a plurality of beams and to transmit each of the plurality of beams from the front surface of the DOE at different respective azimuthal angle.

The transceiver may further comprise one or more further PIC receivers and the receiving region of the DOE is configured to steer each of the plurality of beams to a respective one of the PIC receivers.

The receiving region may comprise a plurality of sub regions, each of the sub regions being configured to steer a respective one of the plurality of beams to its respective receiver.

The transmitting region may be located in the centre of the diffractive optical element and the receiving region may surround the transmitting region.

The lens may be located between the DOE and the PIC receiver. The lens may be located at the front surface of the DOE.

The lens and the DOE may be integrally formed by a single component having focusing and diffractive features.

The lens may comprise a lens transmitting region and a lens receiving region, wherein the lens receiving region is distributed on two opposing sides of the lens transmitting region. The lens transmitting region may be located in the centre of the lens and the lens receiving region may surround the lens transmitting region. The lens transmitting and receiving regions may have differing optical properties. The lens transmitting region and lens receiving region may align with the transmitting and receiving regions of the DOE respectively.

The receiving region may include at least 90% of the front surface of the DOE.

The LiDAR transceiver may further comprise a slab and a wedge, the wedge having a front surface and an opposing back surface, the transceiver arranged to define a receiving optical path through the front surface of the wedge, the receiving optical path continuing through the wedge and through the slab to the PIC receiver, the lens being configured to focus light of the receiving optical path onto the PIC receiver the transceiver arranged to define a transmitting optical path from the transmitter, through the wedge and through the front surface of the wedge.

The transceiver may be configured to transmit light from the PIC transmitter along the transmitting optical path through the wedge and through the front surface of the wedge and transmit the light through the transmitting region of the DOE transmitting region of the DOE. To achieve this, the transmitting region of the DOE may be aligned with the transmitting optical path in the wedge.

In a fourth aspect, some embodiments of the invention may provide a LiDAR transceiver for scanning an environment over a field of view, FOV, the FOV having an azimuthal angular range and a polar angular range, the LiDAR transceiver comprising a photonic integrated circuit, PIC, receiver, a PIC transmitter, a slab, a wedge, a lens and a diffractive optical element, DOE, the wedge having a front surface and an opposing back surface and the DOE having a front surface and a back surface, the DOE comprising: a transmitting region configured to transmit, from the front surface of the DOE, a beam of light received at the back surface of the DOE, a receiving region configured to steer the azimuthal component of light incident on the front surface of the DOE by an amount dependent on wavelength and transmit the light from the back surface of the DOE, wherein the receiving region is distributed on two opposing sides of the transmitting region, and the transceiver is configured to: transmit light from the PIC transmitter along a transmitting optical path through the wedge and through the front surface of the wedge, transmit the light through the transmitting region of the DOE and emit the light to the environment, the light having an emission angle with an azimuthal component within the azimuthal angular range of the FOV and a polar component within the polar angular range of the FOV, the azimuthal component of the emission angle being dependent on wavelength of the light, receive the light from the environment, direct the light through the receiving region of the DOE from the front surface to the back surface and along a receiving optical path through the front surface of the wedge, the receiving optical path continuing through the wedge and through the slab to the PIC receiver, the lens being configured to focus light of the receiving optical path onto the PIC receiver, and wherein the receiving region of the DOE is configured such that when the light is transmitted from the back surface of the DOE, the azimuthal component is independent of the wavelength of the light. In other words, the azimuthal component of the light transmitted from the back surface of the receiving region is independent of the azimuthal component of the light when it is received at front surface of the receiving region.

An imaging component according to the first aspect may further comprise a diffractive optical element of the third aspect, the diffractive optical element being positioned at the front surface of the wedge such that the receiving optical path extends through the diffractive optical element, through the front surface of the wedge, through the wedge and the slab to the PIC receiver.

A LiDAR transceiver according to the second aspect may further comprise a diffractive optical element of the third aspect, the diffractive optical element at the front surface of the wedge such that the receiving optical path extends through the diffractive optical element, through the front surface of the wedge, through the wedge and the slab to the PIC receiver and the transmitting optical path extends from the transmitter, through the wedge, through the front surface of the wedge and through the diffractive optical element.

These combinations of features and aspects above may have additional advantages. For example, the use of a DOE as described in the third aspect with a transceiver as described in the second aspect may reduce the parallax error of the system as both the transmitting optical path and the transmitting region of the DOE are located very close or overlap with their receiving counterparts. The wedge allows the separation of the receiver and the transmitter while allowing the transmitting optical path and the receiving optical path to both pass through the front surface of the wedge and the receiving region of the DOE is distributed on two opposing sides of the transmitting region, so the areas for receiving and transmitting light overlap. The combination of these two features therefore act to further reduce the parallax error.

In order to sample a large FOV with a detailed resolution, a great number of angles need to be sampled. It may be difficult to control a light emitting component over enough discrete angles. For example, for a FOV covering 90 degrees using an OPA with a beam width of 0.1 degrees at perpendicular emission, 810 beams can be created to cover the FOV. This number is less than $90°/0.1°=900$ as the beam width increases with the steering angle, $\theta$, at a rate inversely proportional to $\cos\theta$ (hence the beam width is approximately 0.14° at the extreme angles ±45° of the FOV). Producing 810 beams from a Gaussian emitter envelope profile, truncated at 99% of the power may be achieved with 912 waveguide emitters at 1.1 μm spacing. A Gaussian OPA is optimal for side lobe suppression and truncation of the Gaussian at 99% is a good balance between minimizing insertion loss, beam broadening, and side lobe degradation on one side and number of emitters on the other side. This is a size that has been demonstrated but demands many phase shifter elements to control simultaneously, as shown in FIG. 15. The number of phase shifters means that control of the system is complex.

In another aspect, the invention may provide a LiDAR transmitter photonic integrated circuit (PIC) for scanning an environment over a field of view, FOV, the FOV having an azimuthal angular range and a polar angular range, the LiDAR transmitter PIC comprising: a light source for providing light from at least one laser, an optical switch having an input and a plurality of outputs, the optical switch being configured to selectively direct light received at the input to one of the plurality of outputs, and a light emitting component having a plurality of inputs and a plurality emitters, the light emitting component configured to selectively emit beams over a plurality of emission angles having different respective polar components within the polar angular range of the FOV, wherein the light source is coupled to the input of the optical switch and each of the plurality of outputs of the optical switch is coupled to a respective one of the plurality of inputs of the light emitting component.

In this way the optical switch can be used for coarse steering of the light by directing light to one of the plurality of inputs of the light emitting component and the light emitting component can be used to fine tune the direction in which the light is emitted. This arrangement enables scanning of a direction of a FOV with reduced optical loss and allowing simple switching elements to be cascaded together to reduce the size of components and reduce the complexity of steering light across the FOV. The plurality of inputs to the light emitting component means that less steering (e.g. phase shifting) is required within the light emitting component, thereby reducing the complexity.

The emitters may be equally spaced.

The transmitter PIC may further comprise a plurality of optical splitters, each optical splitter having an input and a plurality of outputs and being configured to split light received at the input between the plurality of outputs, wherein each of the outputs of the optical switch is coupled to a respective input of the optical splitters, and each of the outputs of each of the optical splitters is coupled to a respective one of the inputs of the light emitting component.

In this way, multiple beams can be simultaneously transmitted to enable quicker scanning of the field of view by simultaneous processing of multiple beams. The beams may be distinguished at the receiver spatially. The angle of incidence may be converted to a receiver waveguide by optics in front of a receiver waveguides. The use of splitters with a light emitting component that has multiple inputs means that beams having different emission angles may be emitted simultaneously using one light emitting component.

The light emitting component may comprise at least one optical phased array (OPA), the or each optical phased array configured to selectively emit beams at one or more of the plurality of emission angles.

The light emitting component may comprise a plurality of OPAs and each of the plurality of inputs of the light emitting component comprises an input to one of the plurality of OPAs and each of the plurality of emitters of the light emitting component may comprise an output of one of the plurality of OPAs. The light emitting component may comprise twelve OPAs. In this way, each of the plurality of OPAs may be configured to each correspond to a respective sub range of the polar angular range, such that the OPA which emits the light determines the sub range of polar angles in which light may be emitted from the light emitting component. This reduces the amount of phase shift needed in the OPA as coarse steering of the light effectively takes place in the optical switch which selects the OPA. Then each OPA only needs to direct light over a narrower sub-range of polar angular components of the FOV.

The or each OPA may have more than one input. For example, the or each OPA may have eight inputs. In this way, each input of the OPA may correspond to a respective sub range of the polar angular range over which the OPA emits light, such that the input at which light arrives at the OPA determines the sub range of polar angles in which light may be emitted from the light emitting component. This means that less phase shifting is required in the OPA as coarse steering of the light has taken place in the optical switch and the OPA deals with fine steering only.

The light emitting component may have at least 900 emitters, for example 912. As discussed above, around 900 emitters is sufficient for a FOV of around 90 degrees and a beam width of 0.1 degree measured perpendicularly. Each OPA may have an equal number of emitters. Each OPA may have seventy-eight emitters. The or each OPA may be configured to be capable of selectively emitting light at sixty-eight discrete polar angular components. The emitters may be spaced between 1 and 2 µm apart, or 1.1 µm apart.

The or each OPA may be configured to emit light with a beam width of between 0.5 and 2 degrees, or of no more than 1.2 degrees, when light emitted perpendicularly from the OPA is measured.

Outputs of more than one of the plurality of optical splitters may be alternately coupled to the inputs of the, or one of the OPA(s) such that no two adjacent inputs of said OPA are coupled to the same output of the optical switch. The number of outputs of each optical splitter may be half of the number of inputs to the or each OPA and outputs from two optical splitters may be alternately coupled to the inputs of one of the OPAs. In this way, the beams emitted simultaneously can be separated by a greater angle so that they are more easily distinguished between at the receiver.

Each optical splitter may have four outputs. The four outputs of a first one of the optical splitters and the four outputs of a second one of the optical splitters may each be coupled to a respective one of eight inputs of one of the OPAs in an alternate arrangement, such that no two adjacent inputs of the OPA are coupled to the same optical splitter.

Two optical splitters may be formed by a combined optical splitter comprising a first input and a second input and an array of eight outputs, wherein light from the first input and light from the second input are directed to alternate outputs in the array of eight outputs, such that no two adjacent outputs receive light from the same input.

The optical switch may have 24 outputs. The optical switch may comprise one or more of:
- a 1×2 Mach-Zehnder switch having one input and two outputs, and/or
- a 1×3 Mach-Zehnder switch, having one input and three outputs and/or
- a 1×4 Mach-Zehnder switch, having one input and four outputs and/or
- an OPA switch comprising an input, an array of arm waveguides and a plurality of outputs, the OPA switch being configured to selectively shift the phase of light in the arm waveguides, the amount of phase shift applied being dependent on the arm waveguide in which the light is travelling, so as to selectively direct light to one of the outputs.

The optical switch may comprise:
- 23 1×2 Mach-Zehnder switches arranged in a tree, or
- a 1×3 Mach-Zehnder switch and 21 1×2 Mach-Zehnder switches arranged in a tree, or
- a 1×4 Mach-Zehnder switch and 3 1×6 OPAs, or
- a 1×24 OPA switch.

The LiDAR transmitter PIC may be configured to emit a plurality of beams simultaneously. The LiDAR transmitter PIC may be configured to emit four beams simultaneously.

The or each OPA of the light emitting component may further comprise an array of arm waveguides, and one or more phase shifters configured to shift the phase of light in the arm waveguides, the amount of phase shift applied being dependent on the arm waveguide in which the light is travelling. The phase shift may vary linearly across the array of arm waveguides. The phase shifter(s) may be one or more heaters. The one or more heaters may be configured to apply heat to a respective length of each respective one of the arm waveguides in the array, the respective lengths varying across the array of arm waveguides. The respective lengths may vary linearly and/or continuously across the array of arm waveguides. Each of the one or more heaters may have the shape of a triangle. A triangle shape includes any shape which increases in length (in the direction of the arm waveguides) across the array. For example, a substantially triangular shape such as a rounded triangle where one or more of the corners of the triangle are rounded or a three sided shape where one or more of the sides are curved in a concave or convex manner.

The light source may comprise a plurality of lasers, each laser being configured to produce light of a respective different wavelength within a range of wavelengths and the emitters may be grating emitters configured to steer light having a wavelength in the range of wavelengths to a respective azimuthal angular component. Additionally, or alternatively to the grating emitters, a diffractive optical element (DOE) may be provided separately to the PIC to steer the light based on wavelength. Alternatively, the light source may be an input waveguide that is suitable for connecting to one or more external lasers.

The light source may also provide a local oscillator, LO, output which may be connectable to a receiver PIC to thereby provide an LO source.

The azimuthal angular range may be smaller than the polar angular range. The transmitter may be oriented so that varying the polar component scans the vertical direction and varying the azimuthal component scans the horizontal direction. The orientation of the transmitter may be selected according to the application.

The transmitter PIC may be configured to simultaneously produce light of a plurality of the respective different wavelengths in the range of wavelengths and the grating emitters may be configured to split the light. As discussed above, the steering and/or splitting of light based on wavelength may be provided by grating emitters and/or a separate DOE.

The light source may further comprise a plurality of modulators, each configured to modulate light from a respective one of the plurality of lasers. The or each laser may be tunable over a respective sub-range of wavelengths, within the range of wavelengths. The or each laser may be thermally tunable. The or each laser may be tunable at intervals between 2 and 5 nm, or tunable at 3 nm intervals. Each laser may comprise a ring resonator. Alternatively, the light source may be an input waveguide that is suitable for connecting to one or more external lasers and modulators described above.

A diffractive element a the receiver may steer the received light based on wavelength in the opposite manner to the transmitter grating emitters/DOE, so encoding in the emitted light may be used so that the receiver can determine which azimuthal angle the received light originates from. Modulation in the light may be provided to allow distance calculation at the receiver. This encoding may also allow simultaneous beams of different wavelengths to be differentiated using encoding or a trace signal. A trace signal is an out of band modulation which may be added to the beam so that the origin of the beam can be identified without impacting the transmitted application signal. This can indicate origin in the azimuthal or polar directions or both. For example, in Dense Wavelength Division Multiplexing (DWDM) systems a low frequency (kHz) tone of different frequency is added to each wavelength, such that the wavelength can be identified by monitoring the frequency of that tone.

The light source may comprise thirty-two lasers and the thirty-two lasers may be provided by four, eight-lane die.

The transmitter PIC may further comprise: a second optical splitter, the second optical splitter having an input and a plurality of outputs and being configured to split light received at the input between the plurality of outputs, and one or more further light emitting component(s), the or each further light emitting component having a plurality of inputs and a plurality of emitters, the further light emitting component comprising at least one OPA, the or each OPA configured to selectively emit beams over a plurality of emission angles having different respective polar components within the polar angular range of the FOV and wherein the light emitting component and the or each further light emitting component are configured to each selectively emit beams over different respective sub ranges of azimuthal angular components, wherein the input to the second optical splitter is coupled to the light source, and a first one of the outputs of the second optical splitter is coupled to the inputs of the light emitting component and the or each other output(s) of the second optical splitter is coupled to the inputs of respective further light emitting component(s). In this way the azimuthal angular range can be split between light emitting components so that each light emitting component only needs to cover a narrower range of azimuthal angles. Where the azimuthal components are steered dependent on different wavelengths of light, this may reduce the range of wavelengths required, thereby simplifying manufacture of these elements. Each light emitting component may operate over a sub range of azimuthal angular components which may be steered by optics so that together, the light emitting components cover the entire azimuthal angular range of the FOV.

The LiDAR transmitting component may further comprise an air-to-air grating configured to create multiple beams of each wavelength emitted, each of the beams having a different azimuthal angular component.

The azimuthal angular sub ranges may be 15 degrees wide. There may be two further light emitting components, so that there are three light emitting components each configured to selectively emit beams over a respective one of three sub azimuthal ranges. Each of the sub azimuthal ranges may have a width of 15 degrees and may be each separated by 15 degrees so that together, they cover an azimuthal range of 45 degrees.

The LiDAR transmitting component may further comprise an angular magnification optic to increase the azimuthal component of the emission angles. The magnified azimuthal range may be 45 degrees wide. In this way, the grating emitters and/or DOE may emit beams over a smaller azimuthal angular range which is then magnified by the optic to cover the azimuthal angular range of the FOV. Where the azimuthal components are steered dependent on different wavelengths of light, this may reduce the steering angle over which grating emitters and/or DOE need to act, thereby simplifying manufacture of these elements.

Some embodiments of the invention may provide a LiDAR transmitting component comprising a LiDAR transmitter PIC and a first optic configured to convert light emitted from each OPA from a first polar angular range emitted by the OPA to a second polar angular range, the second polar angular range being smaller than the polar angular range of the FOV, and a second optic configured to steer the light from each OPA by a respective polar steering angle. The steering angles may be ±yn, where n is an integer number and y is the size of the second polar angular range. The first polar angular range may be ±45 degrees, and/or the second ran polar angular range may be ±3.75 degrees. The polar angular range of the FOV may be the same as the first polar angular range and/or may be ±45 degrees.

In another aspect, some embodiments of the invention may provide a LiDAR receiver PIC comprising: a light steering component having a plurality of input waveguides and a plurality of outputs, a local oscillator, LO, source, providing one or more LO signals, an optical switch having an input and a plurality of outputs, the optical switch being configured to selectively direct light received at the input to one of the plurality of outputs, and a plurality of coherent receivers, each having a signal input and a LO input and at least one photodetector, wherein the LO source is coupled to the input of the optical switch and each of the outputs of the optical switch is coupled to a respective one of the LO inputs, and wherein each of the outputs of the light steering component are coupled to a respective one of the signal inputs.

In an analogous way to the transmitter described above, this arrangement of a receiver enables the optical switch to be used for coarse steering by selecting the coherent receiver to be used meaning that the light steering component can provide less steering of the light as the incoming light can be directed to the appropriate one of the plurality of outputs. This arrangement enables scanning of a direction of a FOV with reduced optical loss and allowing simple switching elements to be cascaded together to reduce the size of components and reduce the complexity of steering light across the FOV. The plurality of outputs to the light steering component means that less steering (e.g. phase shifting) is required within the light steering component, thereby reducing the complexity.

The input waveguides may be equally spaced. The light steering component may comprise an optical phased array, OPA.

The light steering component may comprise a plurality of OPAs and each of the plurality of input waveguides of the light steering component may comprise an input to one of the plurality of OPAs and each of the plurality of outputs of the light steering component may comprise an output of one of the plurality of OPAs. The light steering component may comprise twelve OPAs. In this way, each of the plurality of OPAs may be configured to each correspond to a respective sub range of the polar angular range, such that the OPA which receives the light determines the sub range of polar angles which light arriving at the light steering component may have originated from. This reduces the amount of phase shift needed in the OPA as coarse steering of the light effectively takes place in the optical switch which selects the OPA. Then each OPA only needs to direct light received from a narrower sub-range of polar angular components of the FOV.

Each OPA may have an equal number of inputs. The or each OPA may have seventy-eight input waveguides. The or each OPA may have more than one output. In this way, each output of the OPA may correspond to a respective sub range of the polar angular range over which the OPA receives light, such that the output at which light is directed to by the OPA determines the sub range of polar angles at which light may have originated from. This means that less phase shifting is required in the OPA as coarse steering of the light effectively takes place in the optical switch and the OPA deals with fine steering only. The or each OPA may have eight outputs. The or each OPA may be configured to receive light from sixty eight discrete angles in the first plane. The input waveguides may be spaced between 1 and 2 μm apart, or the input waveguides may be spaced 1.1 μm apart.

The LiDAR receiver PIC may further comprise a plurality of optical splitters, each optical splitter having an input and a plurality of outputs and being configured to split light received at the input between the plurality of outputs, wherein each of the outputs of the optical switch is coupled to a respective input of one of the optical splitters, and each of the outputs of each of the optical splitters is coupled to a respective one of the LO inputs of one of the coherent receivers.

In this way, multiple beams can be simultaneously received to enable quicker scanning of the field of view by simultaneous processing of multiple beams. The beams may be distinguished at spatially. The angle of incidence may be converted to a receiver waveguide by optics in front of a receiver waveguides. The use of splitters with a light steering component that has multiple outputs means that beams having different angles of incidence may be received and processed simultaneously using one light steering component.

Each optical splitter may have four outputs. Two optical splitters may form a combined optical splitter comprising a first input and a second input and an array of eight outputs, wherein light from the first input and light from the second input are directed to alternate outputs in the array of eight outputs, such that no two adjacent outputs receive light from the same input. In this way, the beams received simultaneously can be separated by a greater angle so that they are more easily distinguished between.

Each coherent receiver may comprise a pair of multimode interference components, MMI, each MMI having one of the LO inputs and one of the signal inputs of the coherent receiver and both MMIs in the pair outputting to one or more common photodetectors, wherein the two LO inputs in the pair are each coupled to different outputs of the optical switch.

The optical switch may comprise one or more of:
- a 1×2 Mach-Zehnder switch having one input and two outputs, and/or
- a 1×3 Mach-Zehnder switch, having one input and three outputs and/or
- a 1×4 Mach-Zehnder switch, having one input and four outputs and/or
- an OPA switch, comprising an input, an array of arm waveguides and a plurality of outputs, the OPA switch being configured to selectively shift the phase of light in the arm waveguides, the amount of phase shift applied being dependent on the arm waveguide in which the light is travelling, so as to selectively direct light to one of the outputs.

The optical switch may have twenty-four outputs and the optical switch may comprise:
- 23 1×2 Mach-Zehnder switches arranged in a tree, or
- a 1×3 Mach-Zehnder switch and 21 1×2 Mach-Zehnder switches arranged in a tree, or
- a 1×4 Mach-Zehnder switch and 3 1×6 OPAs, or a 1×24 OPA switch comprising an input, an array of arm waveguides and 24 outputs, the OPA switch being configured to selectively shift the phase of light in the arm waveguides, the amount of phase shift applied being dependent on the arm waveguide in which the light is travelling, so as to selectively direct light to one of the outputs.

The or each OPA of the light steering component may further comprise an array of arm waveguides, and one or more phase shifters configured to shift the phase of light in the arm waveguides, the amount of phase shift applied being dependent on the arm waveguide in which the light is travelling. The phase shift may vary linearly across the array of arm waveguides. The phase shifter(s) may be one or more heaters. The one or more heaters may be configured to apply heat to a respective length of each respective one of the arm waveguides in the array, the respective lengths varying across the array of arm waveguides. The respective lengths may vary linearly. Each of the one or more heaters may have the shape of a triangle or a rounded triangle.

In another aspect, some embodiments of the invention may provide a LiDAR transceiver comprising a LiDAR transmitter PIC as described above and a LiDAR receiver PIC as described above.

The LiDAR transmitter PIC and/or the LiDAR receiver PIC may be provided on a photonic chip.

The LiDAR transmitter PIC and the LiDAR receiver PIC may be provided on the same monolithic photonic chip.

The LO source may be supplied by the light source. The LO source may be modulated or unmodulated. Receiving the LO source from the light source is a simple way of ensuring that the LO source is coherent with the received light in the receiver.

The light source may comprise a plurality of lasers, each laser being configured to produce light of a respective different wavelength within a range of wavelengths and the emitters may be grating emitters configured to steer light having a wavelength in the range of wavelengths to a respective azimuthal angular component, and the transmitter PIC may be configured to simultaneously produce light of a plurality of the respective different wavelengths, the transceiver being configured such that the signal input and the LO input to each coherent receiver carry light of the same wavelength within the range of wavelengths.

The light source may be configured to encode the light such that light of each respective wavelength has a different respective code. Each respective code may be a chirp or an amplitude modulation. Alternatively, the light source may be an input waveguide that is suitable for connecting to one or more external lasers and/or modulators as described above.

The LiDAR transceiver may further comprise: a first optic configured to convert light emitted from each OPA to a second polar angular range, the second polar angular range being smaller than the polar angular range of the FOV, and a second optic configured to steer the light from each OPA by a respective polar steering angle. The polar steering angles may be ±ny, where n is an integer number and y is the size of the second polar angular range. The polar angular range of the FOV may be ±45 degrees, and/or the second polar angular range may be ±3.75 degrees.

A LiDAR receiver may comprise a LiDAR receiver PIC as described above and, a slab and a wedge, the wedge having a front surface and an opposing back surface, the imaging component arranged to define a receiving optical path through the front surface of the wedge, the receiving optical path continuing through the wedge and through the slab to the PIC receiver. A LiDAR transceiver may comprise such a LiDAR receiver and a LiDAR transmitter PIC as described above, the transceiver arranged to define a transmitting optical path from the transmitter, through the wedge and through the front surface of the wedge. The PIC receiver may be located behind a back surface of the slab, and an end surface at the end of the slab distal from the wedge may form an angle of less than 90 degrees with a back surface of the slab such that the receiving optical path exits the back surface of the slab towards the PIC receiver.

Additionally, or alternatively, a lens may be located at the back surface of the slab at an end of the slab distal from the wedge and may be formed of one or more microlens(es). The, or one of the lens(es), may be provided between the slab and the PIC receiver. The lens may be integrated into the wedge and/or slab and/or diffractive optical element.

The lens or lenses may be circular, elliptical or cylindrical or the lens may be formed of an array of micro lenses. The array of micro lenses may be integrated into the bottom surface of the slab and may be formed by etching the bottom surface of the slab. One or more further lenses may also be provided having any of the above properties. The PIC receiver may have one or more input waveguides and each microlens may be configured to focus light on a respective input waveguide.

The imaging component may have a diffractive optical element at the front surface of the wedge, such that the receiving optical path extends through the diffractive optical element, through the front surface of the wedge, through the wedge and the slab to the PIC receiver.

Using the geometry of the wedge and slab, the optical path through the LiDAR receiver can be collapsed so that the imaging component can be made thinner. Using the wedge and slab arrangement, light can be directed into a waveguide based received receiver while controlling the phase front of the collected light may so as to get high coupling efficiency into the waveguides. In systems that are purely based on detecting the power of the reflected light, the phase of the reflected light does not need to be maintained through the receiving collection optics, but when the reflected light is to be coupled into a PIC waveguide the phase front of the collected light may need to be controlled so as to get high coupling efficiency into the waveguides. Advantageously, a wedge and slab arrangement is suitable for either application.

The wedge arrangement of some embodiments of the invention means that the thickness of the optics can be dramatically reduced. The wedge, the slab, any lenses and/or diffractive optical elements provided, function to focus, concentrate and shift the received light while maintaining the phase front such as to provide good coupling into PIC waveguides of a receiver.

Further, in prior art systems, it may not be possible to locate the receiver and transmitter PICs close enough together to avoid parallax effects without using a wedge. By implementing the wedge and slab arrangement, receiving and transmitting optical circuits can be spatially separated whilst avoiding parallax problems. The receiver and transmitter may be spatially separated. They may remain on a single die or may be located on separate dies. Further, this arrangement can enable the coupling of received light into the receiver PIC waveguides whilst retaining the phase of the light. This may be advantageous for some applications, such as FMCW and PMCW LiDAR systems.

Using the wedge and slab, an example of which is shown in FIG. 33, received light is directed out of the path of the transmitted light path, while still maintaining the received and transmitted light coaxial at the surface where the light is transmitted to/received from the environment being scanned.

According to another aspect, some embodiments of the invention may provide a LiDAR transmitter photonic integrated circuit (PIC) for scanning an environment over a field of view, FOV, the FOV having an azimuthal angular range and a polar angular range, the LiDAR transmitter PIC comprising: a light source, an optical switch having an input and a plurality of outputs, the optical switch being configured to selectively direct light received at the input to one of the plurality of outputs, and a light emitting component having a plurality of inputs and a plurality of emitters, the light emitting component configured to selectively emit beams over a plurality of emission angles having different respective polar components within the polar angular range of the FOV, wherein the light source is coupled to the input of the optical switch and each of the plurality of outputs of the optical switch is coupled to a respective one of the plurality of inputs of the light emitting component, such that the optical switch and the light emitting component form a switch matrix, and the switch matrix is configured to select the polar component of the emission angle of light, the polar component being within the polar angular range.

Using the switch matrix means that a high switching speed between points to be sampled can be achieved using a combination of slow and fast switching elements. For example, if the light emitting component is a slow switching element and the optical switch is a fast switch, a fast switching speed of the overall switch matrix can still be achieved as portions of the slow light emitting component can be switching while other portions of the light emitting component are emitting light. In this way, portions of the light emitting component that are not emitting light can use the sample time(s) of the portions of the light emitting component that are emitting light to switch without affecting the overall switch time between emission angles.

For example, for a simple case of four emission angles and two inputs of the light emitting component, the optical switch can direct light to a first input of the light emitting component corresponding to a first portion of the light emitting component which emits at the first emission angle, whilst the second portion is switching to the second emission angle. Then the optical switch can direct light to the second input of the light emitting component causing light to be emitted in the second emission angle while the first portion of the light emitting component switches to the third emission angle. Then the optical switch can direct light to the first input of the light emitting component causing light to be emitted in the third emission angle while the second portion of the light emitting component switches to the fourth emission angle. Then the optical switch can direct light to the second input of the light emitting component causing light to be emitted in the fourth emission angle while the first portion of the light emitting component switches back to the first emission angle. In this way, the switching time of the overall matrix is the switch time of the optical switch (which is a fast switch) and the slow switching of the light emitting component does not slow down sampling the FOV.

In the case where the optical switch is slow and the light emitting component is fast, the switch will stay in a first position for a time (N $t_{pixel}$+N $t_{lec}$) where N is the number of pixels sampled by the light emitting component while the switch is in the first position. Then the optical switch will switch over a time $t_{switch}$. So, the efficiency of the system is high because the number of slow switches is reduced. The efficiency will be (N $t_{pixel}$+N $t_{lec}$)/(N $t_{pixel}$+N $t_{lec}$+$t_{switch}$), so if $t_{switch}$<<N$\times t_{pixel}$ then the efficiency of the system is high.

Where the OPA light emitting components and/or switches include phase shifters that are heaters, the switch time of the OPA may be determined by the time required for the heaters to be reconfigured from one set of phase shifts to another. This may cause the OPA switch to be a slow switch as the heaters may switch slowly due to the time taken for heat to build up or dissipate.

The optical switch may be a faster switch than the light emitting component, or the optical switch may be a slower switch than the light emitting component. A fast switch may be a switch which has a switch time smaller than a pixel time. The pixel time being a length of time which the LiDAR transmitter spends sampling any particular point in the FOV. The switch time of an element is the time taken for the element to reconfigure from one output to another of its outputs.

The transmitter may be configured to scan an array of emission angles and transmits light to each of the emission angles for a pixel time, $t_{pixel}$, and the optical switch may be capable of switching between outputs in a switch time, $t_{switch}$ and $t_{pixel}$>$t_{switch}$.

The transmitter may be configured to scan an array of emission angles and transmit light to each of the emission angles for a pixel time, $t_{pixel}$, and the optical switch may be capable of switching between outputs in a switch time, $t_{switch}$ and $t_{pixel}$>$t_{switch}$.

The transmitter may be configured to scan an array of emission angles and transmit light to each of the emission angles for a pixel time, $t_{pixel}$, and the light emitting component may be capable of switching between polar components in a time, $t_{lec}$ and $t_{pixel}$>$t_{lec}$.

The transmitter may be configured to scan an array of emission angles and transmit light to each of the emission angles for a pixel time, $t_{pixel}$, and the light emitting component may be capable of switching between polar components in a switch time, $t_{lec}$ and $t_{pixel}$<$t_{lec}$.

The light emitting component may be configured such that each input of the light emitting component corresponds to a respective sub range of the polar angular range, such that the input at which light arrives at the light emitting component determines the sub range of polar angles in which light may be emitted from the light emitting component.

The light emitting component may comprise at least one optical phased array (OPA), the or each optical phased array being configured to selectively emit beams at one or more of the plurality of emission angles.

The light emitting component may comprise a plurality of sub light emitting components, each sub light emitting component having one or more of the plurality of inputs of the light emitting component and each sub light emitting component corresponding to a respective sub range of the polar angular range, such that the sub light emitting component at which light arrives determines the sub range of polar angles in which light may be emitted from the light emitting component.

The optical switch may be configured to direct light to sub light emitting components sequentially, such that each sub light emitting component receives light for a respective time $t_{on}$ and then does not receive light for a respective time $t_{off}$, wherein for each sub light emitting component, $t_{off}$≥$t_{lec}$.

Each sub light emitting component may be configured such that each input of the sub light emitting component corresponds to a respective sub range of the polar angular range, such that the input at which light arrives at the sub light emitting component determines the sub range of polar angles in which light may be emitted from the light emitting component.

Each sub light emitting component may be an OPA.

The LiDAR transmitter PIC may further comprise a plurality of optical splitters, each optical splitter having an input and a plurality of outputs and being configured to split light received at the input between the plurality of outputs, wherein each of the outputs of the optical switch is coupled to a respective input of the optical splitters, and each of the outputs of each of the optical splitters is coupled to a respective one of the inputs of the emitting component.

The optical switch may be a fast switch and the light emitting component may be a slow switching element. The optical switch may be a slow switch and the light emitting component may be a fast switching element.

The light emitting component may comprise one or more phase shifters which may be one or more heaters. The light source may be formed of at least one laser.

According to another aspect, some embodiments of the invention may provide a LiDAR system comprising a first scanning stage for scanning in a first dimension and a second scanning stage for scanning in a second dimension, the first scanning stage comprising tuning and/or refractive optics; and the second scanning stage comprising a liquid crystal.

The invention includes the combination of the aspects and preferred features described above except where such a combination is clearly impermissible or expressly avoided.

For example, the optional features of the first, second and/or third aspects may be combined with the fourth aspect. Any of the features or combinations of features of the imaging component of the first aspect may be combined with a transceiver according to any of the second, third or fourth aspects. Further the LiDAR transmitter and/or receiver and/or transceiver PICs and/or any of their optional features may be combined with any features of the first four aspects.

SUMMARY OF THE FIGURES

Embodiments and experiments illustrating the principles of the invention will now be discussed with reference to the accompanying figures in which:

FIG. 10A shows a perspective view of the DOE and FIG. 10B shows a section view of the DOE.

FIG. 11A shows a perspective view of the DOE and FIG. 11B shows a section view of the DOE.

FIG. 12(i) shows a schematic diagram of a DOE according to some embodiments of the present invention illustrating the creation of three beams from each beam arriving at the DOE.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 4:
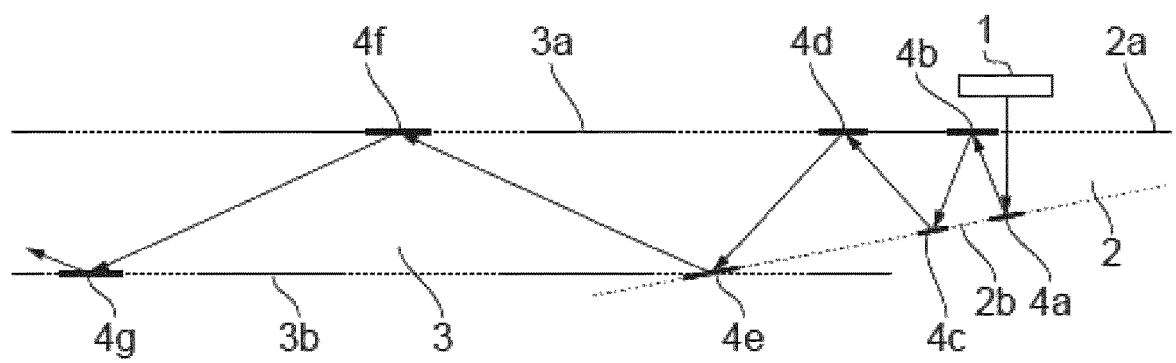
FIG. 4 shows a schematic diagram showing the principle of the use of a wedge and a slab to collect light.

The effect of the wedge and slab will now be explained in more detail. FIG. 4 is a theoretical example illustrating the effect produced in a wedge 2 and slab 3 with a series of mirrors 4a-4g which may be analogous to the situation in a wedge and slab of a receiving/imaging component.

The light beam indicated by the arrows in FIG. 4 is incident on the lens and grating 1 and enters the wedge 2 at the front surface 2a of the wedge and travels to the back surface 2b where it reflects off of mirror 4a. Back surface 2b of the wedge is inclined from the front surface 2a, so when the beam is reflected from mirror 4a, the beam is directed towards the slab which extends from the thicker end of the wedge. After reflecting from mirror 4a, the beam travels back through the wedge 2 to the front surface 2a where it reflects off of mirror 4b and then travels through the wedge 2 and slab 3 reflecting from mirrors 4c, 4d, 4e, 4f and 4g on the front 2a, 3a and back surfaces 2b, 3b of the wedge and slab.

As the incident beam reflects off the sequence of mirrors which are not parallel to each other, the beam angle with respect to the perpendicular to the top surface is increased, and the beam is shifted and is able to traverse a long working distance. This principle can be implemented using three long continuous mirrors (instead of a sequence of discrete mirrors) on the front and back surfaces of the wedge 2 and slab 3.

In a wedge and slab in an imaging/receiving component, the mirrors of the theoretical example in FIG. 4 are formed by the front and back surfaces of the wedge 2 and slab 3. The surfaces 2a, 2b, 3a, 3b may reflect light using total internal reflection (TIR) or one or more of the surfaces may be coated with a high reflection (HR) coating.

TIR may be used in place of the mirror on the front surface 2a of the wedge so as to allow light to enter the wedge. The front surface 2a of the wedge 2 may have an anti-reflection (AR) coating to improve the coupling of light into the wedge. The light is then retained in the wedge 2 because, when the light returns to the front surface, the angle of incidence on the front surface 2a has been increased by the reflection from the inclined back surface 2b of the wedge. Depending on the materials and angles used, TIR can also be used on one or more of the other surfaces 2b, 3a, 3b. For example, a HR coating on the front and back surfaces 3a, 3b of the slab can be omitted where TIR acts to retain the light in the slab.

The wedge and slab structure allows external light incident to be coupled into the wedge but then trapped in the wedge and slab as it hits the front surface of the wedge at increasing angles with the normal with the angle exceeding the critical angle for TIR.

If the bottom angled mirror is HR coated (does not rely on TIR), then the wedge angle may equal at least half the TIR critical angle for the wedge material to retain light in the wedge. For a bottom surface relying on TIR, the wedge angle may equal at least the TIR critical angle in the wedge material to retain all of the light in the wedge. To enable the wedge to be thin, a small wedge angle may be used, and accordingly an HR coating of the back surface of the wedge may be used as it may lead to a smaller wedge angle and thinner wedge. The wedge front surface may also have a turning film.

Figure 5:
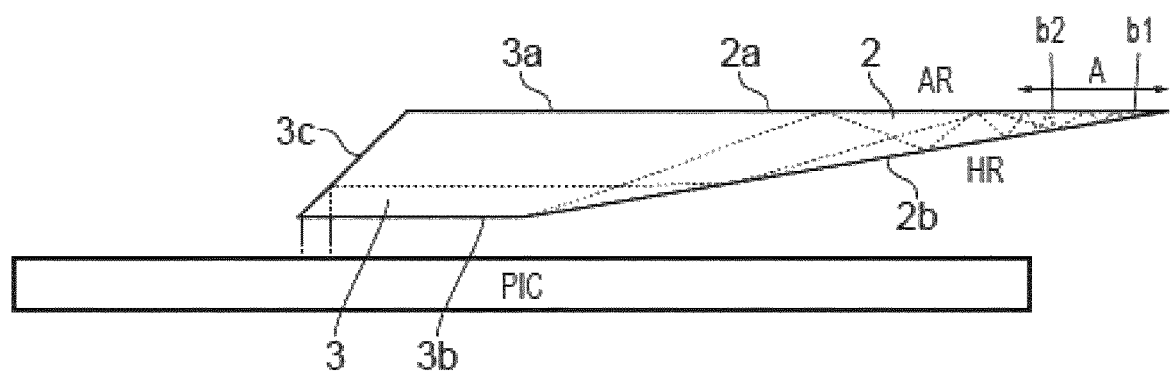
FIG. 5 shows a schematic diagram of an example of a wedge and slab according to some embodiments of the present invention along with a photonic integrated circuit (PIC).

A typical implementation of a wedge is shown in FIG. 5, where the wedge 2 is made of high index material with an index of 2 or greater, (e.g. Si) to create TIR with a small critical angle. The bottom surface 2b is high reflection (HR) coated (for example, metal or multilayer) and the top surface 2a is anti-reflection (AR) coated to allow for all the incident light to transfer into the wedge material. The AR coating does not impact the TIR properties of the interface. For Si the critical angle is around 16.8°, so the wedge angle is around 8.4°. For a capturing aperture A of 10 mm, the wedge thickness grows like the tangent of the wedge angle and is in this case 1.5 mm thick, and as long as 20-40 mm, so use of the wedge and slab collapses a 20-40 mm height that might be required in an arrangement of, for example, FIG. 3B into a 1.5 mm thickness.

As illustrated in FIG. 5, the slab 3 extends from the wedge 2 so that the beams b1 and b2 propagate through the wedge and through the slab. Beam b1 will propagate in the slab 3 at a more horizontal angle, due to multiple reflections of the back surface 2b of the wedge, which upon each reflection creates a beam that propagates closer to horizontal, than beam b2 that propagates in the slab 3 at a steeper angle from the horizontal as it has seen less reflection of the back surface 2b of the wedge. So, beam b1 propagates longer in the wedge 2 but less in the slab 3 (as it is more horizontal) while beam b2 propagates less in the wedge 2 and more in the slab 3. The total propagated distance for a beam b1 entering at the thin side of the wedge may be approximately equal to the total propagated distance for a beam b2 entering on the thick side of the wedge, depending on the lengths of the wedge and the slab. An equal distance in this context means that the difference between the distances is shorter than the focal depth of the lens.

At the end of the slab, the beams reflect from end surface 3c of the slab which is inclined so as to direct the beams towards the back surface 3b of the slab and out of the slab to a PIC. The end surface 3c may be HR coated or may rely on TIR to reflect the beams towards the back surface 3b of the slab. If the back surface 3b of the slab is HR coated, there may be a gap in the HR coating to allow the light reflected from the end surface 3c to pass through the back surface 3c of the slab. Whether the back surface 3b has a HR coating or relies on TIR, an AR coating may be provided on the region of the back surface 3b through which the light passes to the PIC receiver so as to maximize transmission of light through the back surface 3b once it has reflected from the end surface 3c.

When a wedge and slab arrangement are used in a transceiver, received light may travel through the wedge and slab so as to collapse the working distance as discussed above, but this may not be needed for transmitted light where there is no equivalent working distance to collapse. So, transmitted light may travel through the wedge but not the slab. For example, light may follow a transmitting optical path from the PIC transmitter 8, to the back surface of the wedge 2b, through the wedge 2 and out of the front surface of the wedge 2a. This can be seen in FIGS. 6A and 7A. In order to reduce loss of transmitted light, a physical hole can be provided through the wedge 2 or a virtual hole can be provided through the wedge 2, by locally changing the coating of the back surface 2b of the wedge 2 from HR to AR coating where the transmitted beam propagates through the wedge 2.

Figure 6A:
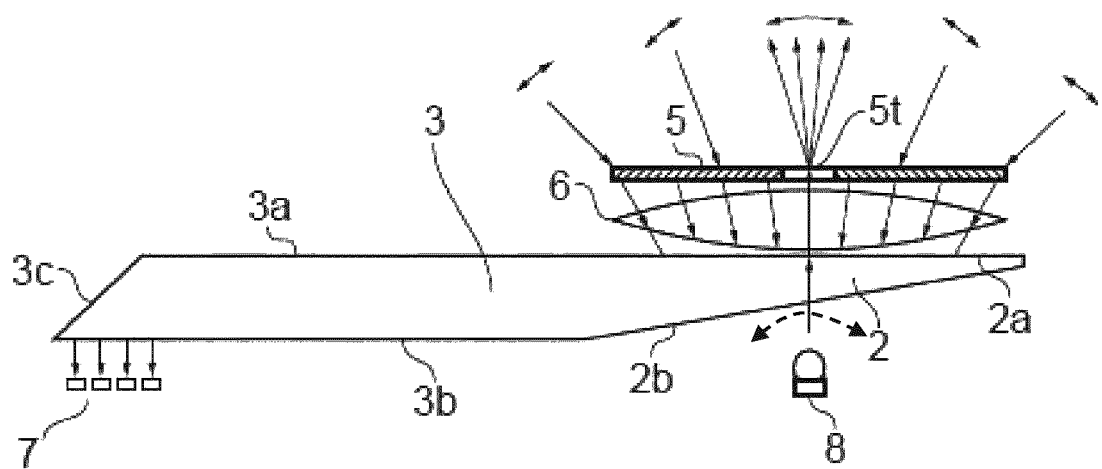
FIG. 6A shows a cross section view and FIG. 6B shows a perspective view of a wedge and slab, lens and diffractive optical element according to some embodiments of the present invention.
Figure 6B:
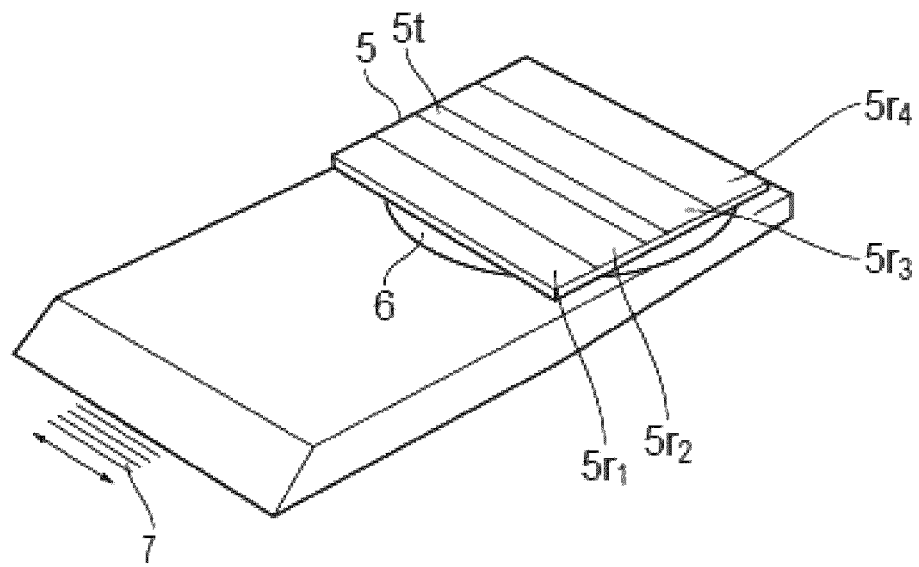

To enable the transmitting and receiving optical paths to be coaxial and thereby to avoid parallax error, the transmitted beam passes through the centre of wedge 2 as shown in FIGS. 6A and 6B.

In other embodiments, the transmitter may be provided separately from the imaging component. In such embodiments, a virtual or real hole in the wedge is not required and consequently there is a reduction in loss of received light in the wedge. In this case, the received light and transmitted light may not be coaxial, and the system may be configured to account for parallax error during processing of the received signal. In these embodiments, the wedge and slab arrangement may act to shift the PIC receiver farther from the PIC transmitter. In these embodiments, the wedge and slab arrangement still provide the advantage that the working distance is collapsed and so the height of the system is reduced.

Use of the wedge and slab in a 3D laser imaging component is illustrated in FIGS. 6A and 6B along with a lens and a DOE. The lens and the DOE will be explained in more detail later. In some embodiments, the DOEs and lenses described herein may be used without the wedge and the slab, for example in applications where the thickness of the transceiver can be large.

In the example shown in FIGS. 6A and 6B, the DOE 5 and lens 6 are mounted on the front surface 2a of the wedge. The transmitter 8 scans the vertical direction, or the azimuthal angular range (in the plane of the page in the cross-section shown in FIGS. 6A and 6B) using wavelength sweeping and scans the horizontal direction, or the polar angular range (plane perpendicular to the page in the cross-section shown in FIGS. 6A and 6B) using the OPA to direct the light. The light follows an optical path from the transmitter 8, through correction optics and then into the wedge 2 at the back surface 2b. The light then travels through the wedge 2 and exits the wedge at the front surface 2a. The light then travels through the lens 6 and DOE 5 where multiple beams of different wavelengths are created in the vertical direction by diffraction, by steering the azimuthal component of the light dependent on its wavelength.

In other examples, a hole in the wedge may be provided so that the transmitted beam does not enter the wedge. In the example in FIGS. 6A and 6B, the transmitting optical path travels though the centre of the front surface of the wedge.

Reflected light from multiple directions arrives at the front surface of the DOE 5 and travels through the DOE 5 and the lens 6 to the front surface 2a of the wedge. Areas of the receiving optical path on the front surface of the wedge in this example are located on opposing sides of the transmitting optical path at the front surface of the wedge in the direction of the length of the wedge, so that on the front surface of the wedge, an area of the receiving optical path is closer to the thin end of the wedge than the transmitting optical path and an area of the receiving optical path is farther from the thin end of the wedge than the transmitting optical path.

The light then travels through the wedge to the back surface 2b where it reflects either due to TIR or due to a HR coating on the back surface. The back surface of the wedge is inclined from the front surface and so directs the light towards the thick end of the wedge and the slab 3 in the manner described above. At the end of the slab distal from the wedge, the light is directed towards the back surface of the slab by the end surface 3c which forms an internal angle of less than 90 degrees with the back surface 3b of the slab. Then, the light exits the slab and travels towards the receiver. In this example, the receiver includes 4 OPAs.

In the example of FIGS. 6A and 6B, the wedge 2 and slab 3 may be made of silicon and the slab 3 is 0.5-2 mm thick. The thickness of the optics from the back surface of the slab to a front surface of the DOE 5 is between 2 and 4 mm. The width of the optics is between 5 and 20 mm, for example between 5 and 10 mm. In other embodiments, different dimensions may be used to suit the application of the transceiver.

Figure 7A:
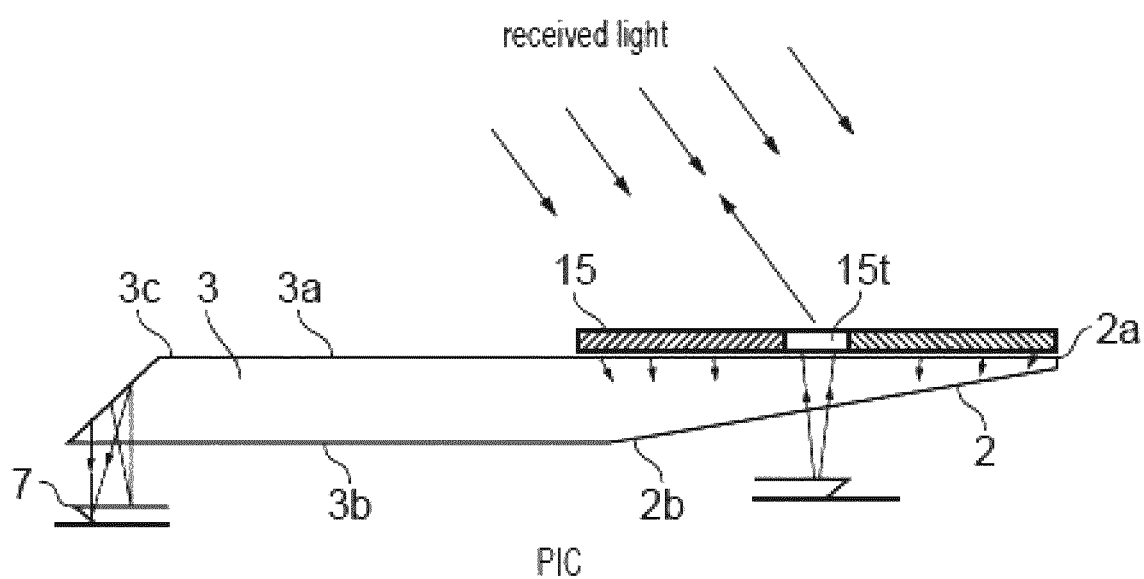
FIG. 7A shows a cross section view of a wedge, slab and diffractive optical element according some embodiments of to the present invention

FIG. 7A shows a similar use of a wedge 2 and slab 3 in 3D laser imaging receiver optics along with a DOE 15. The 3D beam steering in FIG. 7A uses one or more OPAs in a first dimension, being the polar angular range of the FOV and the second dimension, being the azimuthal angular range, is handled by varying the wavelength of the laser light and diffracting from a DOE 15.

FIG. 7A shows a wedge 2 and a slab 3 which are formed as a single integrated component. The end surface 3c of the slab farthest from the wedge forms an internal angle of less than 90 degrees with the back surface 3b of the slab. The end surface 3c may be coated with a HR coating so as to form a mirror. A receiver including four receiver OPAs 7 are located behind the back surface 3b of the slab on a PIC. Transmitter OPA 8 is located behind the back surface 2b of the wedge on the PIC. DOE 15 is located at the front surface 2a of the wedge and has a transmitting region 15t and four receiving regions 15$r_1$, 15$r_2$, 15$r_3$, 15$r_4$. The DOE will be described in more detail below.

In the example of FIG. 7A, the slab and wedge have a height of less than 1 mm, a length of around 20 mm and a width of around 10 mm. The DOE 15 is mounted on the front surface of the wedge 2. The DOE surface is approximately 10 mm×10 mm. In other embodiments, different dimensions may be used to suit the application of the transceiver.

Received light arrives at a front surface of the DOE 15 and passes through the receiving regions 15$r_1$, 15$r_2$, 15$r_3$, 15$r_4$ of the DOE 15 to the front surface 2a of the wedge 2. The light then passes through the wedge to the back surface 2b where it reflects via TIR or due to a HR coating on the back surface. As described above, the light is directed towards the slab due to the inclination of the back surface 2b of the wedge. The light then passes through the wedge 2 and slab 3 and is maintain in the wedge and slab by reflections from the front surfaces 2a and 3a and the back surfaces 2b and 3b of the wedge and slab. When the light reaches the end of the slab that is distal from the wedge, the light reflects from end surface 3c and is directed towards the back surface 3b of the slab 3. The light passes out of the slab 3 to the receiver OPAs 7.

Light to be transmitted passes from the transmitter OPA 8 to the back surface 2b of the wedge and into the wedge. If a HR coating is used on the back surface 2b of the wedge for the purpose of retaining the received light in the wedge, this coating may be absent in the area of the back surface of the wedge through which the light to be transmitted passes so that the light can efficiently pass into the wedge. The light to be transmitted then passes through the wedge 2 to the front surface 2a and out of the wedge. The light then passes through the transmitting region 15t of the DOE and into the environment to be measured.

Figure 9A:
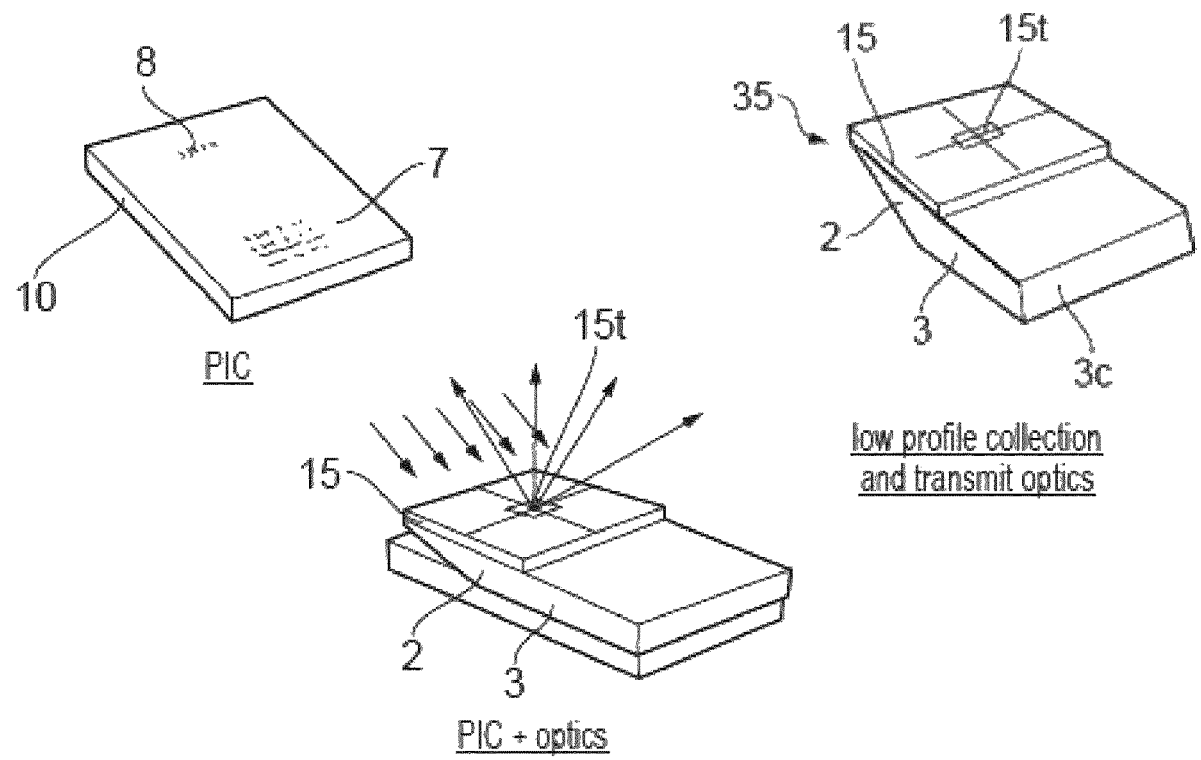
FIG. 9A shows perspective views of a PIC having a transmitter OPA and four receiver OPAs, a perspective schematic view of a wedge and slab and DOE according to some embodiments of the present invention and a perspective view of the wedge, slab and DOE mounted on the PIC.

FIG. 9A shows the use of the wedge and slab on top of a PIC 10 to collect the light, concentrate it and focus onto the receiver OPA(s) 7. PIC 10 includes four receiver OPAs 7 and a transmitter OPA 8. Wedge 2 and slab 3 are located on the PIC so that the wedge 2 overlies the transmitter OPA 8 and the end of the slab overlies the receiver OPAs 7. A DOE 15 is located on the front surface of the wedge 2. DOE 15 is located at the front surface 2a of the wedge and has a transmitting region 15t and four receiving regions. The DOE will be described in more detail below. This arrangement provides low profile collection and transmitting optics.

Received light arrives at a front surface of the DOE 15 and passes through the receiving regions of the DOE 15 to the front surface of the wedge 2 and then through the wedge and slab as described above. When the light reaches the end of the slab that is distal from the wedge, the light reflects from end surface 3c and is directed towards the back surface 3b of the slab 3. The light passes out of the slab 3 to the receiver OPAs 7. In other embodiments, receiver(s) of different types may be used in place of the OPAs 7.

Light to be transmitted passes from the transmitter OPA 8 to the back surface of the wedge and into the wedge. If a HR coating is used on the back surface 2b of the wedge for the purpose of retaining the received light in the wedge, this coating is absent in the area of the back surface of the wedge through which the light to be transmitted passes so that the light can pass into the wedge. The light to be transmitted then passes through the wedge 2 and out of the wedge through the front surface of the wedge. The light then passes through the transmitting region 15t of the DOE and into the environment to be measured.

In this example the transmitter and receiver OPA(s) 8, 7 have corresponding designs, for example, the same number of arm waveguides and corresponding numbers of input and output waveguides. The receiver and transmitter OPAs and could be controlled with the same control elements, for example DACs. They act to transmit/receive in the same direction at the same time i.e. they remain aligned. In this example, the OPA is 1D and handles scanning in the polar angular range. Scanning the azimuthal angular range needs no active control as the wavelength being sent out from the transmitter will be naturally recovered by the same grating at that vertical angle on return to the receiver. The azimuthal angle is encoded in the wavelength.

Figure 9B:
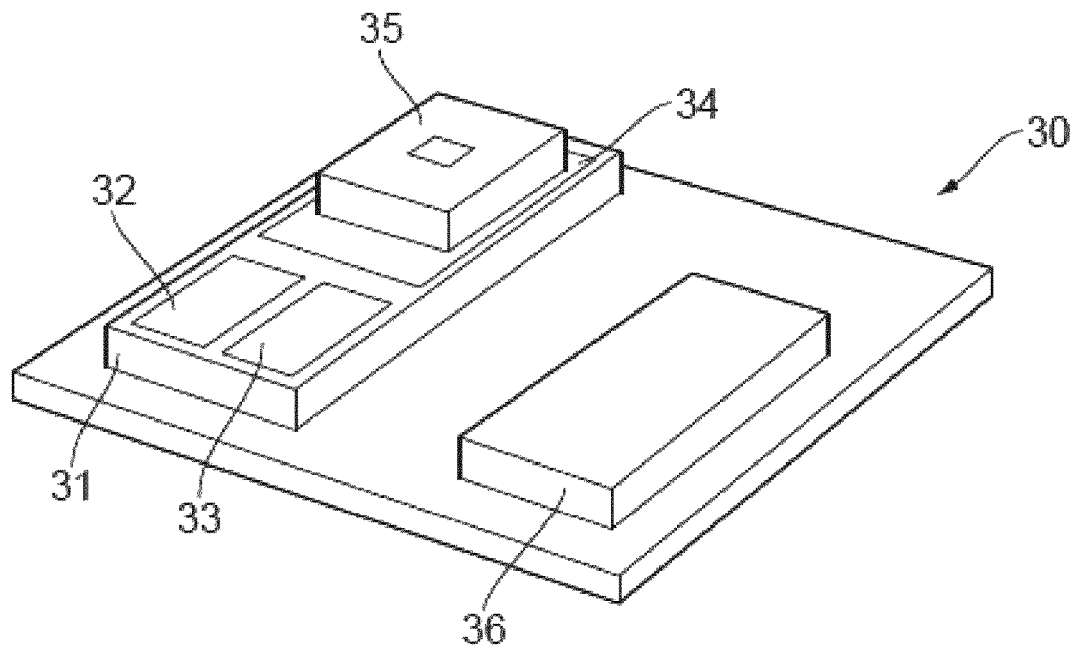
FIG. 9B shows an example arrangement of a chip including a PIC, transmitting and receiving optics and a control device.

FIG. 9B shows an example arrangement of a chip 30 including a PIC 10, transmitting and receiving optics 35 and a control device 36. The PIC 10 has transmitting and receiving blocks 32, 33 and a beam steering and receiving block 34 which includes transmitter and receiver OPAs. The control device 36 may be an electronic integrated circuit (EIC) that may control, drive, receive output from and/or provide data interface for the optical components. The PIC 10 and control device 36 are mounted on a substrate such as a PCB and the transmitting and receiving optics 35 are mounted on the PIC. The transmitting and receiving optics include a slab 3, a wedge 2 and a DOE 15 as shown in FIG. 9A and the wedge overlies the transmitter OPA and the slab overlies the receiver OPA. Light from the transmitter OPA travels through the wedge and DOE and received light travels through the DOE, through the wedge, through the slab and to the receiver OPAs. In this example, 4 receiver OPAs are provided and 1 transmitter OPA is used, but in other examples, the number of OPAs can be selected to match the performance requirements. Further, other types of transmitters and receivers can be implemented depending on performance requirements. The transmitting block 32 on the PIC 10 includes lasers and waveguides to produce the light to be transmitted by the transmitter OPA. The receiving block 33 on the PIC 10 contains the photonic circuit that processes the light received by the receiver OPA. The chip 30 may be around 5 to 10 mm wide, but the dimensions may vary dependent on performance requirements.

Figure 1:
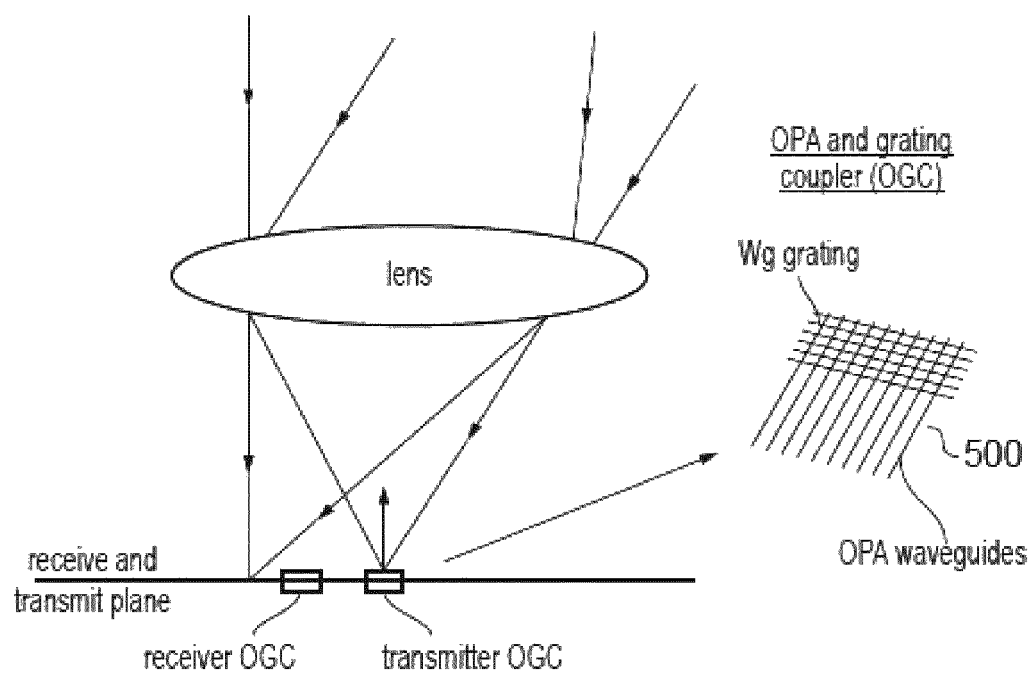
FIG. 1 shows an example of a prior art arrangement of a lens, receiver and transmitter.
Figure 2:
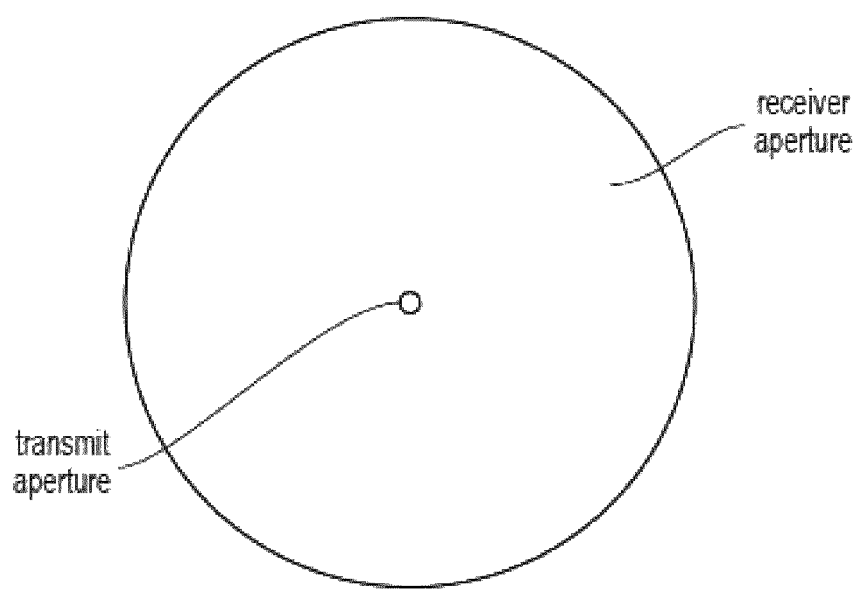
FIG. 2 is a diagram showing a coaxial arrangement of receiving and transmitting apertures.
Figure 3A:
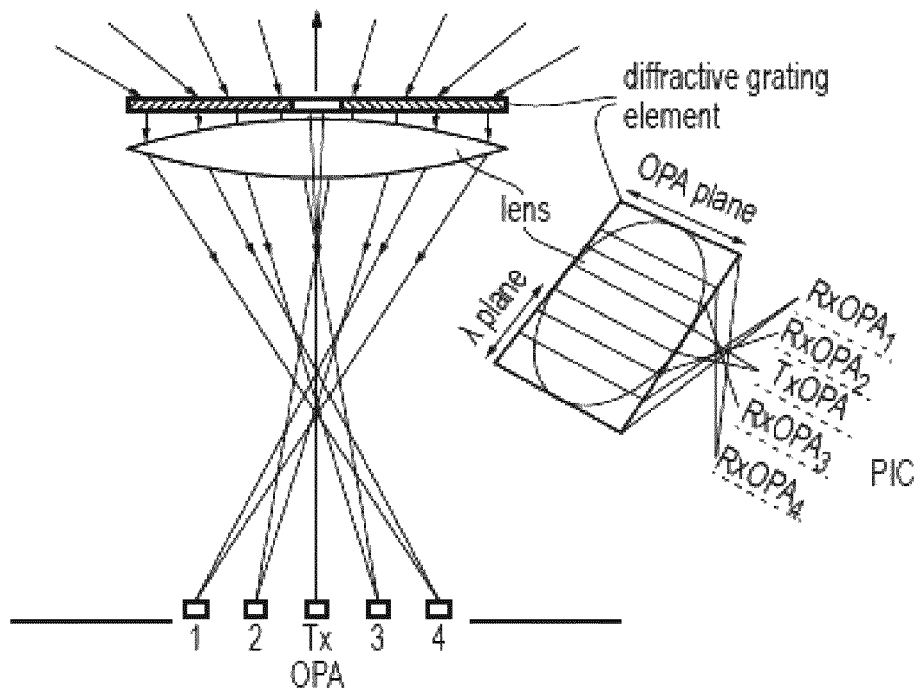
FIG. 3A shows a cross-section view of an arrangement of a diffractive optical element, lens, receiver OPAs and transmitter OPA.
Figure 3B:
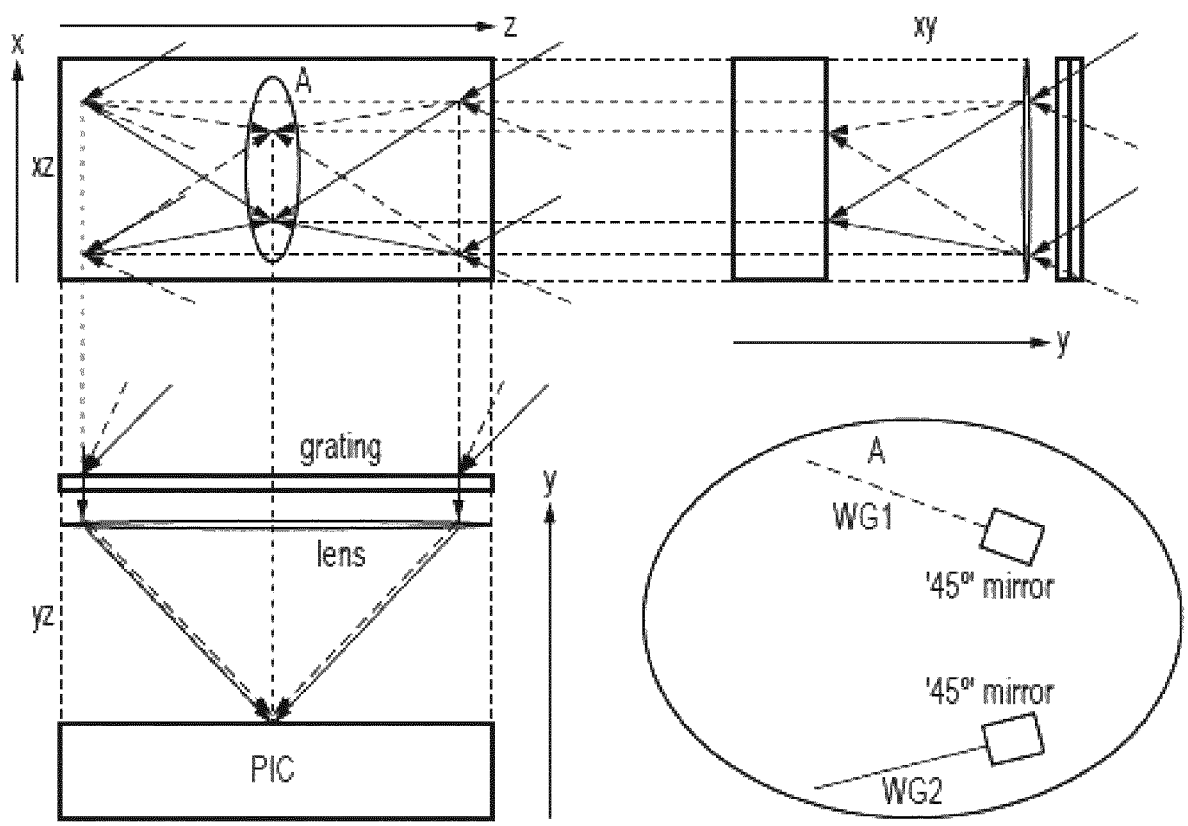
FIG. 3B shows a schematic diagram of receiving optics for steering and focusing received light onto a photonic integrated circuit.

The lenses and DOEs shown in FIGS. 3A and 3B can be applied in combination with the wedge and slab of some embodiments of the invention. The receivers are OPA receivers and the transmitters shown are OPA transmitters, but other types of receivers may be used. The OPAs shown are 1D OPAs, meaning all the waveguide facets are to be on a single line (parallel to the x-axis in FIG. 3B). In FIGS. 3A and 3B a DOE and a lens are used. In the example shown in FIG. 3B the received light passes through the DOE before passing through the lens. Other arrangements of DOE(s) and lens(es) may be used instead of or additionally to those shown according to the requirements of the application (e.g. changes might be made to adjust range or resolution). A solution with the received light passing through the lens first and then the DOE can be considered as well, though the DOE may be more complex in the latter case.

The lens may act to image all the light incident on the lens aperture (~10 mm×10 mm) into a spot size that is optimized for coupling into the PIC waveguide (10 µm×10 µm or smaller). In the xy plane the location of the image of the received light will depend on the incident angle in the xy plane, as indicated by FIG. 3B. Typically, the focal length of a lens of aperture diameter D (e.g. 10 mm) is at least 4× the aperture diameter (or 40 mm in our example. As the received light comes from far enough away for most imaging applications, it can be approximated by a plane wave, and hence the focused image will be at a working distance which for all practical purposes equals the focal length. For the example, the spot size achievable for a lens with D=10 mm and f=40 mm has a FWHM on the order of 5-6 µm (for a wavelength in the 1550 nm range and the spot measured in air).

Figure 7B:
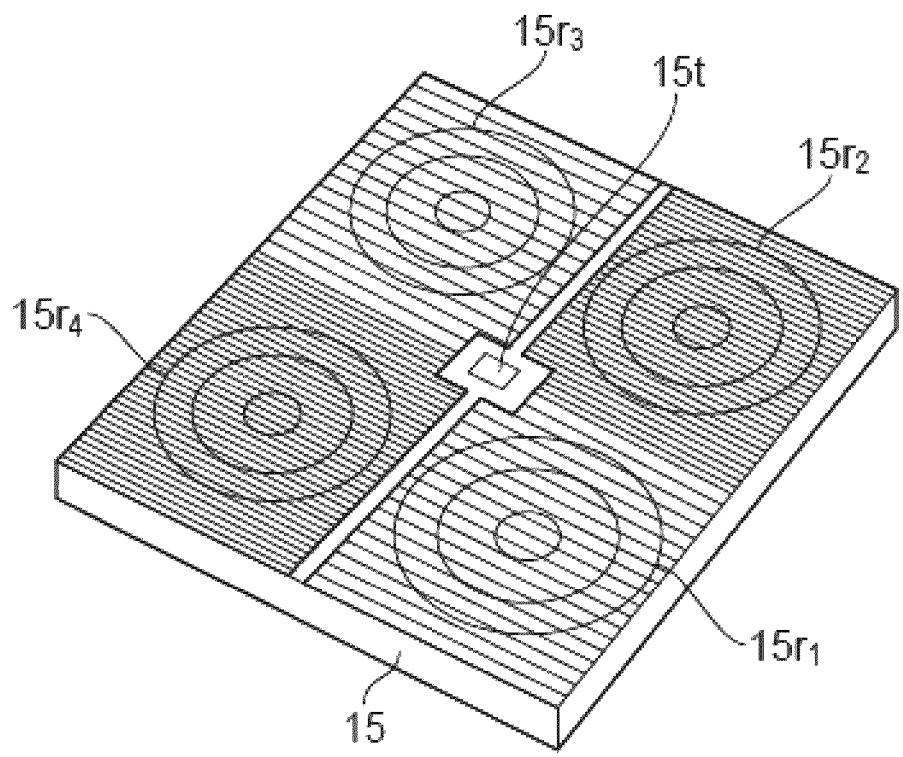
FIG. 7B shows a perspective view of the diffractive optical element.

The lens may be located in front of the wedge front surface as shown in FIGS. 4, 7, 8 and 9A. The lens may be located between a DOE and the front surface of the wedge as shown in FIGS. 6A and 6B, may be integrated with the DOE as shown in FIGS. 4, 7 and 9A or may be located in front of a DOE which is located in front of the front surface of the wedge. When the lens is integrated in the DOE, it may be integrated as a Fresnel lens as shown in FIGS. 7A and 7B.

The lens need not be a circular lens, meaning that, in some embodiments, the focal length in the xy plane is the same as the focal length in the yz plane. One of the 2 focal lengths could even be infinite, resulting in a cylindrical lens that operates either in the yz or the xy plane.

Additionally, another lens, possibly cylindrical or arrays of microlenses, could be used between the back surface of the slab and the receiver. The cylindrical lens could operate along the same dimension of the first lens or the other dimension.

As discussed above, one or more optical components such as DOEs may be provided in the LiDAR system to steer, focus and/or correct light to scan the FOV in the required manner. The receiving region of the DOE may also steer the azimuthal angular component of received light based on the wavelength of the light.

In order to steer light in a LiDAR system having coaxial transmit and receive optical paths, a DOE may be provided having a transmitting region in its centre and a receiving region distributed on opposing sides of the transmitting region. The DOE has a front surface and a back surface opposing the front surface and transmitted light travels through the DOE from the back surface to the front surface and received light travels through the DOE from the front surface to the back surface. The DOE may be formed of more than one individual component. The transmitting region may include an air-to-air grating in order to create multiple beams from one beam from the transmitter. The DOE may also include a lens element and/or correction optics in the transmitting region and/or the receiving region. The diffractive optical elements described here may be produced by 3D laser lithography. The receiving region may be provided by 90% or more of the DOE.

The receiving region steers light received at the front surface of the DOE to an output angle at the back surface of the DOE. The degree of steering of the light is dependent on wavelength.

The receiving region may steer only a component of light dependent on wavelength (plane yz in FIG. 3B), for example, an azimuthal component of the angle of the light. The receiving region may be configured so that the polar component of the angle of the received light (plane xy in FIG. 3B), is constant as the light travels through the DOE. Alternatively, the receiving region may be configured to alter the polar component of the angle independent of the wavelength of light. Alternatively, the receiving region may be configured to alter the polar component of the angle dependent on the wavelength of light.

Figure 10A:
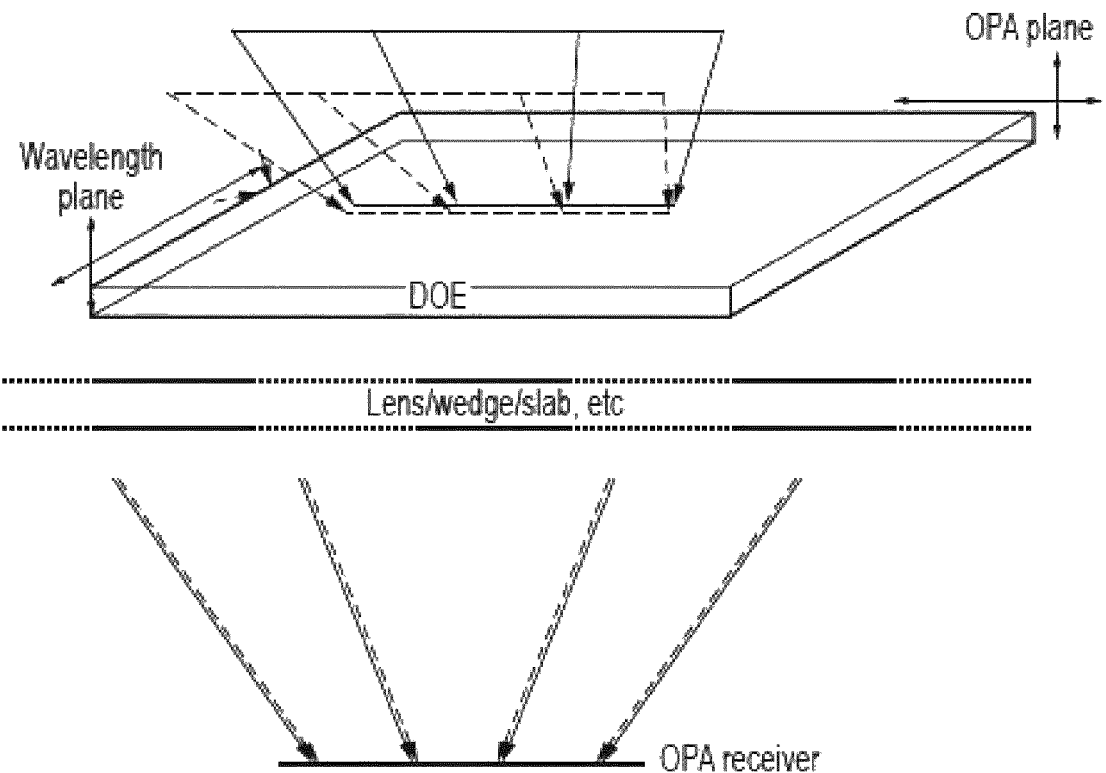
FIGS. 10A and 10B shows a schematic view of a DOE according to some embodiments of the invention showing the steering of beams having two different wavelengths.
Figure 10B:
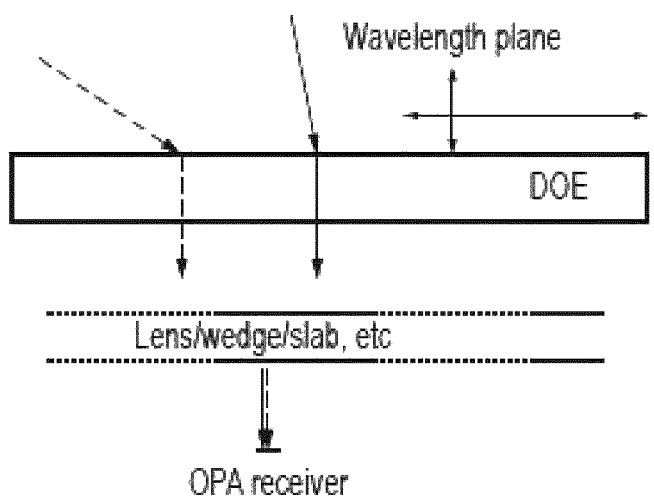

In a LiDAR system using OPA and wavelength sweeping methods to sample the FOV, the azimuthal component of the angle of the transmitted light may be dependent on the wavelength of the light. The light reflects from the environment and the azimuthal component of the angle of the received light is similarly dependent on the wavelength of the light. The receiving region of the DOE is configured to steer the azimuthal component of the received light dependent on wavelength, to cause the received light from across the azimuthal angular range of the FOV to have a common azimuthal angular component so that it can be incident on one 1D OPA receiver as shown in FIGS. 10A and 10B. The receiving region retains the polar component of the angle of the received light as the polar component of the angle of the light is dependent on the OPA steering in the transmitter and not on wavelength. The polar component may be decoded spatially by the OPA receiver. Multiple simultaneous beams from different polar and/or azimuthal angles may be received at the DOE and steered simultaneously dependent on their wavelength.

The transmitting region of the DOE may be configured to steer the azimuthal component of the angle of the light dependent on its wavelength. The transmitted light may alternatively or additionally be steered based on its wavelength by grating emitters in the PIC transmitter. Providing the angular dependence on wavelength using grating emitters in the PIC transmitter may be more efficient than having this function in the DOE. In the transmitting region, the DOE may simply let light travel through the DOE without interaction. The transmitting region may be configured to shape beams travelling from the back surface to the front surface and/or to improve the steering efficiency of the beams and/or correct the angle transmitted light.

The operation of the receiving region of the DOE and lens is illustrated by FIG. 3B and FIGS. 10A and 10B. The top left figure in FIG. 3B shows a view of the DOE, lens and PIC from the field of view. The xz plane is parallel to the front surface of the DOE. The top right figure shows a side cross-sectional view through the DOE, lens and PIC in the second plane (labelled xy) in which light is directed by the OPA in the transmitter. The bottom left view shows a side cross-sectional view through the DOE, lens and PIC in the first plane (labelled yz) in which light is directed dependent on its wavelength. The xy plane shows how the polar component of light is steered and the yz plane shows how the azimuthal component of light is steered.

The dashed arrows depict light arriving at the DOE from a first location in the FOV, with an azimuthal component of W1 and a polar component O1. The solid arrows depict light arriving at the DOE from a second location in the FOV, with an azimuthal component of W2 and a polar component of O2.

As shown in the top right figure, the polar component of the angle of light determines the position in which light arrives at the PIC receiver. The polar angle in the FOV from which the received light originates is encoded in the position on the receiver that the light arrives.

As shown in the bottom left figure, the DOE steers the azimuthal component of the light so that beams have a common output azimuthal angular component. The light is received from different azimuthal incidence angles, that are dependent on the wavelength of the light and the DOE steers the light based on wavelength in a complimentary manner to the PIC transmitter and/or transmitting region of the DOE so that the light of different wavelengths leaves the back surface of the DOE with a common azimuthal angular component. The DOE may include lens features to focus the received light on the receiver(s). In this case, the output azimuthal angular component of the received light from the DOE may depend on the location on the DOE so as to focus light on the receiver, but the output azimuthal angular components are still considered to be common as they are directed to a common receiver.

The lens focuses the light onto the receiver. A wedge and slab may also be provided between the lens and the PIC in the manner described above.

So, both the first and second beams (solid and dashed arrows) arrive at the same receiver on the PIC. The azimuthal component of the angle of incidence of each beam (W1 and W2) does not influence where the beam is received on the PIC. The azimuthal angle in the FOV from which the received light originates is encoded in the wavelength of the light and/or chirps given to the beam in the PIC transmitter.

The azimuthal component of the incident angle (yz plane) corresponds with the wavelength of the light, and the grating in the DOE converts the azimuthal (yz) incident angular component to a single post grating azimuthal angular component independent of wavelength (shown as vertical in FIG. 3B, bottom left figure). As a result, the lens will focus all incident azimuthal angles in the yz plane onto a single line (shown as parallel with x-axis, the axis perpendicular to the yz plane in FIG. 3B).

The grating need not be along z operating in the yz plane, it can operate along x operating in the xy plane. The grating operates in the plane where the steering angle is controlled by the wavelength. When a wedge is used, the direction of the length of the wedge may be in a direction in which the azimuthal angle can be steered. In this way, the DOE may be configured such that the common output azimuthal angular component is at an angle inclined from normal to the front surface of the wedge, and towards the thick end of the wedge so that all light is retained in the wedge. A grating could be used in one direction, while a cylindrical lens is used in the orthogonal direction.

FIGS. 10A and 10B illustrates a receiving region of a DOE showing eight incident beams. FIG. 10A shows a schematic perspective view of a DOE receiving region and receiver and two sets of beams, the sets having different wavelengths to each other and different incident azimuthal angular components, each set having four beams having different polar angular components. FIG. 10B shows a cross-sectional view in which the azimuthal angular components can be viewed.

In FIGS. 10A and 10B, eight beams are simultaneously incident on the DOE. The eight beams cover four different polar angular components (O1, O2, O3, O4) that are governed by the OPA PIC transmitter(s) and two different azimuthal angular (W1, W2) which have been produced by diffraction of beams in the PIC transmitter and/or transmitting region of the DOE (which is not shown for simplicity).

The receiving region of the DOE steers the azimuthal angular components of the beams, dependent on their wavelength so that each of the azimuthal angular components W1, W2 are converted into the same output azimuthal angular component so all of the beams will be directed to the same receiver. The origin of the beams of different wavelength is encoded in the wavelength and/or in encoding produced in the transmitter, so there is no need for spatial separation between the beams of different wavelength in the receiver. The differing polar components are maintained such that beams with different polar components are received at different locations on the OPA receiver and the polar component of the angle of incidence of the received light can be determined in this way.

The receiving region may comprise a plurality of sub regions. Each of the sub regions may be configured to steer light from respective different azimuthal or polar angles of the environment. This may be advantageous because each of the sub regions of the DOE then only needs to handle a narrower range of angles which may ease design of each sub region the DOE. If two sub regions are used, each sub region may be configured to steer light received from a respective half of the FOV.

For example, if four sub regions are provided, and the azimuthal angular range of the FOV is from −90 degrees to +90 degrees from a direction normal to the receiving surface, the first sub region may be configured to steer light received from azimuthal angles between −90 degrees and −45 degrees from normal to the front surface of the DOE, the second sub region may be configured to steer light received from azimuthal angles between −45 degrees and 0 degrees, the third sub region may be configured to steer light received from azimuthal angles between 0 degrees and +45 degrees and the fourth sub region may be configured to steer light received from azimuthal angles between +45 degrees and +90 degrees. Whilst emission angles of +/−90 degrees exactly may not be possible; here we refer to angles that are as close to 90 degrees as possible.

In another example, if four sub regions are provided and the azimuthal angular range of the FOV is from −45 degrees to +45 degrees, the first sub region may be configured to steer light received from azimuthal angles between −45 degrees and −22.5 degrees from normal to the front surface of the DOE, the second sub region may be configured to steer light received from azimuthal angles between −22.5 degrees and 0 degrees, the third sub region may be configured to steer light received from azimuthal angles between 0 degrees and +22.5 degrees and the fourth sub region may be configured to steer light received from azimuthal angles between +22.5 degrees and +45 degrees.

In some embodiments, the transmitting region of the DOE may be configured to split the transmitted light so as to create multiple beams, each one of the multiple beams having a different azimuthal angular component. In these embodiments, when one beam, enters the DOE at the back surface in the transmitting region, multiple beams will leave the front surface of the transmitting region, each having a different azimuthal angular component. This may be advantageous, for example, when a PIC transmitter cannot produce a broad enough range of wavelengths to cover the angular range of the desired FOV. The beam(s) emitted by the grating emitter(s) can each be split into multiple beams travelling in different directions so that the whole of the angular range of the desired FOV can be sampled.

For example, if the PIC grating emitters can emit beams in a 15 degree range of angles, and the desired FOV is 45 degrees wide, the transmitting region of the DOE can be configured to split each beam into three beams, the three created beams being 15 degrees apart. In this way, the whole of the desired FOV can be sampled.

Figure 12:
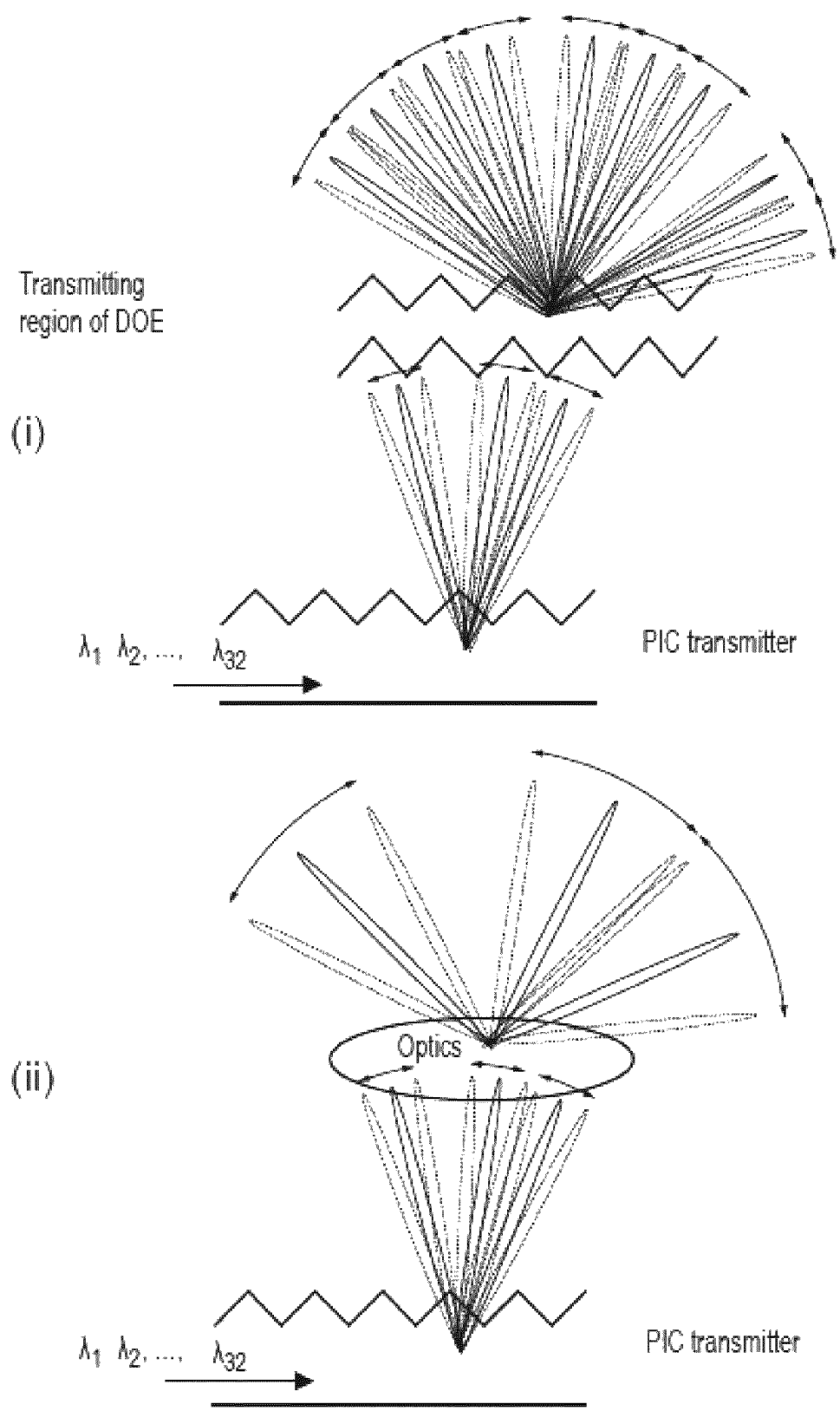
FIG. 12(ii) shows a schematic diagram of a DOE according to some embodiments of the present invention illustrating the spreading of beams over a larger field of view.

This is shown in FIG. 12(*i*) where beams are directed over a first range of azimuthal angles by grating emitters in the PIC transmitter. The beams then arrive at the back surface of the DOE and the DOE creates multiple beams from each beam that travels through the DOE to the front surface, the created beams being directed over a second, larger, range of azimuthal angles. In FIG. 12(*i*), the DOE creates three beams from each beam arriving at the back surface so that the second range of azimuthal angles is three times as wide as the first range of azimuthal angles.

When a DOE is used to create multiple beams of the same wavelength that travel in different directions, these multiple beams may be kept separate when they are received via the receiving region of the DOE. Thus, the receiving region may be configured to steer light of each of the multiple beams of the same wavelength to a different output angle as shown in FIGS. 11A and 11B.

Figure 11A:
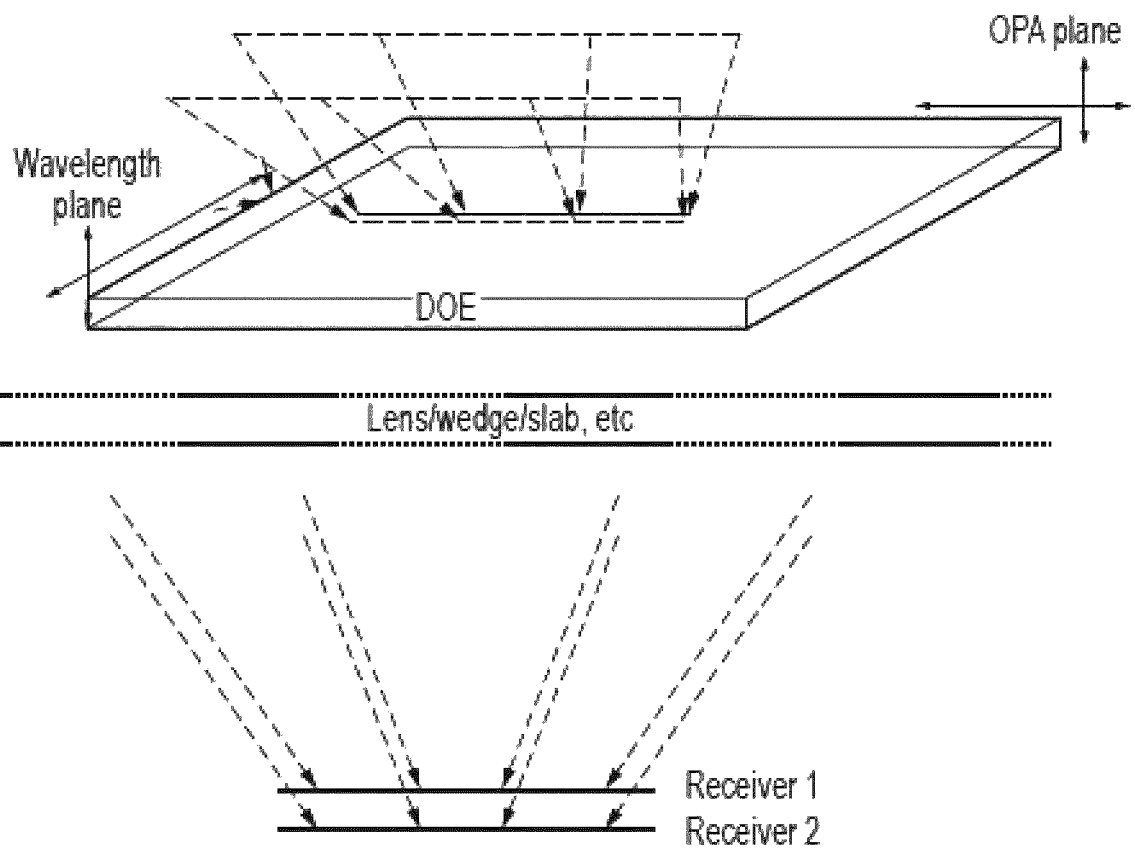
FIGS. 11A and 11B shows a schematic view of a DOE according to some embodiments of the invention showing the steering of beams having a single wavelength.
Figure 11B:
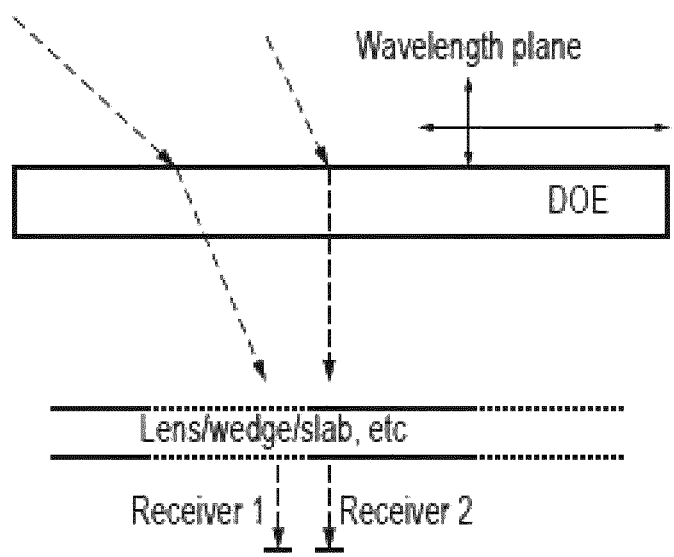

FIG. 11A shows a schematic perspective view of a DOE receiving region and receivers and two sets of beams, the sets having the same wavelength as each other, but different incident azimuthal angles, each set having four beams of different polar angles. FIG. 11B shows a cross-sectional view allowing the azimuthal angles to be seen.

In this diagram, eight beams are simultaneously incident on the DOE. The eight beams cover four different polar angular components (O1, O2, O3, O4) that are governed by the OPA PIC transmitter(s) and two different azimuthal angular components (W1, W2) which have been produced by creation of beams in the transmitting region of the DOE (not shown for simplicity). The DOE steers the azimuthal components of the beams, dependent on their wavelength so that each of the azimuthal angles W1, W2 are converted into different output azimuthal angles and so will be directed to different receivers. When beams are created by the transmitting region having the same wavelength and different azimuthal angular components, the receiving region of the DOE directs these beams to different PIC receivers so that the direction in the FOV from which the beam originated can be identified.

In some embodiments, more than one wavelength may be also be received simultaneously, so that the mechanisms shown in FIGS. 10 and 11 occur at the same time.

An advantage of creating multiple beams in the manner of FIGS. 11A and 11B is that transmitting multiple beams of the same wavelength simultaneously means that several points in the field of view can be measured simultaneously, thereby increasing the sample rate.

The DOE may be designed to have sub regions arranged to receive and steer light from the directions to which the split transmitted beams are sent by the transmitting region of the DOE. In this way, the multiple received beams can be steered and focussed to different PIC receivers, such as OPAs with four different lenses as indicated in FIGS. 7A and 7B, or as a single, larger receiving lens so as to collect more light. As the four beams will have different azimuthal components, at the same wavelength, they can be directed to different receiver lines (see x-lines in FIG. 3A) by the DOE. In this way the four beams can be differentiated by the system by virtue of the receiver on which they are focussed.

The DOEs in the optics shown in FIGS. 6 and 7 each have a transmitting region located in the transmitting optical path for creating multiple beams and/or steering and/or shaping light to be transmitted to the environment to be imaged and a receiving region located in the receiving optical path for steering received light to ensure it is directed to the PIC receiver. The transmitting region may be in the centre of the DOE and the receiving region may surround the transmitting region either in all directions as shown in FIGS. 7A and 7B or only in the vertical direction (direction of the azimuthal component) as shown in FIGS. 6A and 6B.

The DOEs shown in FIGS. 6A and 6B and 7 have four sub receiving regions each sub region is configured to steer light from a different sub-range of azimuthal angular components within the FOV so as to direct the light from that sub-range of azimuthal angular components to a respective receiver. In FIGS. 6A and 6B, the receiving sub regions and the transmitting region are arranged linearly in the vertical direction (direction of the azimuthal component) with two receiving sub regions $5r_1$ and $5r_2$, followed by the transmitting region $5t$, followed by the other two sub receiving regions $5r_3$ and $5r_4$. The sub regions may be configured to steer light from its respective sub range of angles to a respective one of a plurality of receivers. This may be the case when the transmitting region is used to create multiple beams with different azimuthal angles, so that the multiple beams having the same wavelength but originating from a different azimuthal angle each arrive at a different PIC receiver. In other embodiments, the whole of the receiving region may be configured to steer light from any azimuthal angle within the azimuthal angular range of the FOV to one receiver.

In FIGS. 7A and 7B, the transmitting region is located in the centre of the square-shaped DOE and the four receiving sub regions are arranged around the transmitting region, each receiving sub region located adjacent to a respective corner of the DOE.

In FIGS. 6A and 6B and in FIG. 3A, the DOE has a strip or rectangular region in the centre that steers the incident beam from the transmitter, may split it into multiple beams, corrects direction and/or collimation and can also provide an azimuthal angular wavelength dependence to steer the multiple beams as a function of the transmitter wavelength. As the transmitted beam does not traverse the wedge horizontally, the working distance for the transmitting optics can be much shorter than for the receiving optics, for example, on the order of 2-5 mm.

Figure 8:
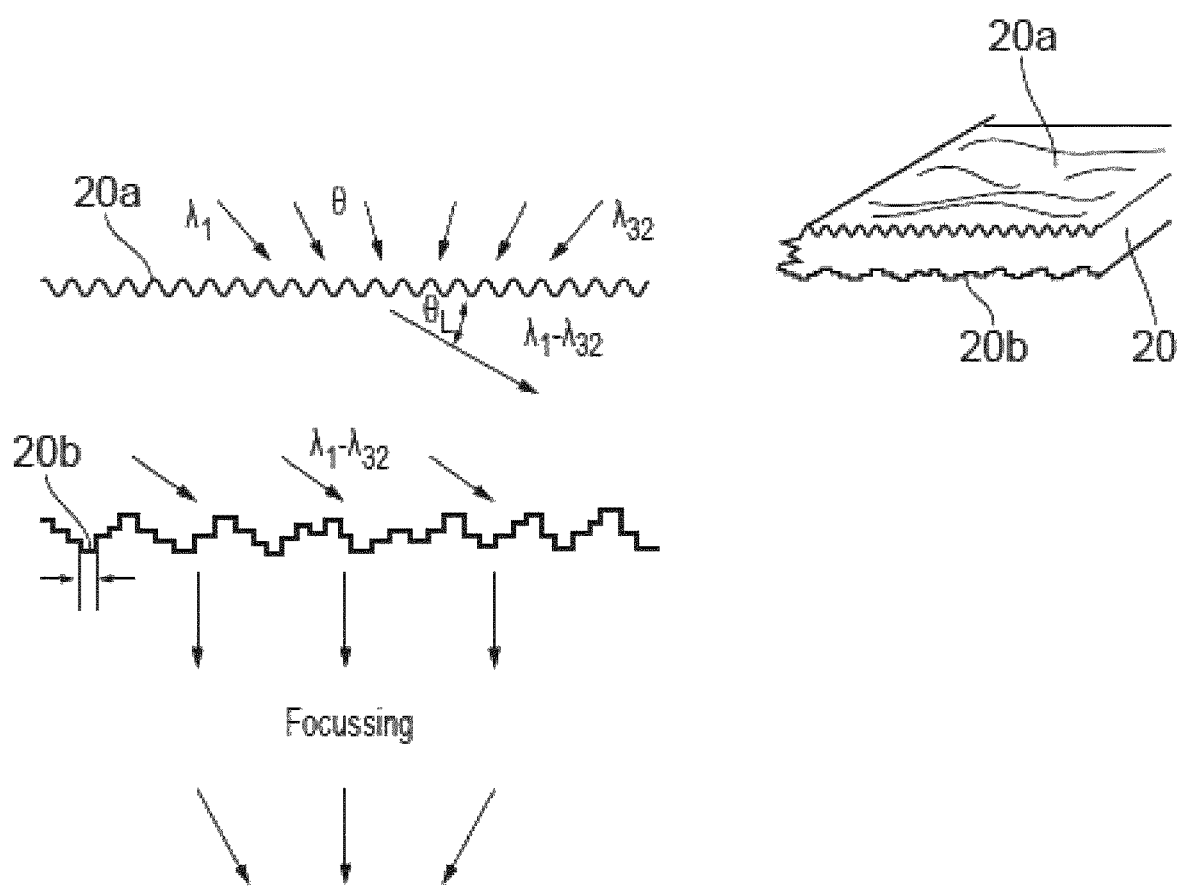
FIG. 8 shows a perspective view of an example diffractive optical element (DOE) according to some embodiments of the present invention and partial views cross section views of the front surface and the back surface of the DOE.

Phase plates may be used in the DOE to provide many degrees of design freedom as shown for example in FIGS. 7A and 7B (where the lens function has been integrated in the diffractive optical element) and FIG. 8. FIGS. 7A and 7B show a single DOE that combines wavelength dependence, beam shaping, focusing, spatial mutiplexing and beam splitting. FIG. 8 shows three functions that may be carried out by the DOE by two parts of the DOE. The front surface 10a of the DOE in this example is a wavelength sensitive diffractive grating and the back surface 10b is a beam steering structure.

Note that the wavelength dependent grating may be produced as a blazed grating which may be considered as lots of refractive elements. The beam splitting and focusing (wavelength independent functions) may be best produced with a step like phase plate pattern, where each feature is about 1 µm square and up to one wavelength deep as shown in FIG. 8. When designing such a phase plate, the number of depth steps in the phase plate is chosen to the meet the required application FOV and resolution (in a similar way to the choice of the number of emitters in an OPA). Turning and focusing elements may also be incorporated in the DOE or utilized as additional elements in order to direct light to the required PIC receiver.

FIG. 8 shows an example of a DOE showing that a DOE can be considered to have three separate functions. The example DOE shown in FIG. 8 has two separate elemental parts: a front surface provides a wavelength sensitive diffractive grating and the back surface provides beam steering in an analogous way to an OPA. The back surface of the DOE also provides beam focusing. In other examples, the wavelength sensitive diffractive grating may be provided by the back surface instead of the front surface. Beam steering may be provided by the front surface instead of the back surface. Beam focusing may be provided by the front surface instead of or as well as the back surface. Alternatively, focusing of the beam may be provided by a separate lens, in which case, the DOE may provide no focusing of the beam.

In some embodiments, an optic, such as a lens may be used to spread the transmitted light over a larger field of view as shown in FIG. 12(ii). This may be advantageous, for example, when PIC transmitter cannot produce a broad enough range of wavelengths to cover the angular range of the desired FOV. If the PIC transmitter can emit beams over a limited range of angles, and the desired FOV is a larger range of angles, a transmitting region of the optic can be configured to increase the angle at which the transmitted light travels. In this way, the whole of the desired FOV can be sampled.

For example, if the PIC grating emitters can emit beams over a 15 degree angle, and the desired FOV is 45 degrees wide, the transmitting region of the optic can be configured to increase the angle at which the transmitted light travels by three times. In this way, the whole of the desired FOV can be sampled.

Figure 32:
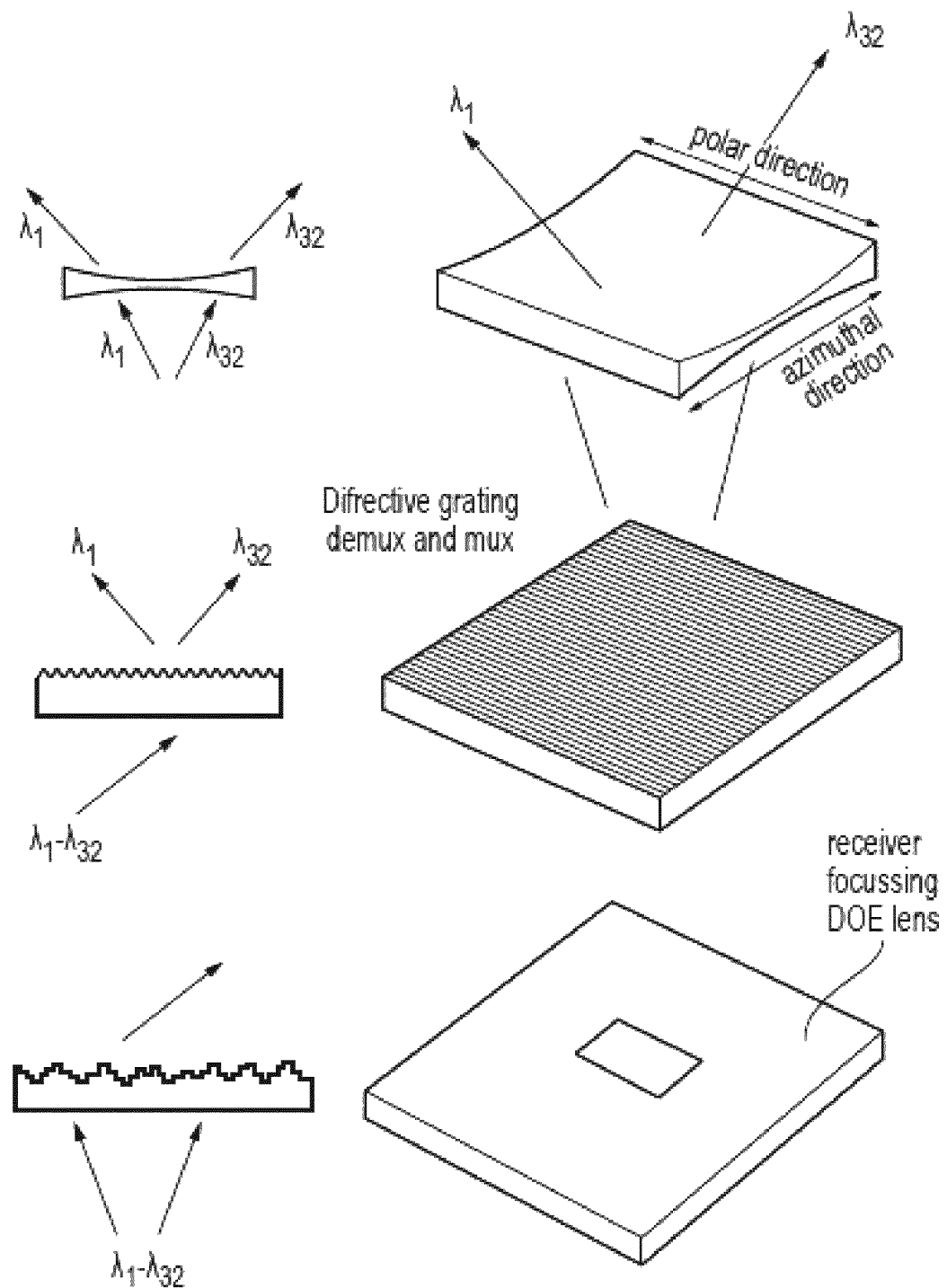
FIG. 32 shows an exploded view of an example of optics used to direct light in the azimuthal direction based on wavelength.

FIG. 32 shows an example of optics used to direct the azimuthal component of the light. A lower component shows a receiving region and a transmitting region, the transmitting region being in the centre and surrounded by the receiving region. This lower component is in front of the light emitting component(s) of the transmitter and may be in front of a wedge as well. The transmitting region is configured to collimate the light in the azimuthal direction and narrow the polar FOV for each OPA in the light emitting component, for example, from 90 degrees to 7.5 degrees, resulting in a resolution of 0.1 degree. The receiving region acts as a lens to focus the light received.

The mid component is a diffractive grating which steer the azimuthal component of the light according to its wavelength. This effectively demultiplexes the azimuthal component of transmitted light and multiplexes the azimuthal component of received light of different wavelengths.

The upper component increases the azimuthal component of the transmitted light and decreases the azimuthal component of the received light, thereby widening the FOV. For example, the azimuthal component of the FOV may be increased from 15 degrees to 45 degrees with the resolution decreasing from 0.03 degrees to 0.1 degrees.

Figure 13A:
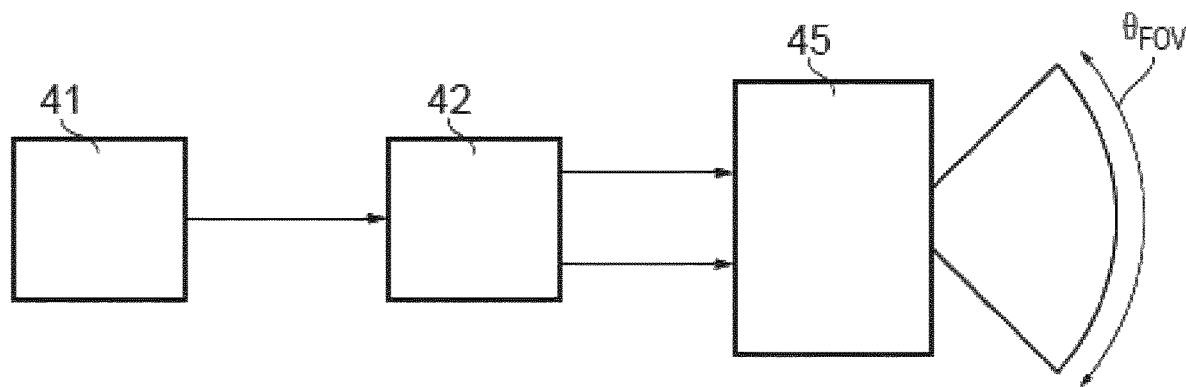
FIG. 13A shows a schematic diagram of a LiDAR transmitter PIC and FIG. 13B shows a schematic diagram of another LiDAR transmitter PIC.

In one example, 32 lasers are implemented covering 100 nm of wavelength tuning, meaning around 3.2 nm of tuning per laser. This may be achieved by approx. 42 degrees of heating of a DBR laser with a silicon grating and heater. Following the approach of FIG. 12(*i*), a step of 0.67 nm per point in the FOV achieves 150 different angles which provides an average pixel width of 0.1 degree. Following the approach of FIG. 12(*ii*), a step of 0.22 nm per point in the FOV achieves 450 different angles which provides an average pixel width of 0.1 degree. FIG. 13A shows an example of a transmitter PIC architecture for use in a LiDAR transmitter. A light source 41 providing light from at least one laser supplies light to the optical switch 42, the optical switch 42 having an input from the light source and a plurality of outputs which supply light to the light emitting component 45. The light emitting component 45 has a plurality of inputs and a plurality of emitters and the light emitting component is configured to selectively emit beams over a plurality of emission angles having different respective polar components within the polar angular range of the FOV $\theta_{FOV}$.

Figure 13B:
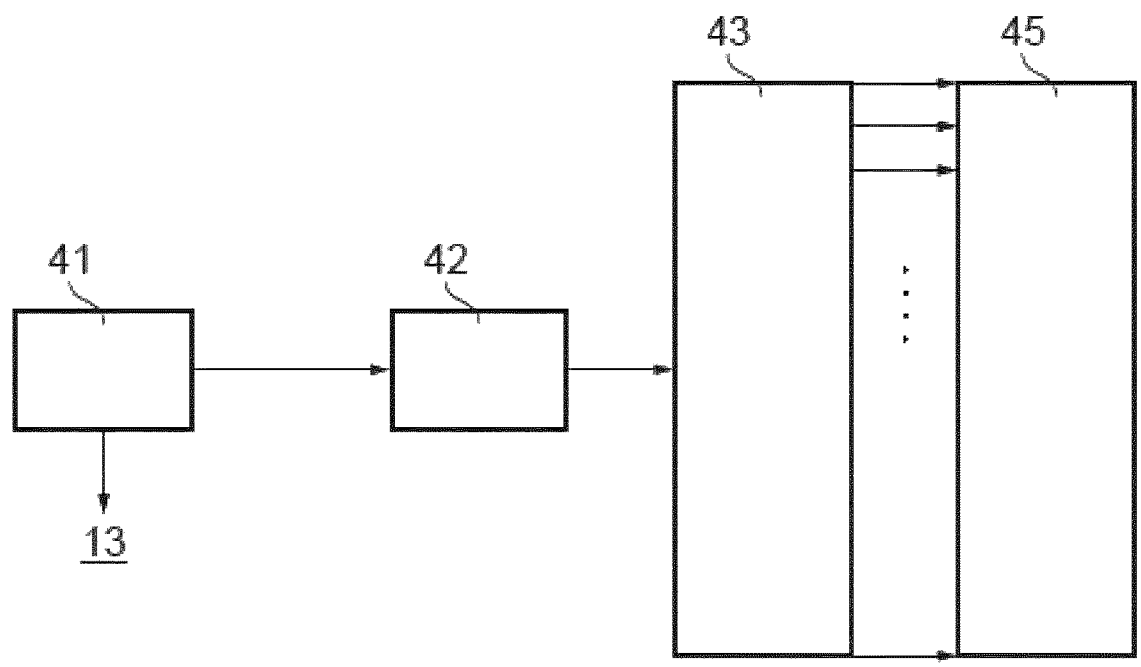

FIG. 13B shows an example of a transmitter PIC architecture for use in a LiDAR transmitter. A light source 41 formed of at least one laser supplies light to the optical switch 42, the optical switch 42 having an input from the light source and a plurality of outputs which supply light to the optical splitters 43. The optical splitters 43 then supply the light to the OPA light emitting component 45. The example of FIG. 13B has optical splitters that mean that multiple beams can be emitted in different directions at the same time, thereby increasing sample speed. However, in other embodiments, such as the one shown in FIG. 13A, the splitters may not be used.

In the example of FIG. 13B, the light source 41 is a tuneable transmitter that provides four different wavelengths simultaneously. This means that four azimuthal angles can be sampled simultaneously, thereby increasing the scanning speed of the LiDAR transmitter PIC. In other embodiments, only one, or any other number of wavelengths may be transmitted simultaneously, depending on the desired application. In other embodiments, the laser(s) may be provided on a different chip to the other components and the light source may be one or more input waveguide(s) connectable to the separate laser(s).

The light source is coupled to the switch by a waveguide that carries the four wavelengths simultaneously. In other embodiments, the light source may provide only one wavelength at any one time or a plurality of wavelengths. The waveguides in the PIC may be capable of carrying multiple wavelengths simultaneously. The waveguides may be broadband waveguides. Adjacent wavelengths may be separated by 30 nm.

The light source 41 also outputs an LO signal 13 of the same wavelength(s) as are output to the optical switch 42. The LO signal may be used by a receiver and will be discussed in more detail below.

The LiDAR transmitter PIC of FIG. 13B has a 1×24 switch, but in other embodiments, the number of outputs of the switch(es) may be different and may be selected as appropriate to the application.

Waveguides couple the switch outputs to the inputs of the splitters. Each output of the optical switch 42 is coupled to a respective input of the splitters 43. The outputs of the splitters are each coupled by waveguides to their respective inputs to the light emitting component 45.

The light emitting component in FIG. 13B comprises twelve OPAs which each have eight inputs and seventy eight emitters. The input at which the light arrives determines the coarse direction in which it will be emitted and the OPAs actively determine the fine output angle. In FIG. 13B, the OPAs have phase shifters to shift the phase of light in the OPA so as to direct the beam along the desired polar angle. The phase shifters may be triangular phase shifters, for example triangular heaters. Each OPA can direct light to sixty eight different polar angles with a beam width of 1.2 degrees giving a polar FOV of each OPA of approaching 90 degrees (+/−45 degrees). The total number of points resolvable with twelve of these OPAs is therefore 816. Optics may be used to convert each of the OPA outputs to a sub range of the polar FOV of the transmitter as a whole $\theta_{FOV}$.

In other embodiments, other numbers of OPAs may be used with different numbers of inputs and emitters. These properties of the OPAs may be selected as appropriate for the application of the transmitter.

Figure 14:
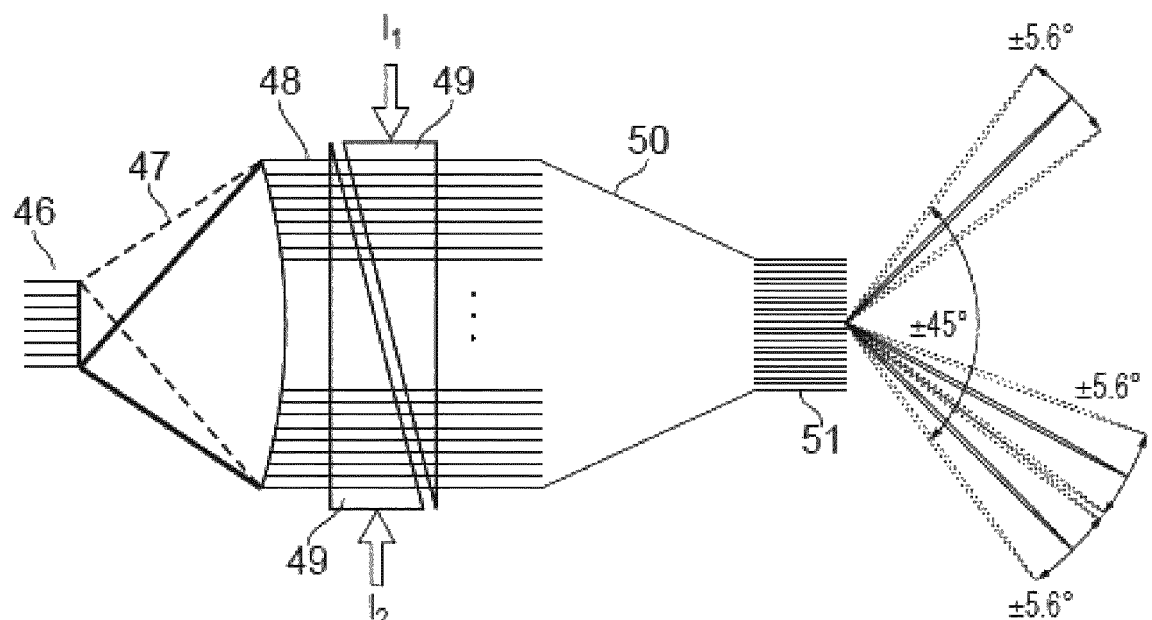
FIG. 14 shows a schematic diagram of an OPA for use as a light emitting component.

FIG. 14 shows an example of an OPA for use in the light emitting component. The input waveguides 46 are coupled to a Gaussian splitter 47 which is coupled to an array of path matched arm waveguides 48. Triangular phase shifters 49 are arranged to cause a varying phase shift across the arm waveguides 48. The arm waveguides are each coupled to a respective one of the fan in waveguides 50 which are each coupled to a respective one of the path length matched emitters 51. The phase shifts imparted by the triangular phase shifters 49 in the arm waveguides influence the emission angle of the light from the emitters 51. The Gaussian splitter is a 99% cut off splitter. Power for the triangular phase shifters 49 is provided at $I_1$ and $I_2$.

The example in FIG. 14 has eight inputs, 78 arm waveguides and 78 emitters which can direct light in 68 different polar angles which are diffraction limited. Each of the eight inputs 46 of the OPA cover +/−5.6 degrees of the FOV of the OPA (an 11.25 degree range) and the phase shift imparted in the arm waveguides 48 acts to select the fine direction within that range imparted to the light. In other embodiments, the FOV of the OPA may be split differently.

The triangular phase shifters 49 in FIG. 14 are arranged "top to tail" and are capable of up to a 10 pi phase shift. The emitters have a 1.1 micron pitch for a FOV of +/−45 degrees for light of 1550 nm wavelength. The beam width for emission at 0 degrees is 1.2 degrees. The emitters are grating emitters so as to allow wavelength steering which will be discussed in more detail below.

The use of OPAs with multiple inputs and the use of multiple OPAs each reduces the complexity of component required for adequate sampling of the FOV of a LiDAR transceiver. A single stage OPA transmitter is shown in FIG. 15 for comparison purposes.

The OPA has one input waveguide 46 coupled to a Gaussian splitter 47 which is coupled to an array of path matched arm waveguides 48. Individual phase shifters 52 are arranged to cause a varying phase shift across the arm waveguides 48. The arm waveguides are each coupled to a respective one of the fan in waveguides 50 which are each coupled to a respective one of the path length matched emitters 51. The phase shifts imparted by the phase shifters 52 in the arm waveguides wholly determine the emission angle of the light from the emitters 51. The phase shifters may be heaters.

Figure 15:
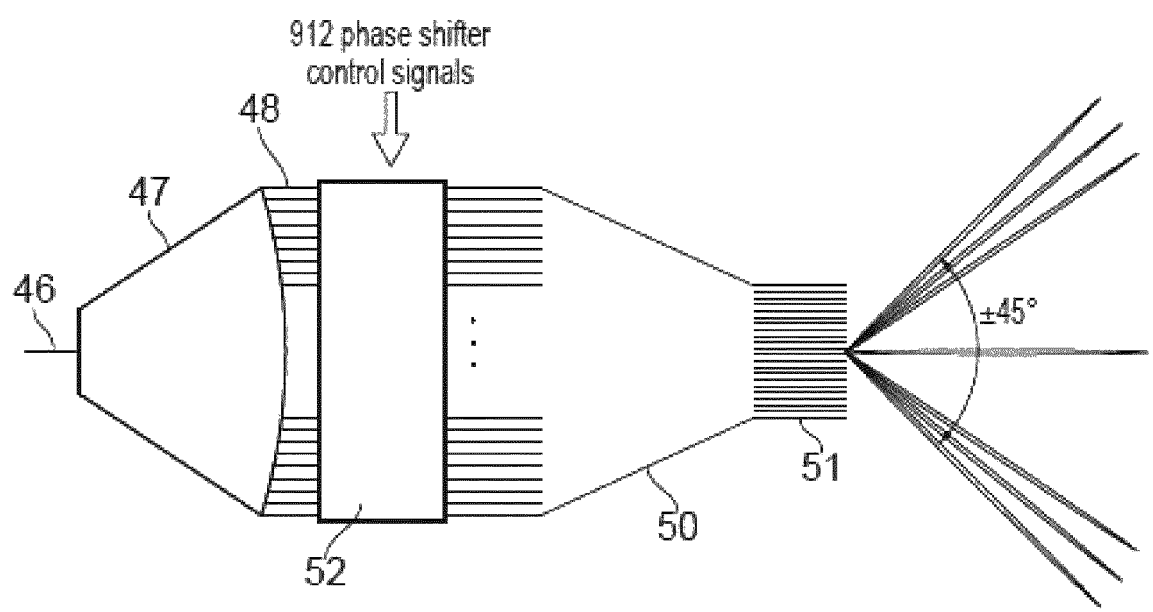
FIG. 15 shows a schematic diagram of a single stage OPA transmitter.

The example in FIG. 15 has one input, 912 arm waveguides and 912 emitters which can direct light in 810 different polar angles which are diffraction limited. There are 912 2 pi phase shifters which each require a control signal. The phase shift imparted in the arm waveguides 8 acts to select the direction across the whole of the FOV of the OPA.

This Figure shows a single stage OPA which requires more complex electronic and system control when compared with the layered architecture of FIG. 14. The OPA in FIG. 15 has emitters with a 1.1 micron pitch for a FOV of +/−45 degrees for light of 1550 nm wavelength. The 912 emitters give 810 diffraction limited points which is a beam width at 0 degrees of 0.1 degrees. The emitters are grating emitters as for FIG. 14 and the waveguides support four wavelengths to allow wavelength steering in the azimuthal direction.

As shown in FIG. 14, multiple inputs may be supplied to the light emitting component simultaneously (see the dashed and solid lines representing simultaneous inputs at input 1 and input 8). This may be achieved using splitters. The same splitter(s) are available for selection for use in the receiver which will be discussed in more detail below.

In order to better separate the simultaneous beams, the splitters may be coupled to the light emitting component so that the simultaneous beams are not sent to adjacent inputs. In the example of FIG. 14, this means that simultaneous beams received at inputs that are two apart from one another (e.g. inputs 1 and 3) are separated by 22.5 degrees and are therefore more easily distinguished between at the receiver than if the simultaneous beams originate from adjacent light emitting component inputs which would mean that simultaneous beams are only separated by 11.25 degrees.

Figure 16A:
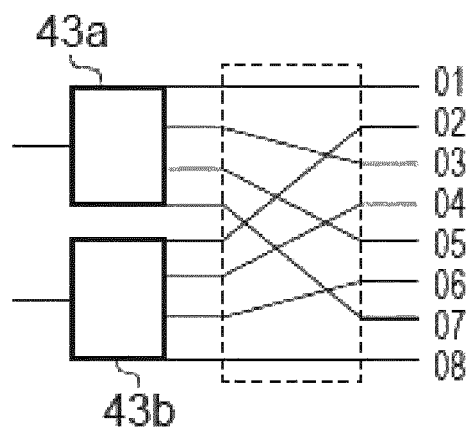
FIG. 16A shows a schematic diagram of two 1×4 optical splitters.

An example of a configuration that allows this separation of simultaneous beams is shown in FIG. 16A. In this example, two 1×4 optical splitters 43a, 43b are shown and the output waveguides O1-8 are crossed so as to alternately couple to the inputs of the light emitting component. A maximum of one of the splitters 43a, 43b will be supplied with light at any one time due to the input coming from the optical switch 42. If the top splitter 43a is supplied by the optical switch, then outputs O1, O3, O5 and O7 will supply their corresponding light emitting component inputs and if the bottom splitter 43b is supplied by the optical switch 42 then outputs O2, O4, O6 and O8 will supply the light emitting component.

Figure 16B:
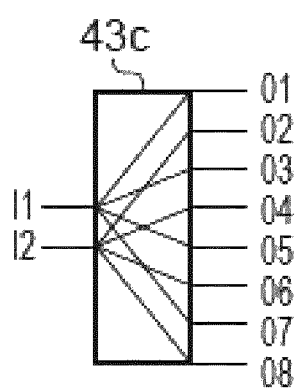
FIG. 16B shows a schematic diagram of a 2×8 optical splitters.

An alternative optical splitter 43c is shown in FIG. 16B. Here, the splitter is a 2×8 MMI where two inputs I1, I2 supply eight outputs O1-8 via interference in the splitter. A maximum of one of the inputs I1, I2 will be supplied with light at any one time due to the input coming from the optical switch 42. If the top input I1 is supplied by the optical switch, then outputs O1, O3, O5 and O7 will supply their corresponding light emitting component inputs and if the bottom input I2 is supplied by the optical switch 42 then outputs O2, O4, O6 and O8 will supply the light emitting component.

Other types of splitters with other numbers of inputs and outputs may be used in place of the 1×4 or 2×8, and these can be selected as appropriate for the application.

Where the number of outputs of each optical splitter is half of the number of inputs to the or each OPA in the light emitting component, outputs from two optical splitters may be alternately coupled to the inputs of one of the OPAs. So, two splitters supply each OPA in the light emitting component. This alternating principle can be equally applied to other numbers of splitters. For example, a light emitting component may be supplied by three or four splitters. When there is a plurality of optical splitters, a first output from each of the splitters may be connected sequentially to the inputs of the light emitting component, followed by a second output from each of the splitters and so on to separate of the outputs from each splitter across the inputs to the light emitting component. In other words, adjacent inputs of the light emitting component are connected to different splitters.

As discussed above, in FIGS. 13A and B, a 1×24 optical switch is provided in the transmitter. The same switches are available for selection for use in the receiver which will be discussed in more detail below. The switch may be formed by a tree of switches or a single switch component. Some examples of types of suitable switches will now be discussed, but the switch and the number of outputs may be selected as appropriate for the application.

Figure 17A:
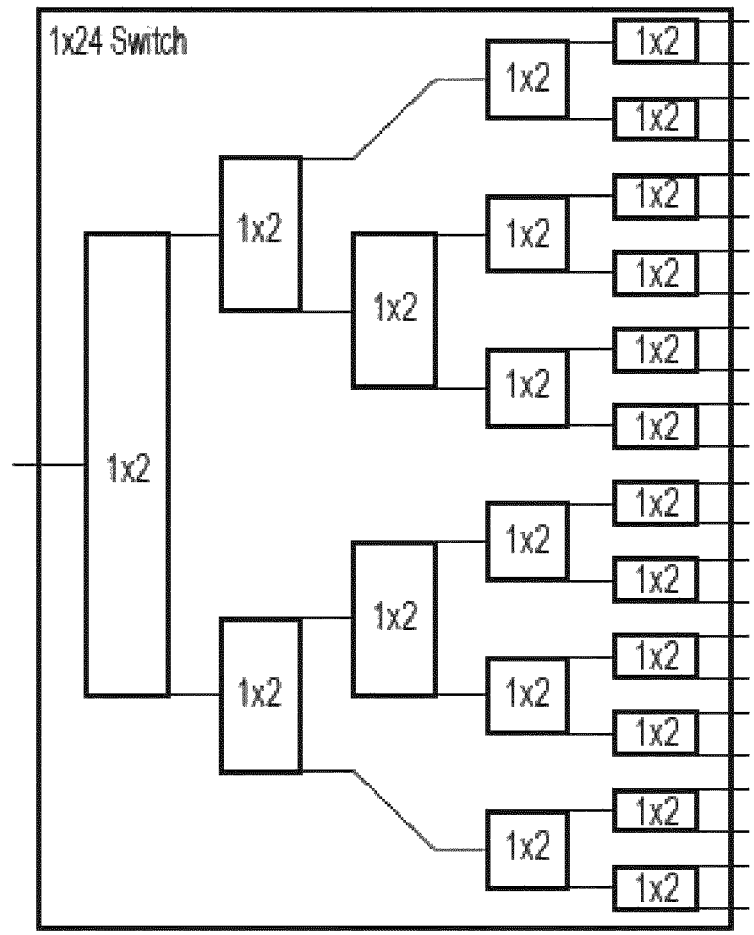
FIG. 17A shows a schematic diagram of a 1×24 optical switch formed of a tree of 1×2 optical switches.

FIG. 17A shows an example of a 1×24 optical switch which is formed of a tree of 1×2 optical switches. At each level, the outputs of each of the 1×2 switch(es) supply the inputs of two 1×2 switches at a further level. The number of levels and the couplings of the switches may be arranged to provide the number of outputs required.

Figure 17B:
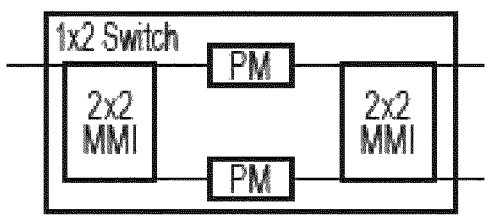
FIG. 17B shows a more detailed diagram of a 1×2 MZI switch.

An example of a type of 1×2 switch is shown in FIG. 17B. The Mach-Zehnder 1×2 switch has two phase shifters and two 2×2 MMIs. Only one of the phase shifters is active at any one time. These switches are suitable for use in the transmitter PIC. Their use in the 1×24 switch of FIG. 17A requires 23 1×2 switches and so 46 phase shifters, but a maximum of 5 phase shifters would be operating at any one time.

Figure 18B:
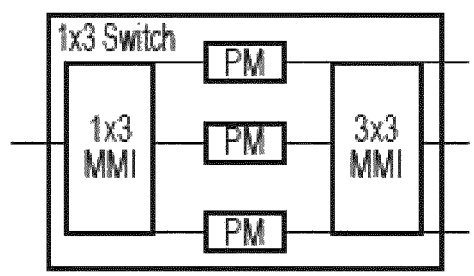
FIG. 18B shows a more detailed diagram of a 1×3 MZI switch.
Figure 18A:
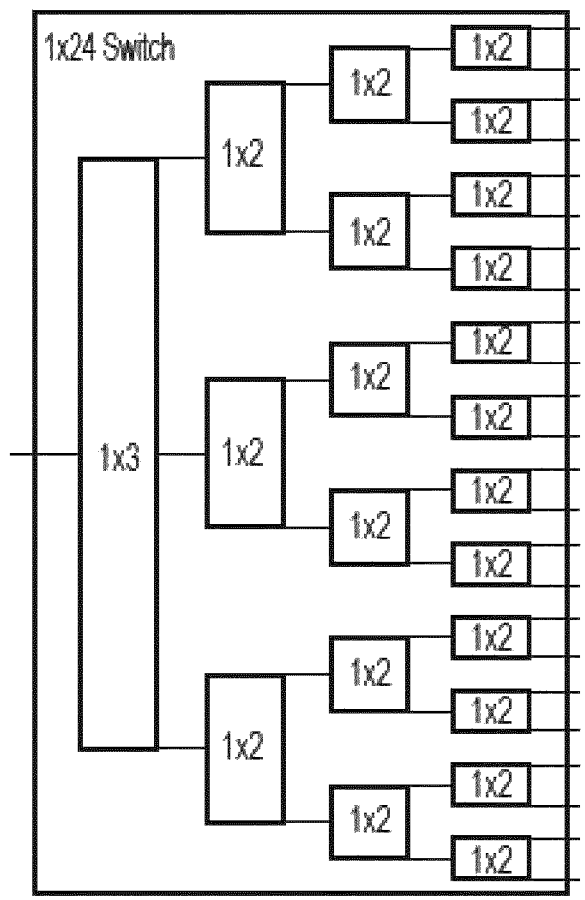
FIG. 18A shows a schematic diagram of a 1×24 optical switch formed of a tree including a 1×3 optical switch and 1×2 optical switches.

Another example of a 1×24 optical switch is shown in FIG. 18A which shows a tree made up of a 1×3 optical switch and 21 1×2 optical switches. The 1×3 optical switch forms the first layer and the remaining layers are formed of 1×2 optical switches.

An example of a 1×3 switch is shown in FIG. 18B. The Mach-Zehnder interferometer (MZI) 1×3 switch has three phase shifters and two 3×3 MMIs. Only two of the phase shifters are active at any one time. These switches are suitable for use in the transmitter PIC. The 1×24 optical switch shown in FIG. 18A requires 45 phase shifters, but a maximum of 5 phase shifters would be operating at any one time.

Figure 19:
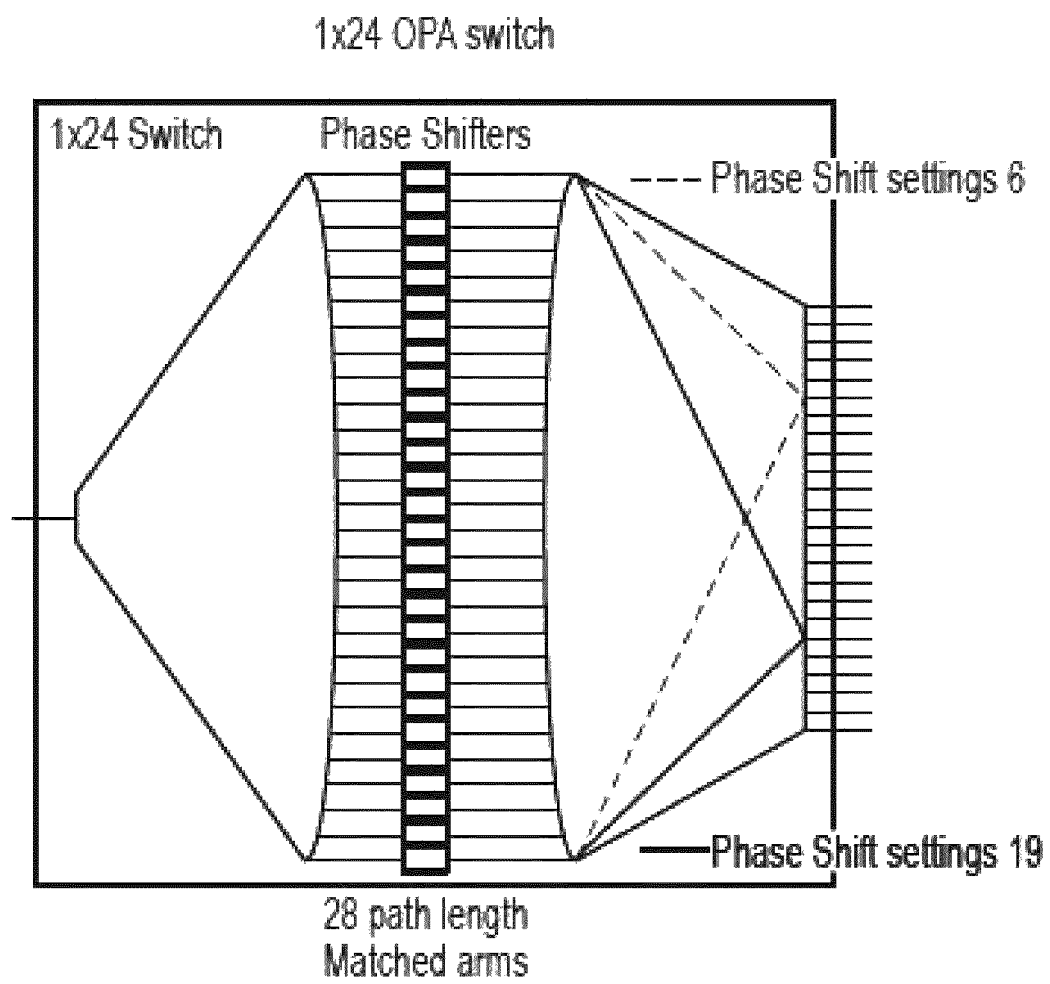
FIG. 19 shows a schematic diagram of a 1×24 optical switch formed of a 1×24 OPA based switch.

Another example of a 1×24 optical switch is shown in FIG. 19. This switch is an OPA switch with 1 input and 24 outputs. Light travels from the input waveguide through a Gaussian splitter (99% truncated Gaussian) to 28 path length matched arm waveguides. Each arm waveguide has a phase shifter. The light then travels across a free diffraction region to the output waveguides, and the phase shift imparted to the light in the arm waveguides determines which output waveguide the light will arrive at. The path of light between the arm waveguides and the output waveguides for the sixth and nineteenth outputs are shown in FIG. 19. All phase shifters are active between 0 and 2 pi. The arm waveguides are similar in construction to arrayed waveguide grating (AWG) arms, but they are path length matched and have phase shifters on each arm.

The OPA can be designed to have a different number of outputs by altering the number of output waveguides and arm waveguides.

Figure 20:
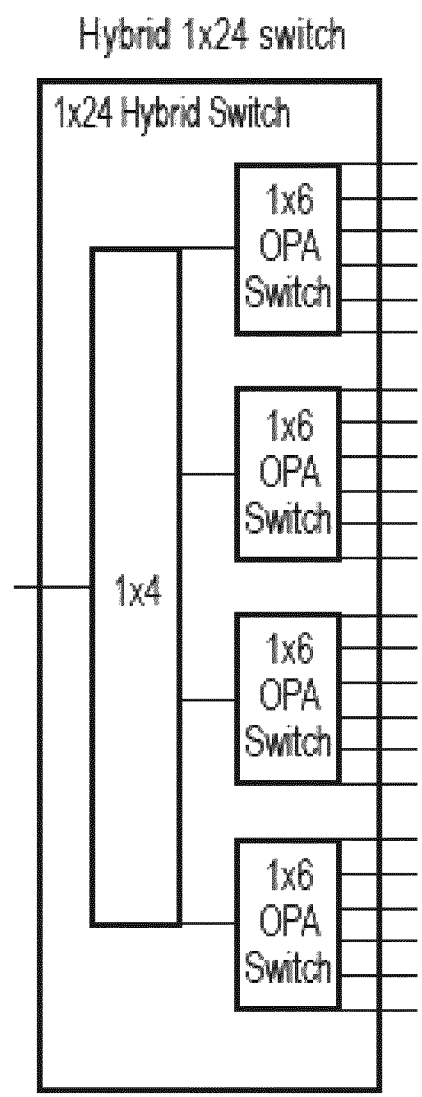
FIG. 20 shows a schematic diagram of a 1×24 optical switch formed of a 1×4 MZI switch and four 1×6 OPA based switches.

FIG. 20 shows another example of a 1×24 switch. This example has a 1×4 Mach-Zehnder interferometer (MZI) switch and four 1×6 OPA switches. The 1×4 MZI switch has six phase shifters, but only two are in operation at any one time. The 1×6 OPAs are similar in constructions to the OPA switch shown in FIG. 19, but there are 6 outputs and 8 arm waveguides and 8 phase shifters in each OPA. The first layer optical switch (1×4 in this example) may be a fast switch and the OPAs may be slow switches. In this way, the speed of the first layer MZI switch may be utilised by allowing the inactive OPA switches to switch while one of the OPAs is active.

Other possibilities of switch arrangements are 1×3 MZI switch followed by 3 1×8 OPA switches or a 1×6 MZI switch followed by 6 1×4 OPA switches.

Figure 21:
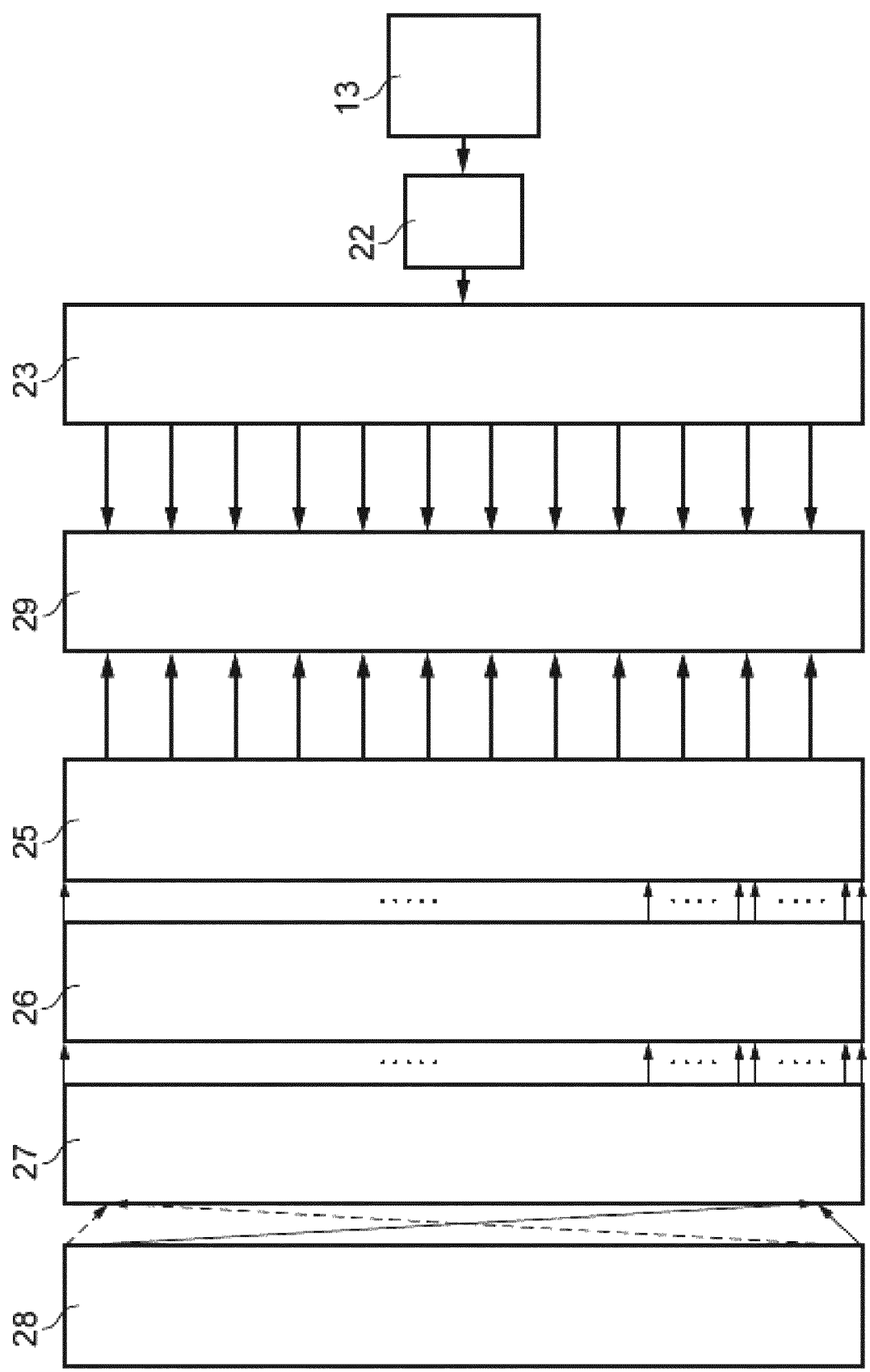
FIG. 21 shows a schematic diagram of a LiDAR receiver PIC.

FIG. 21 shows an example of a receiver PIC. The receiver PIC has a light steering component 25 having a plurality of input waveguides and a plurality of outputs, each coupled to a coherent receiver 29 and a local oscillator (LO) source 13, providing one or more LO signals to an optical switch 22. Optical switch 22 has an input and a plurality of outputs and provides the LO signal to one of a plurality of optical splitters 23 which in turn supply the coherent receivers with the LO signal.

As for the transmitter above, other embodiments of the receiver may not have splitters, in which case the LO signal may be supplied from the optical switch to the coherent receiver directly. The splitter ratio of inputs to outputs will be the same in the receiver as the transmitter so that the receiver can process all of the simultaneous beams produced by the transmitter.

The example in FIG. 21 has receiver optics 28 which convert the polar component of the angle of incidence of a beam over the FOV to one of the input waveguides 27. The optics 28 also direct the azimuthal component of the angle of incidence so as to couple the received light into the input waveguides. The input waveguides 28 carry the light to a layer of planar Si photonic lenses with 78 receptors per lens. This converts the input waveguide into an input angle for an OPA of the light steering component. The photonic lens will be discussed in more detail below.

The light then enters the OPAs of the light steering component which is set to "unsteer" the light in a corresponding manner to the light emitting component of the transmitter. The light steering component deals with the fine tune steering and directs the light to one of the outputs of the light steering component. The output of the light steering component at which the light arrives corresponds to an input of the light emitting component at the transmitter so that the polar component of the angle of incidence of the light can be determined.

When multiple simultaneous beams are emitted by the transmitter at different polar angles, they are separated at the receiver as they will be steered to different outputs of the light steering component which are each connected to different photo detectors in the coherent receiver.

The light then arrives at a coherent receiver where the signal can be detected by beating with the LO signal received from the light source of the transmitter.

In other embodiments, the LO source may be supplied from an independent source (not from the transmitter).

In the example shown in FIG. 21, 816 discrete polar components of angle of incidence of light on the receiver are directed to 816 input waveguides 27 by receiver optics 28. These input waveguides are each coupled to an input of one of twelve photonic lenses 26 which each have 78 outputs. The outputs from the photonic lenses 26 are coupled to the inputs of the light steering component which consists of twelve OPAs, each with 78 input waveguides and 8 output waveguides. Each output of the light steering component is coupled to a coherent receiver which also receives a LO signal input. When four simultaneous beams are emitted by the transmitter due to the 1×4 (or 2×8) splitter in the transmitter, each beam having a different polar angular component, only four of the eight output waveguides of the receiver OPAs carry light. Each of these 4 outputs is connected to a different photodetector circuit.

Figure 22:
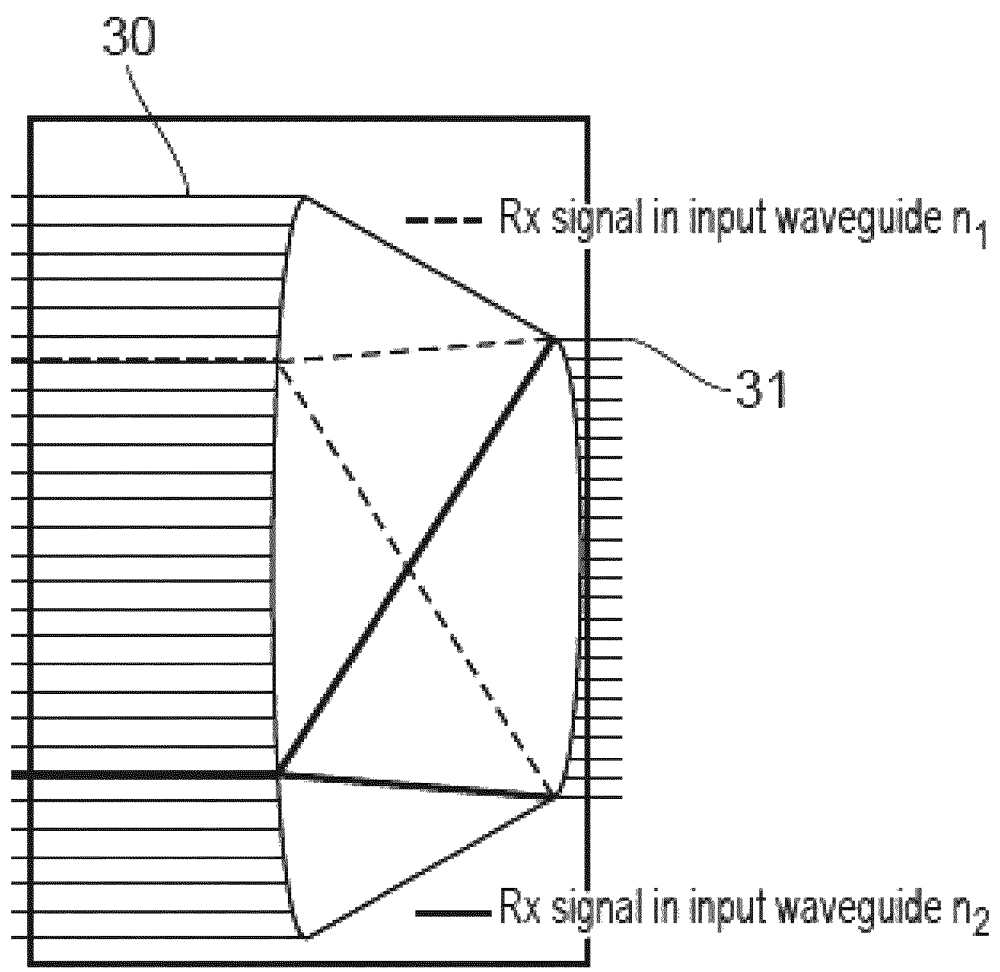
FIG. 22 shows a schematic diagram of a photonic lens for use in a receiver PIC.

An example of a photonic lens is shown in FIG. 22. The lens takes 68 input waveguides 30, only some of which carry light at any one time and outputs the light over 78 waveguides 31 which form the inputs to the OPAs in the light steering component. The lens distributes the light from a single input waveguide over the 78 outputs in a 99% truncated Gaussian manner. The path of light from an input waveguide $n_1$ and another input waveguide $n_2$ are shown as examples in the figure.

The output waveguides 31 are path length matched to a circle and the input waveguides 30 are path length matched on a Rowland circle. The number of waveguides may be adapted as appropriate to the application and FOV required.

Figure 23:
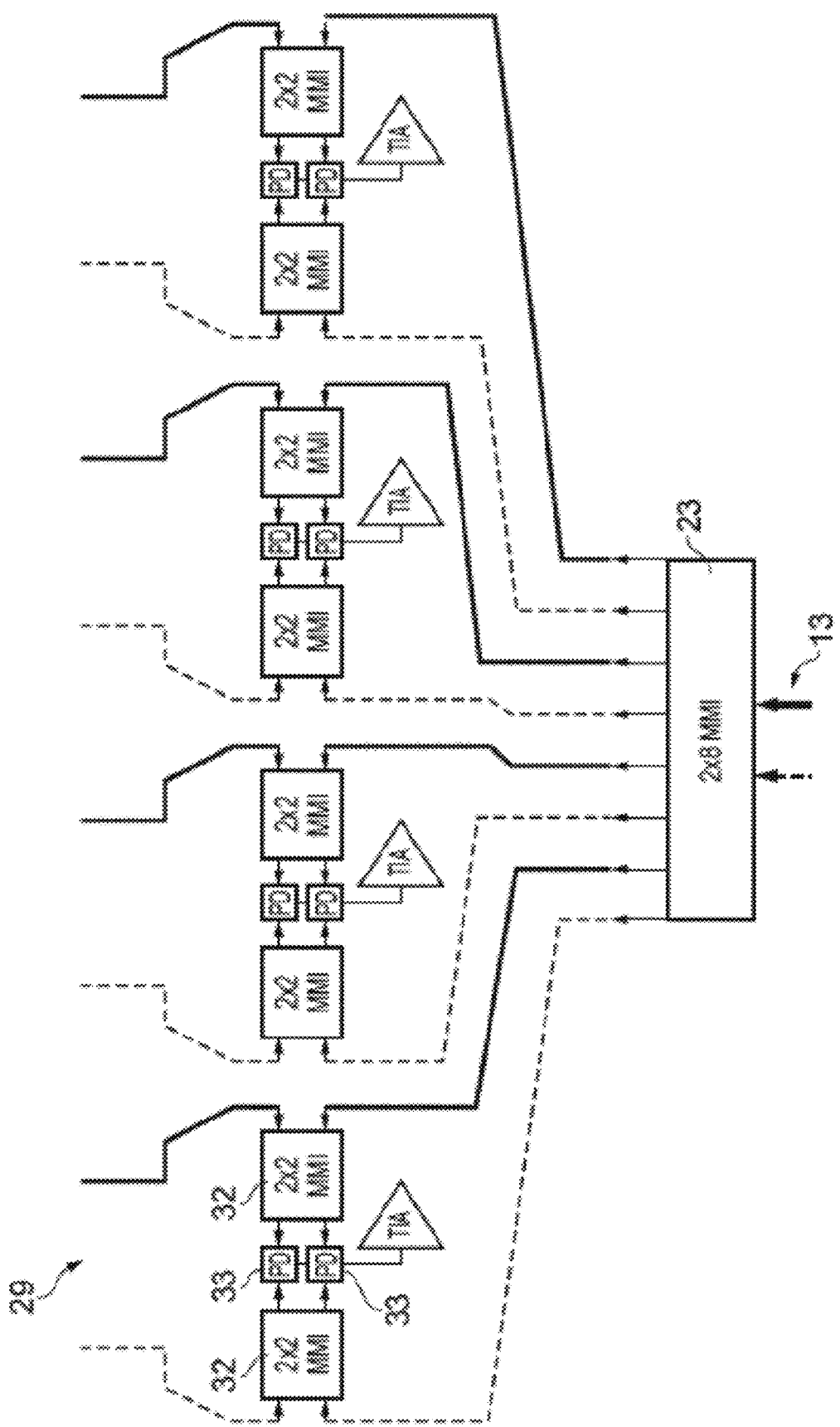
FIG. 23 shows a schematic diagram of a set of coherent receivers for use in a receiver PIC.

FIG. 23 shows an example set of coherent receivers 29. In the example receiver of FIG. 21, twelve of these sets of receivers are provided; one for each of the twelve OPAs. The LO signal 13 is split by the optical splitter 23 and then arrives at the coherent receivers. As discussed above in relation to the transmitter, splitters may have any number of outputs to suit the application, but tin this example, the splitter has two inputs and eight outputs. Only one of the inputs will carry light at any one time. The outputs are crossed so as to supply alternate inputs to the coherent receivers.

The coherent receivers are arranged so that the four signal inputs from the light steering component and the corresponding LO signal inputs arrive at the same coherent receiver and the same MMI in the coherent receiver. The beating between the two inputs results in a signal at the photodetector.

Each coherent receiver has a pair of multimode interference components 32, MMI, each MMI having one of the LO inputs and one of the signal inputs of the coherent receiver and both MMIs in the pair outputting to one or more common photodetectors 33. Due to the alternating arrangement of the splitter, the two LO inputs in the pair are each coupled to different outputs of the optical switch. So, only one of the pair of MMIs will be active at any one time. This arrangement allows greater use to be made of the coherent receivers and a reduction in the number of components required. The outputs of the photodetectors are routed to a transimpedance amplifier (TIA) to amplify the signal. If a photodetector is connected to more than one MMI, then the system may be configured so that only one of the MMIs carry light from the LO at any one time. Further, if an MMI carries LO light, then the corresponding signal input of the MMI carries a signal from the received beam.

The layer of OPAs in the receiver in FIG. 21 are structurally the same as the OPA described in relation to FIG. 14, but used in reverse. The switches and splitters in the receiver of FIG. 21 are also structurally the same as those described in relation to FIGS. 16A to 20.

Figure 24:
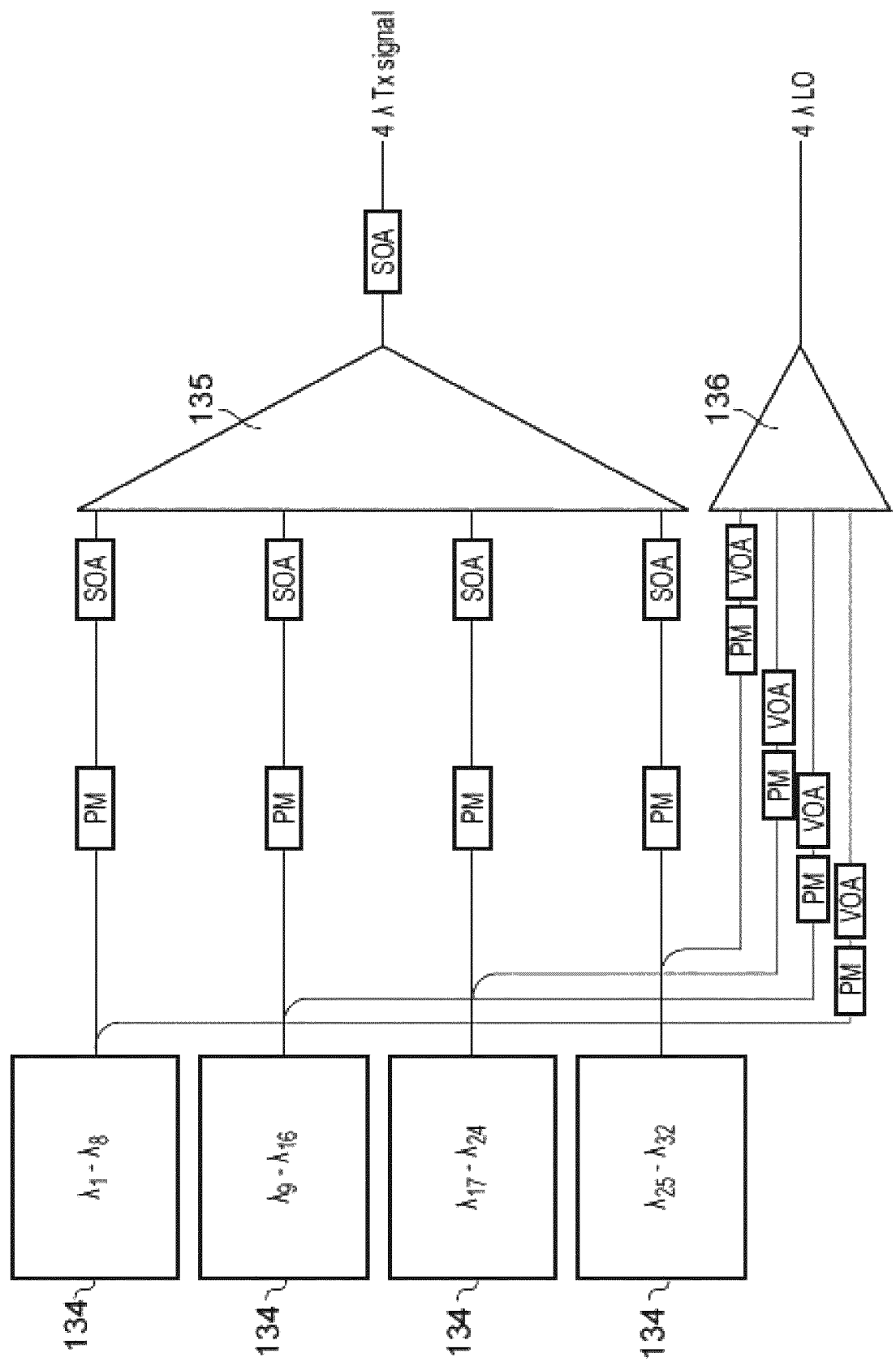
FIG. 24 shows a schematic diagram of an arrangement of a light source for use in a LiDAR transceiver.

The light source in the transmitter may be provided by one or more lasers 134. An example of the arrangement of the lasers 134 is shown in FIGS. 24 to 29. As discussed above, different wavelengths may be provided so that the azimuthal component of the FOV can be sampled by wavelength dependent steering. In the example of FIG. 24, four separate lasers are provided so that four wavelengths of light can be provided simultaneously. The four lasers 134 are provide a total of 32 different coarse wavelengths. Each laser is tuneable between eight distinct wavelengths which cover a sub range of the total 32 wavelengths.

The lasers 134 each have an output which is split between the light source for the transmitter and the LO source for the receiver.

After the light is split between the LO source and light source, the light from all of the lasers is multiplexed by band multiplexer (MUX) 135 so as to be carried by a single waveguide as the light source. The light for the LO source is also multiplexed by band multiplexer 136 to be carried by a single waveguide as the LO source.

Figure 25:
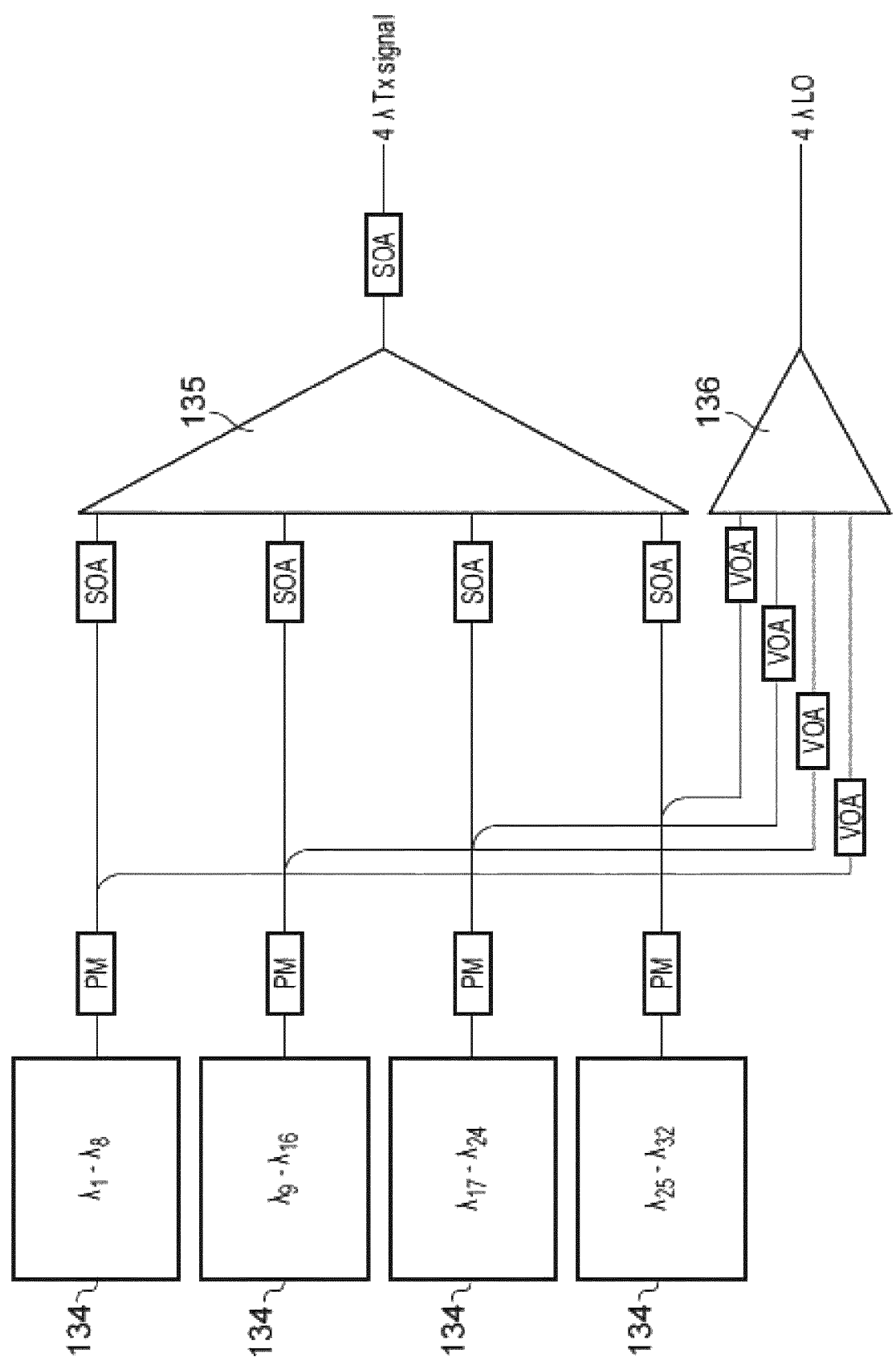
FIG. 25 shows a schematic diagram of another arrangement of a light source for use in a LiDAR transceiver.

The light from each laser 134 is phase modulated by a phase modulator (PM). The modulation may be configured to allow distance to be determined (e.g. by pulse detection for Time of Flight systems or frequency chirp for FMCW systems). Further, the light may be encoded so as to indicate the origin of the light in the transmitter. The receiver may then decode the azimuthal angle. The modulation may occur before the light is split as shown in FIG. 25 between the LO source and the light source, or after as shown in FIG. 24. The LO source may not be modulated at all as shown in FIG. 25. Alternatively, modulation may occur within the laser itself as shown in FIG. 26 which implements tuneable FM modulated lasers.

The light may also be amplified by utilising semiconductor optical amplifiers (SOAs) before or after multiplexing light from each of the lasers. The SOAs shown in FIGS. 24 to 26 are examples of possible locations for the SOA.

Light for the LO signal may be attenuated by a variable optical attenuator (VOA) to reduce the LO power and/or improve the signal to noise performance of received light.

Figure 26:
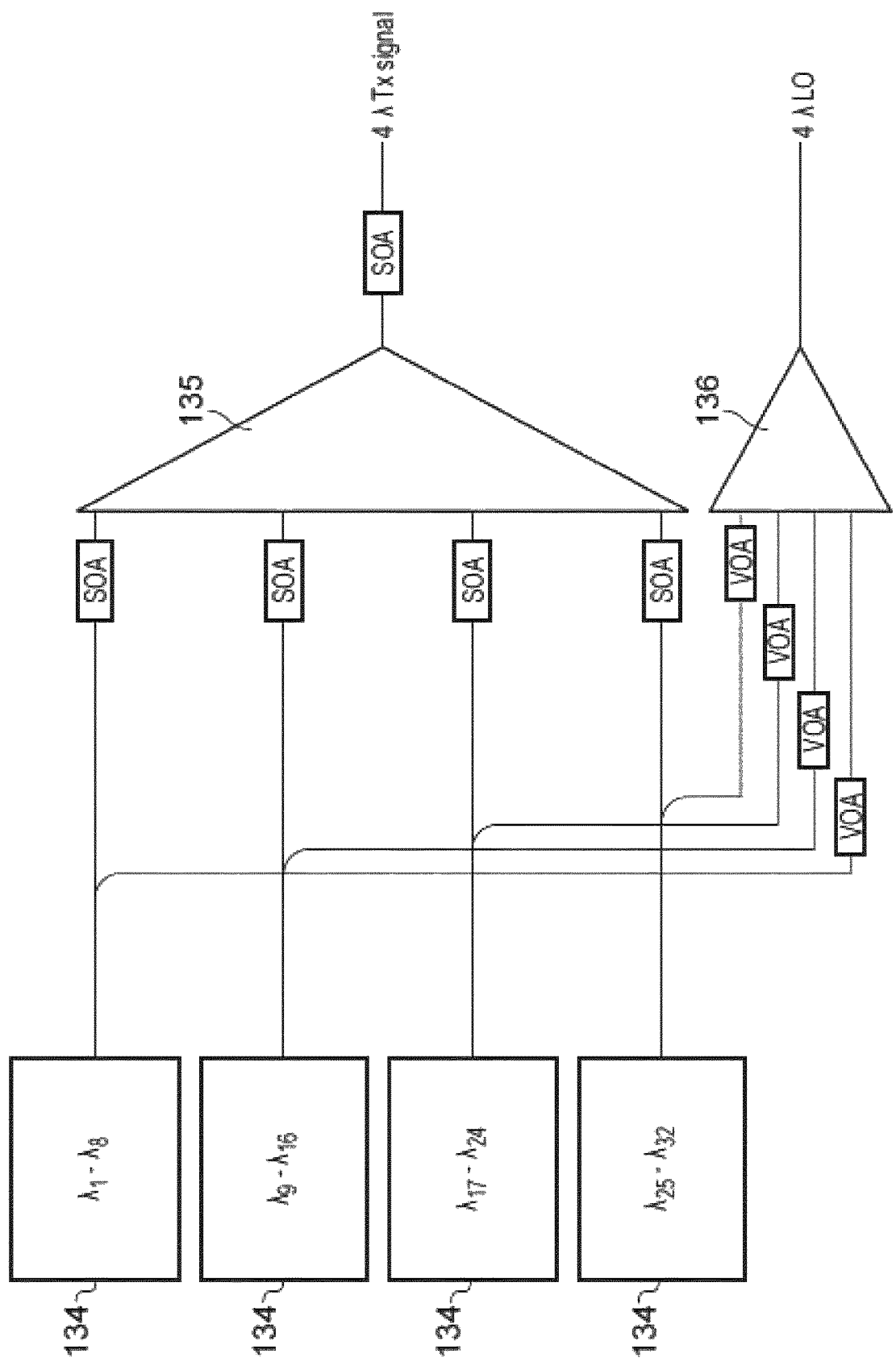
FIG. 26 shows a schematic diagram of another arrangement of a light source for use in a LiDAR transceiver.
Figure 27:
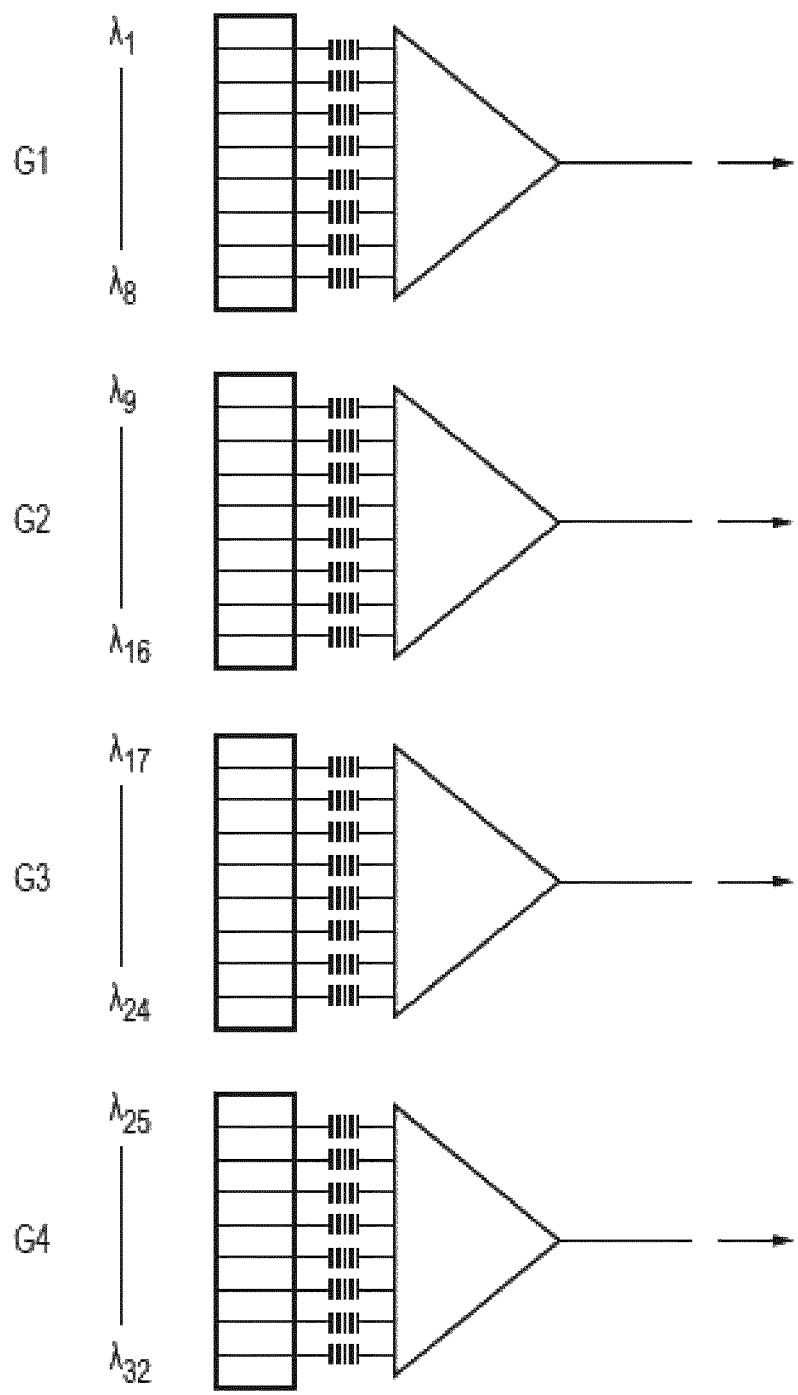
FIG. 27 shows a schematic diagram of a tuneable lasers for use in the light source.

FIG. 27 shows a set of lasers G1-G4 in a light source suitable for the transmitter PIC, for example in an arrangement according to one of FIGS. 24 to 26. It is made up of 32 distributed Bragg reflector (DBR) lasers covering 100 nm wavelength range in total. Each laser being tuneable over around 3 nm by 0.11 nm increments. The lasers are grouped in four sets of eight lasers and all of the lasers in a set output to one set waveguide. In this wave four different wavelengths can be provided simultaneously.

The multiplexer may be an AWG or echelle grating or cascade MZI MUX with thermal matching to match inputs.

Figure 28:
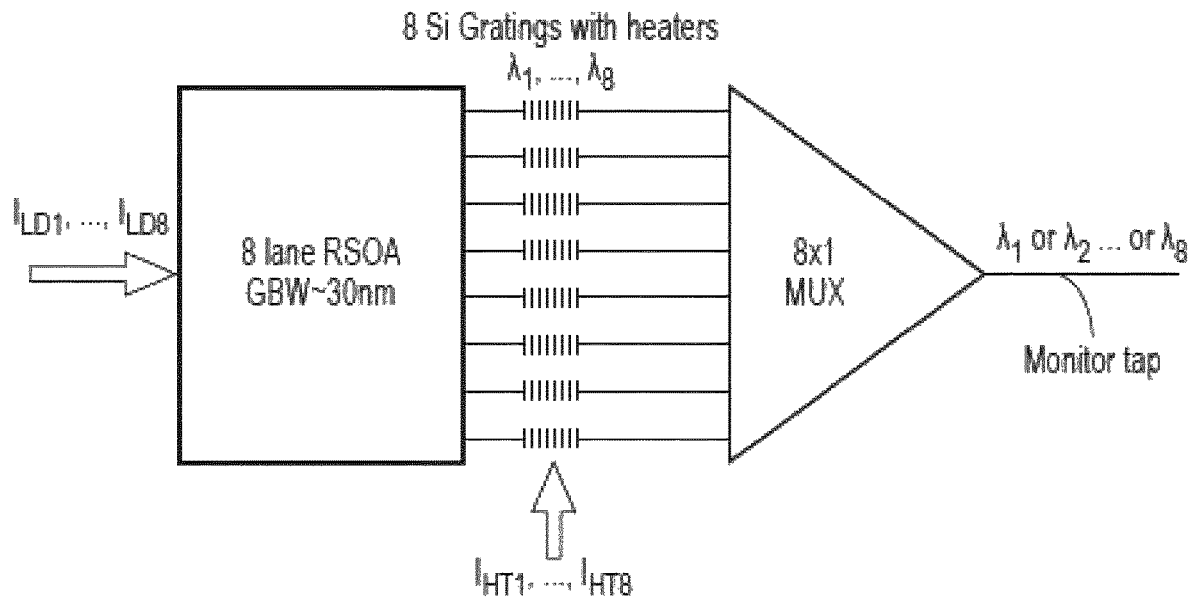
FIG. 28 shows a schematic diagram of a tuneable laser for use in the light source.

An example of a tuneable laser is shown in FIG. 28. The laser is an eight lane tuneable CW laser. The reflective semiconductor optical amplifier (RSOA) receives eight different laser gain currents $I_{LD1}$ to $I_{LD8}$ for power and wavelength fine tuning and has a single EPI with approximately 30 nm gain. It also has a high reflective coating at the back surface which faces away from the environment to be imaged and an anti-reflective coating on the front (output) surface.

The silicon gratings $\lambda_1$ to $\lambda_8$ have heaters receiving currents $I_{HT1}$ to $I_{HT8}$ for temperature tuning of up to 3.6 nm over a temperature change of 50 centigrade. The silicon gratings have eight different periods. The lanes are then multiplexed by an 8×1 multiplexer. Only one laser element operates at any one time and a monitor tap may also be provided after the multiplexer.

Figure 29:
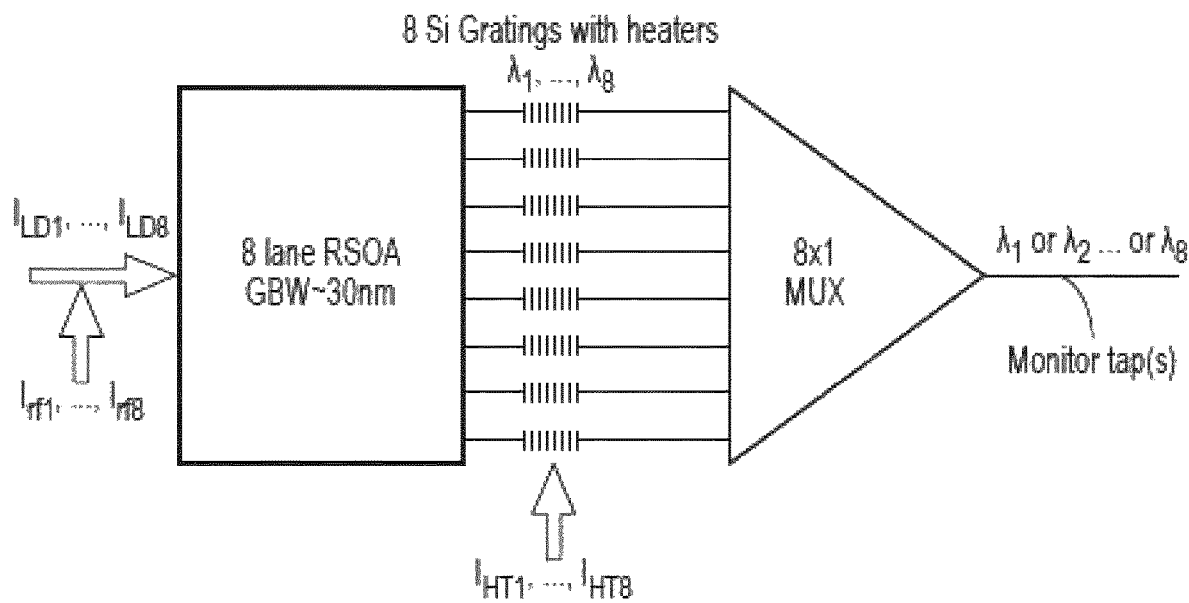
FIG. 29 shows a schematic diagram of a tuneable laser for use in the light source in which RF currents $I_{RF1}$ to $I_{RF8}$ are input for FM chirping.

FIG. 29 shows another laser that may be implemented. It is similar to the structure described in relation to FIG. 28 except laser RF currents $I_{RF1}$ to $I_{RF8}$ are also input for FM chirping.

Figure 34:
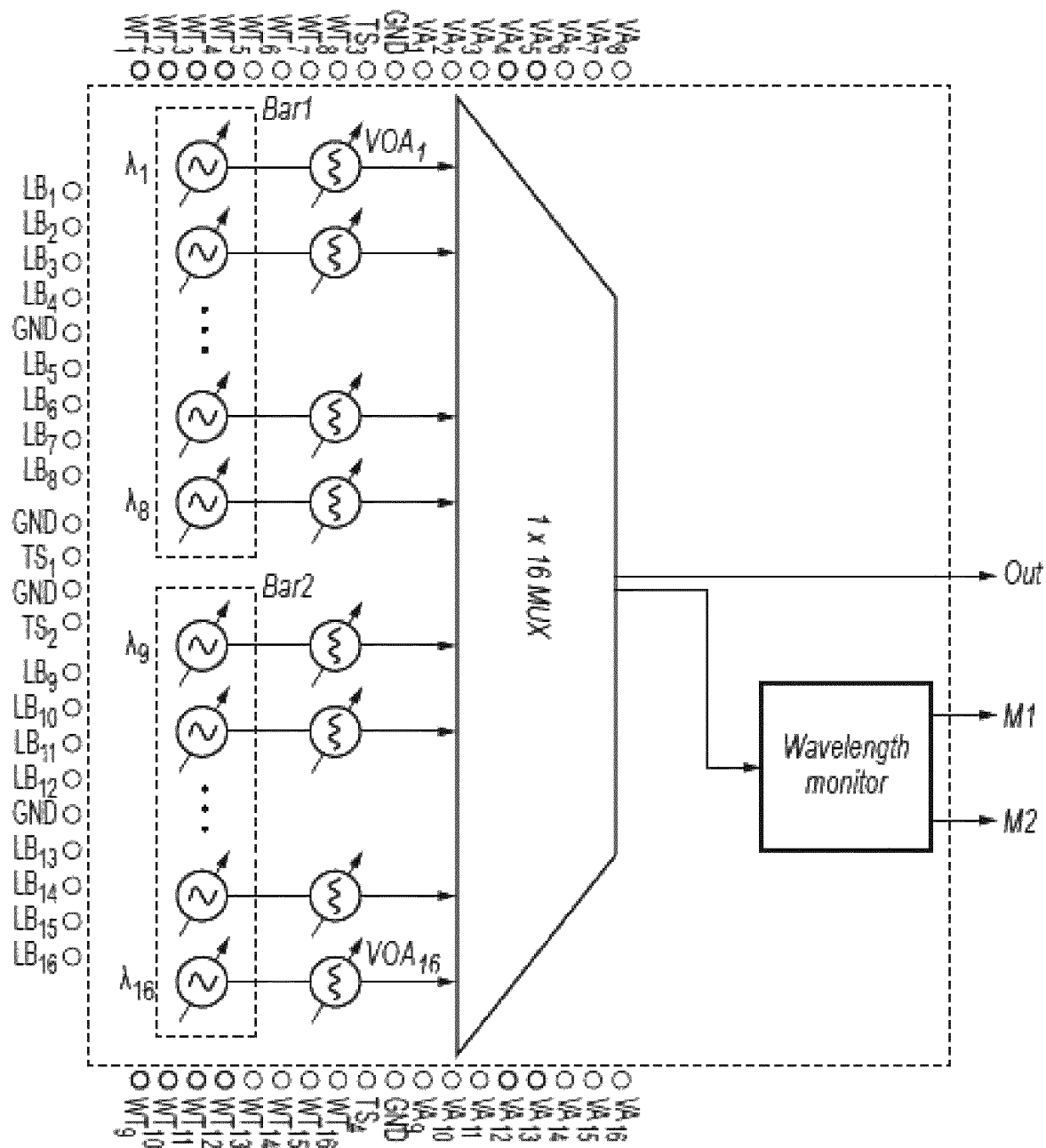
FIG. 34 shows a schematic view of a laser and MUX set up for use in some embodiments of the present invention.

FIG. 34 shows an example of a laser and MUX where two eight lane lasers supply one 1×16 multiplexer (MUX). A wavelength monitor is also provided which is supplied by a portion of the output of the MUX. The wavelength monitor may be off-chip. Wavelength control of the lasers may be off-chip. The lasers are adjustable for amplitude and wavelength. The MUX has an equalising envelope response which may help with flattening the optical power output with wavelength. The 16 lasers can cover a 50 nm wavelength range as each laser has a 4 nm tuning range.

Figure 30:
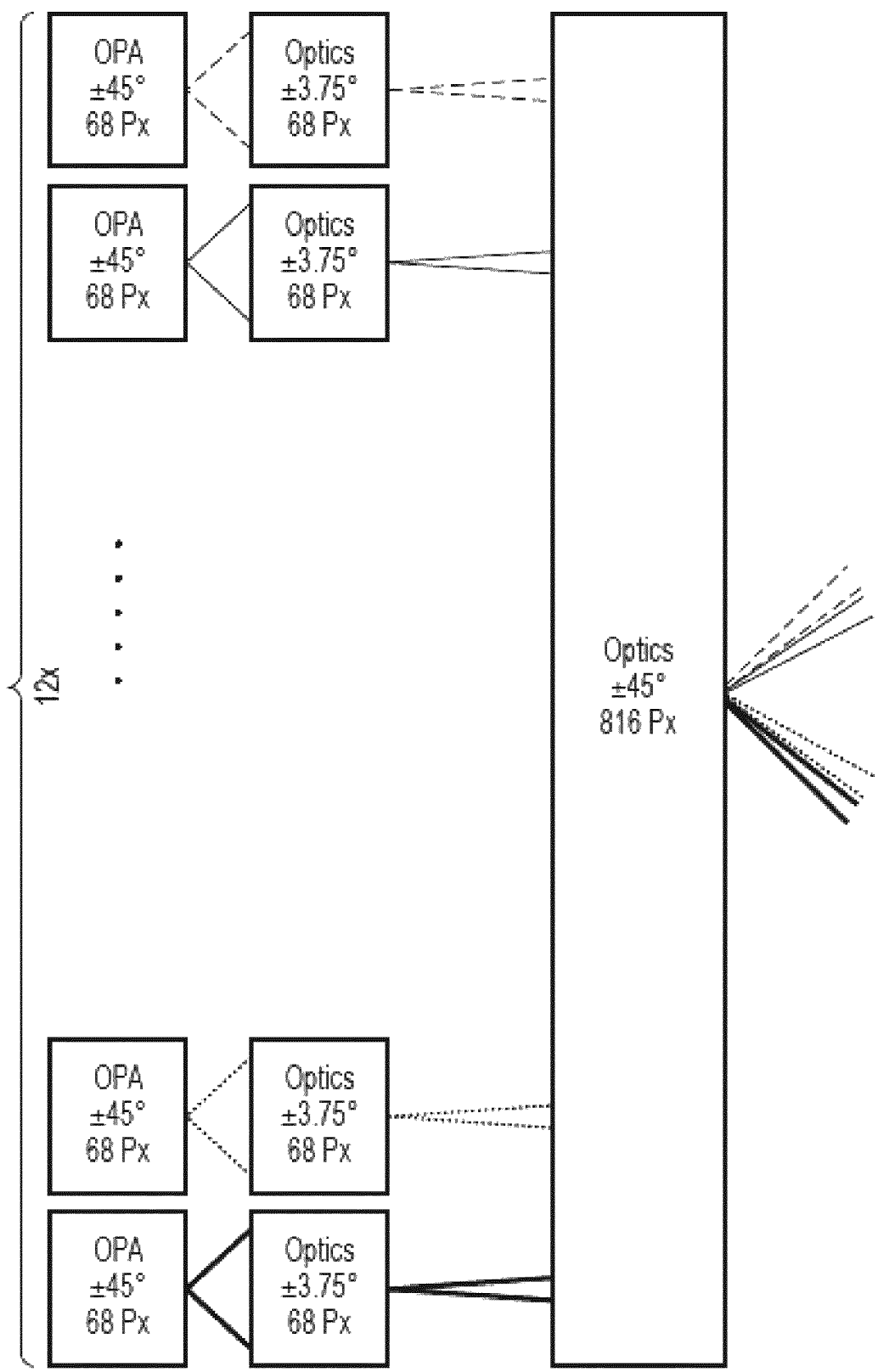
FIG. 30 shows a schematic diagram of optics for use in steering the output of the light emitting component to cover the FOV of the transmitter.

FIG. 30 shows optics which may be used to convert the output of the light emitting component of the transmitter PIC to cover the FOV of the transmitter. Each OPA of the light emitting component of FIGS. 13A and B may produce polar angular components over a range of +/−45 degrees. The optics in FIG. 30 has two layers. The first layer converts the field of view of each OPA from +/−45 degrees to a smaller FOV of +/−3.75 degrees. This first layer may be an array of 12 micro lenses. The second layer of optics adds incremental steering to each output so that the whole light emitting component covers the whole range of the FOV. In this example, the steering is (7.5n−3.75) degrees where n is an integer between −5 and 6.

Figure 31:
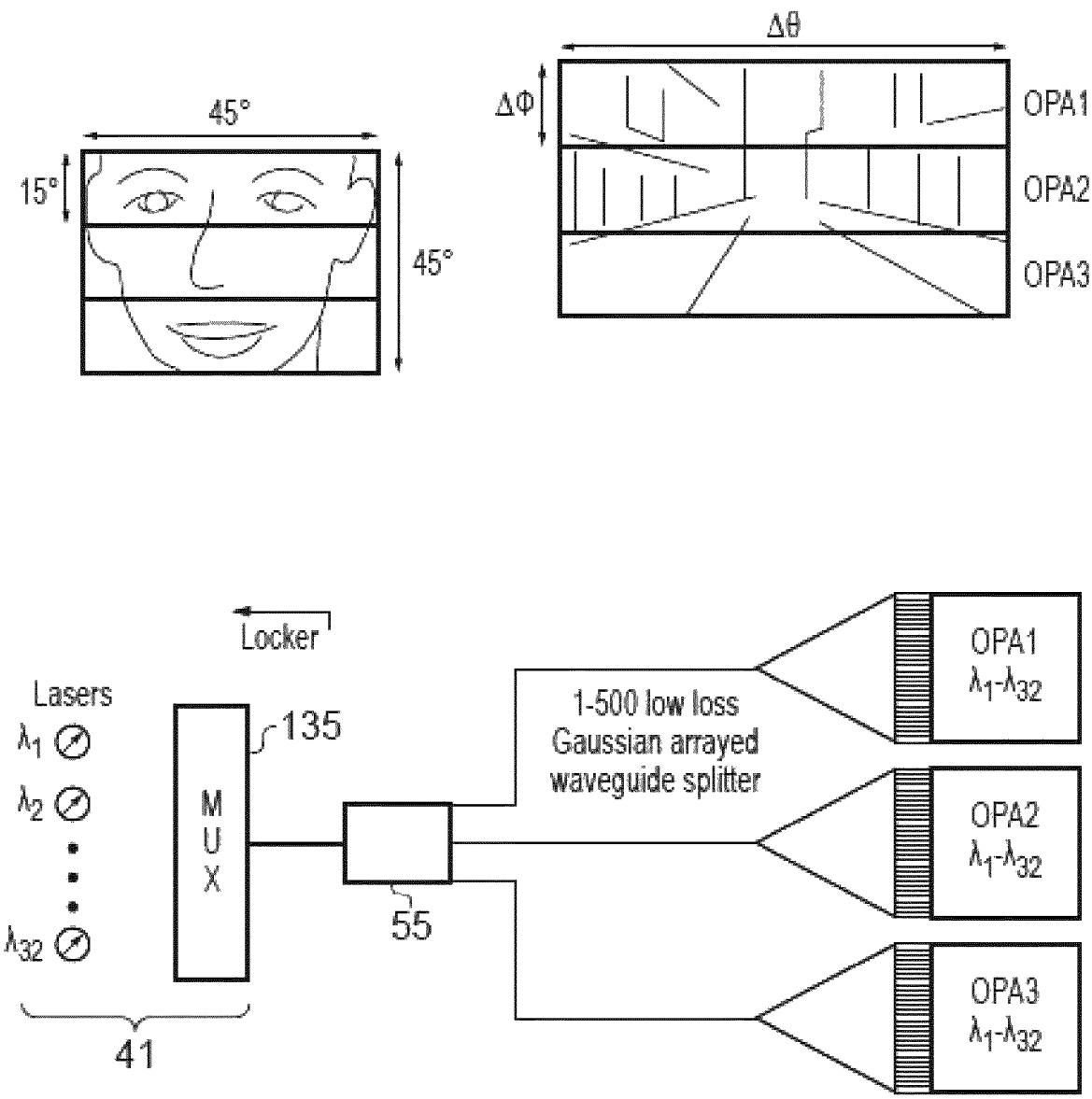
FIG. 31 shows a schematic diagram of an example of a setup of OPAs covering a 45 degree by 45 degree field of view.

FIG. 31 shows an example of a transmitter in which the azimuthal component of the field of view is split into three segments each of which is scanned using a respective OPA, OPA1-3. In other embodiments, a different number of light emitting components may be provided so that the azimuthal FOV may be split in two, or more than three segments. An optical splitter 55 is provided between the light source 41 and the light emitting components (which in this example are OPAs, but may be other types of light emitting components in other examples). Each of the light emitting components are configured to direct light over their respective portion of the azimuthal angles. The splitter is configured to split light received at the input between the plurality of outputs. Each light emitting component has a plurality of inputs and a plurality of emitters, the light emitting component comprising at least one OPA. Each light emitting component is configured to selectively emit beams over a plurality of emission angles having different respective polar components within the polar angular range of the FOV and wherein the light emitting component and the or each further light emitting component are configured to each selectively emit beams over different respective ranges of azimuthal angular components. The input to the splitter is coupled to the light source, and each of the outputs of the splitter is coupled to inputs of a respective one of the light emitting components. In this example, the OPAs consist of blocks of phase shifters and grating emitters. Phase tuning is used to direct the azimuthal component of light and the polar component of the light is partitioned into three segments for wavelength tuning. This example uses 32 lasers with 3 nm tuning and each segment covers 15 degrees of the polar FOV. The grating emitters in each of the three light emitting components are configured to direct light to their respective segment of the polar component of the FOV.

Figure 33:
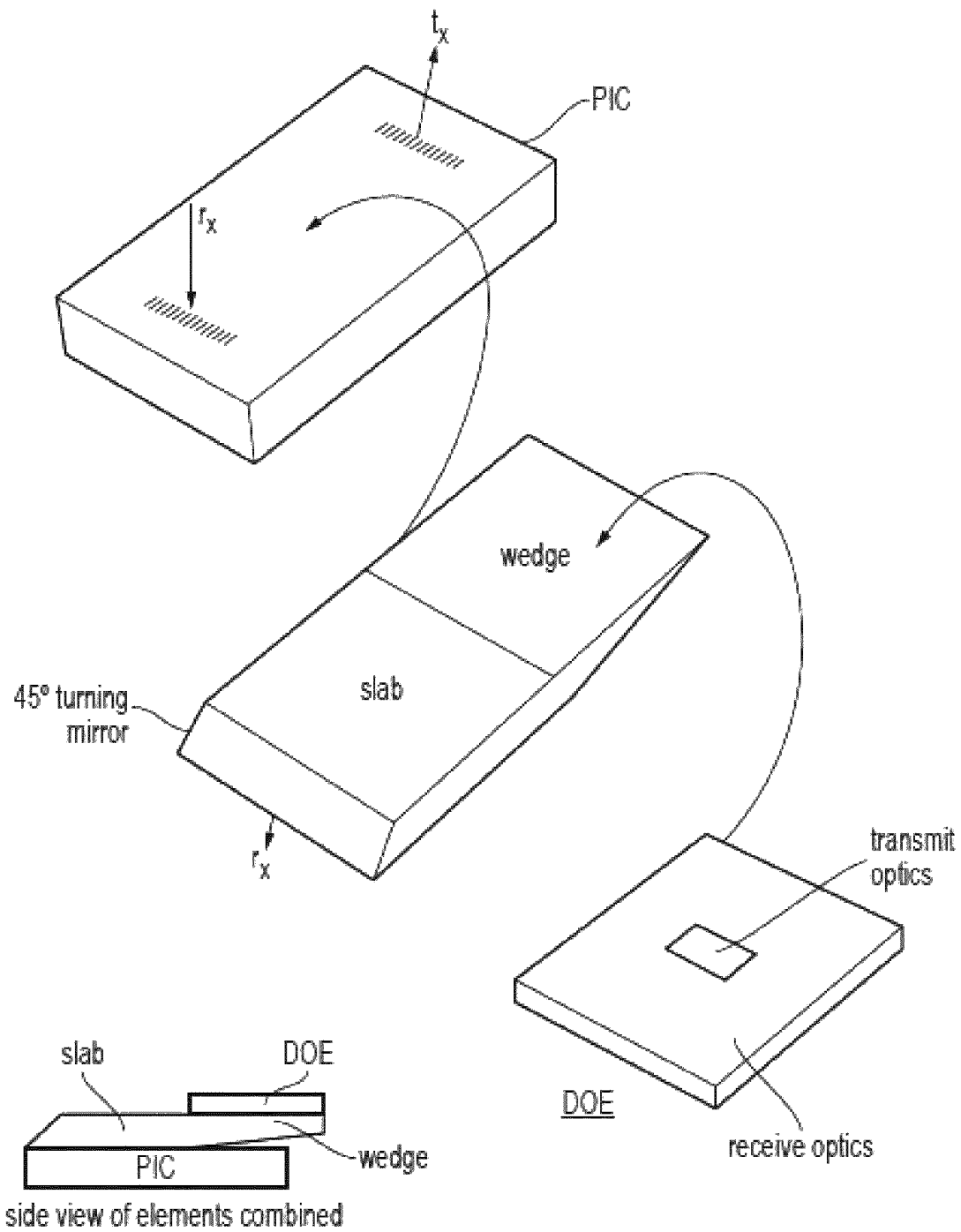
FIG. 33 shows the build-up of a transceiver PIC with a wedge/slab folding optics and diffractive optical transmit and collection optical element.

FIG. 33 shows an example of an arrangement of a PIC transceiver, wedge and slab and optics. As shown, in the side view, the optics may be positioned on the front (top) of the wedge and the wedge and slab may be positioned on the PIC so that the transmitter light emitting components align with the wedge and the light collecting components on the PIC are behind the back of the slab. The end of the slab may be provided with a 45 degree turning mirror to direct light out of the slab to the receiver light collecting component(s).

Figure 35:
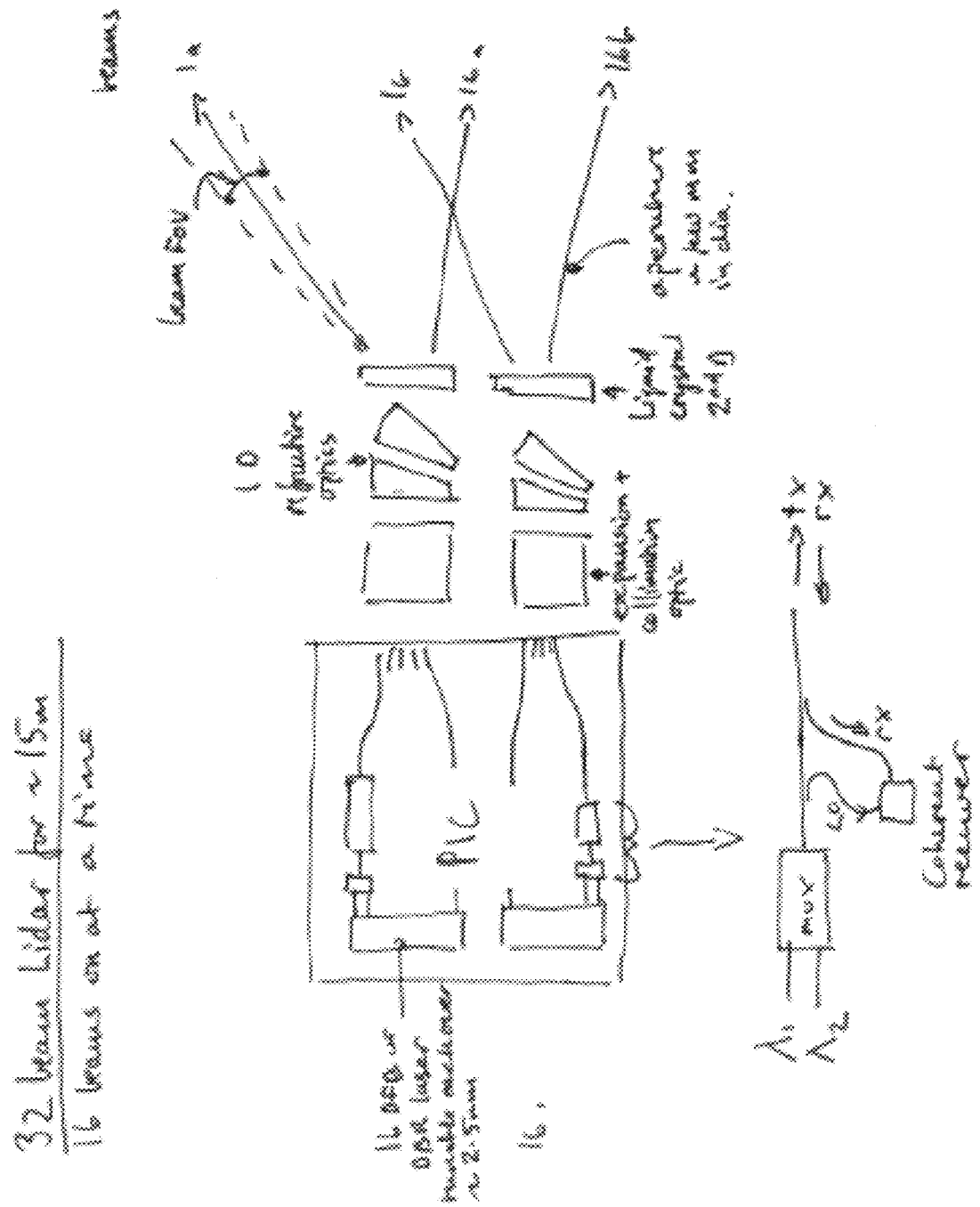
FIG. 35 shows a LiDAR system according to the present invention incorporating liquid crystal phase shifters.

It is envisaged that any one of the embodiments described herein could be adapted to include liquid crystal phase shifters. FIG. 35 shows one such example of a LiDAR system according to the present invention incorporating liquid crystal phase shifters. The embodiment shown is a 32 beam LiDAR with a first group of 16 beams and a second group of 16 beams, only one group of beams being on at any time. However, it should be noted that the same set up could be applied to any integer number x of beams with x/2 beams on at a time.

There are two types of scanning occurring. A first scanning step to provide scanning in a first dimension and a second scanning step to provide scanning over a second dimension. The first scanning step is a "fast scanning" process having a scanning speed which is faster relative to the second "slow scanning" step. The first scanning step, which takes place in the first dimension is carried out using laser tuning and refractive optics. The refractive optics may take the form of a slab, a wedge, and a lens. The second scanning step, which takes place in the second dimension uses liquid crystal. In the embodiment shown, a first group of 16 lasers fast scans in the first dimension whilst the liquid crystal for a second group of 16 lasers resets to a new angle. Once the liquid crystal is set at the second angle, the system switches over from the first group of lasers to the second group of lasers which then carry out a fast scan using their respective refractive optics.

Each laser may take the form of a DFB laser which is tunable over a given wavelength range, an example of a suitable wavelength range being 2.5 µm.

The two groups of lasers may be located on a single photonic integrated circuit (PIC). Light output from the PIC passes through an expansion and collimation optic, followed by the refractive optics which control scanning in the first dimension, and then finally through the liquid crystal which controls scanning in the second dimension. An aperture after the liquid crystal may have a diameter of 1, 2, 3, 4 or 5 mm.

Importantly, as shown in FIG. 35, the entire system can be configured to operate in both transmission (tx) and receiver (rx) mode.

An example arrangement can be formed using a grating on the transmitter and the wavelength so as to efficiently sample the FOV using waveguides of 1 µm height or less and this can be combined as gratings across a 1D set of OPA waveguides. However, small waveguides (for example, 1 µm or less) may be more sensitive to OPA phase error manufacturing tolerances and sophisticated gratings (e.g. blazed profile or phase plates) are more process intensive and take longer to integrate into manufacturing silicon photonics processes. Using an external grating (e.g. glass) or a phase plate element can give more degrees of freedom and simplify overall production. Configurations of gratings and lenses can be selected as appropriate to the application.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

Any of the LiDAR systems described herein may be applied to a larger automotive system including one or more vehicles or one or more parts for use on a vehicle.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A LiDAR transceiver comprising an imaging component for receiving light, and a photonic integrated circuit (PIC) transmitter,
the imaging component comprising:
a PIC receiver, a slab, a wedge, and a lens, wherein the wedge has a front surface and an opposing back surface and the imaging component is arranged to define a receiving optical path through the front surface of the wedge, the receiving optical path continuing through the wedge and through the slab to the PIC receiver, the lens being configured to focus light of the receiving optical path onto the PIC receiver; and
the transceiver arranged to define a transmitting optical path from the transmitter, through the wedge and through the front surface of the wedge,
wherein the wedge comprises a transmitting window through which the transmitting optical path passes, the transmitting window having optical characteristics configured to allow light to enter the wedge at the back surface, pass through the wedge and exit the wedge at the front surface,
wherein the back surface of the wedge has a high reflection coating, comprising a metal or a multilayer coating, and the transmitting window is located at a gap in the coating, wherein at the front surface of the wedge, a cross-sectional area of the receiving optical path is 20 to 200 times greater than a cross-sectional area of the transmitting optical path, wherein the wedge has a thick end and an opposing thin end, the slab extending from the thick end of the wedge to a distal end surface of the slab coupled between a front surface of the slab and a back surface of the slab, the distal end surface configured to reflect light propagating along the receiving optical path toward the back surface, wherein the transmitter is located behind the back surface of the wedge, wherein the transceiver further comprises a diffractive optical element (DOE) at the front surface of the wedge such that the receiving optical path extends through the DOE and the transmitting optical path extends through the DOE, the DOE comprising:

a transmitting region configured to transmit, from a front surface of the DOE, a beam of light received at a back surface of the DOE; and a receiving region configured to steer the azimuthal component of light incident on the front surface of the DOE by an amount dependent on wavelength and transmit the light from the back surface of the DOE with an azimuthal component that is independent of the wavelength of the light, and wherein the receiving region is distributed on two opposing sides of the transmitting region.

2. A LIDAR transceiver according to claim 1, wherein the transmitting window is a hole in the wedge that extends from the back surface of the wedge to the front surface of the wedge.

3. A LIDAR transceiver according to claim 1, wherein the transmitter is configured such that, at the front surface of the wedge, the transmitting optical path is located in the centre of the front surface of the wedge and wherein the receiving optical path surrounds the transmitting optical path.

4. A LIDAR transceiver according to claim 1, wherein the transmitter comprises a transmitter optical phased array.

5. A LIDAR transceiver according to claim 4, wherein the transmitter optical phased array is located on a photonic integrated circuit and the wedge overlies the transmitter optical phased array on the photonic integrated circuit.

6. A LIDAR transceiver according to claim 1, the LIDAR transceiver being for scanning an environment over a field of view, FOV, the FOV having an azimuthal angular range and a polar angular range, the transceiver being configured to:

transmit light from the PIC transmitter through the transmitting optical path and through the transmitting region of the DOE and emit the light to the environment, the light having an emission angle with an azimuthal component within the azimuthal angular range of the FOV and a polar component within the polar angular range of the FOV, the azimuthal component of the emission angle being dependent on wavelength of the light, receive the light from the environment, direct the light through the receiving region of the DOE from the front surface to the back surface and through the receiving optical path to the PIC receiver, and focus the light, using the lens, on the PIC receiver.

7. A LIDAR transceiver according to claim 6, wherein the PIC transmitter comprises grating emitters configured to steer the azimuthal component of the angle of the light by an amount dependent on the wavelength of the light.

8. A LIDAR transceiver according to claim 6, wherein the transmitting region of the DOE is further configured to steer the azimuthal component of the angle of the light dependent on the wavelength of the light.

9. A LIDAR transceiver according to claim 6, wherein the transmitting region of the DOE is further configured to split light received at the back surface of the DOE into a plurality of beams and to transmit each of the plurality of beams from the front surface of the DOE at different respective azimuthal angles.

10. A LIDAR transceiver according to claim 9, wherein the transceiver further comprises one or more further PIC receivers and the receiving region of the DOE is configured to steer each of the plurality of beams to a respective one of the PIC receivers.

11. A LIDAR transceiver according to claim 10, wherein the receiving region comprises a plurality of sub regions, each of the sub regions being configured to steer a respective one of the plurality of beams to its respective receiver.

12. A LIDAR transceiver according to claim 6, wherein the transmitting region is located in the centre of the diffractive optical element and the receiving region surrounds the transmitting region.

13. A LIDAR transceiver according to claim 6, wherein the lens is located between the DOE and the PIC receiver.

14. A LIDAR transceiver according to claim 6, wherein the lens is located at the front surface of the DOE.

15. A LIDAR transceiver according to claim 6, wherein the lens and the DOE are integrally formed by a single component having focusing and diffractive features.

16. A LIDAR transceiver according to claim 1, wherein the distal end surface is configured to reflect the light propagating along the receiving optical path toward the back surface via a highly reflective coating on the distal end surface.

17. A LIDAR transceiver according to claim 1, wherein the distal end surface is configured to reflect the light propagating along the receiving optical path toward the back surface via total internal reflection.

18. A LIDAR transceiver according to claim 1, wherein the transmitting region of the DOE is configured to not interact with light traveling through the transmitting region from the back surface of the DOE to the front surface of the DOE.

19. A LIDAR transceiver according to claim 18, wherein the PIC transmitter comprises grating emitters configured to steer the azimuthal component of the angle of the light transmitted by the transmitter by an amount dependent on the wavelength of the light.

20. A LIDAR transceiver according to claim 1, wherein the lens is located between the DOE and the wedge.

* * * * *